(12) United States Patent
Okajima

(10) Patent No.: US 8,796,593 B2
(45) Date of Patent: Aug. 5, 2014

(54) RADIO-FREQUENCY HEATING APPARATUS AND RADIO-FREQUENCY HEATING METHOD

(75) Inventor: Toshiyuki Okajima, Shiga (JP)

(73) Assignee: Panasonic Corporation, Osaka (JP)

( * ) Notice: Subject to any disclaimer, the term of this patent is extended or adjusted under 35 U.S.C. 154(b) by 330 days.

(21) Appl. No.: 13/382,222

(22) PCT Filed: Sep. 15, 2010

(86) PCT No.: PCT/JP2010/005631
§ 371 (c)(1),
(2), (4) Date: Jan. 4, 2012

(87) PCT Pub. No.: WO2011/039961
PCT Pub. Date: Apr. 7, 2011

(65) Prior Publication Data
US 2012/0103972 A1    May 3, 2012

(30) Foreign Application Priority Data
Sep. 29, 2009  (JP) ................................ 2009-225651

(51) Int. Cl.
H05B 1/02    (2006.01)
H05B 6/68    (2006.01)
H05B 6/70    (2006.01)

(52) U.S. Cl.
CPC .............. H05B 6/686 (2013.01); *Y02B 40/146* (2013.01); H05B 6/705 (2013.01); *H05B 2206/044* (2013.01); *Y02B 40/143* (2013.01)
USPC . 219/490; 219/121.43; 219/497; 219/121.54; 392/416

(58) Field of Classification Search
CPC ...................................................... H05B 6/48
USPC .................... 219/490, 497, 494, 121.43, 507; 392/418–416
See application file for complete search history.

(56) References Cited

U.S. PATENT DOCUMENTS 5,968,587 A * 10/1999 Frankel ............................ 427/8
6,015,465 A *  1/2000 Kholodenko et al. ........ 118/719
(Continued)

FOREIGN PATENT DOCUMENTS

CN    101317499 A    12/2008
EP    2 051 564    4/2009
(Continued)

OTHER PUBLICATIONS

Extended European Search Report issued Apr. 11, 2013 in corresponding European Patent Application No. 10820087.4.

(Continued)

*Primary Examiner* — Mark Paschall
(74) *Attorney, Agent, or Firm* — Wenderoth, Lind & Ponack, L.L.P.

(57) ABSTRACT

A radio-frequency heating apparatus includes a radio-frequency power generation unit (120), variable phase shift units (142a to 142d) that change a phase of a radio-frequency power generated by the radio-frequency power generation unit (120), radio-frequency power units (140a to 140d), and a control unit (110) that sets a frequency for the radio-frequency power generation unit (120) and a phase shift amount for the variable phase shift units (142a to 142d). Backward power detection units in the radio-frequency power units (140a to 140d) individually detect a reflected power and a through power at the frequency set for the radio-frequency power generation unit (120) by the control unit (110), and the control unit (110) determines a frequency for the radio-frequency power generation unit (120) and a phase shift amount for the variable phase shift units (142a to 142d) for heating the object, on the basis of the detected amplitude and phase of the reflected wave and the through wave.

18 Claims, 22 Drawing Sheets

(56) References Cited

U.S. PATENT DOCUMENTS

| | | | |
|---|---|---|---|
| 6,348,099 B1 * | 2/2002 | Xia et al. | 118/697 |
| 8,395,322 B2 * | 3/2013 | Coumou | 315/111.21 |
| 2007/0075072 A1 | 4/2007 | Roussy | |
| 2009/0289056 A1 | 11/2009 | Suenaga et al. | |
| 2010/0065554 A1 | 3/2010 | Suenaga et al. | |
| 2010/0089908 A1 | 4/2010 | Suenaga et al. | |
| 2010/0176121 A1 | 7/2010 | Nobue et al. | |
| 2010/0176123 A1 | 7/2010 | Mihara et al. | |
| 2011/0168695 A1 | 7/2011 | Okajima et al. | |

FOREIGN PATENT DOCUMENTS

| | | |
|---|---|---|
| JP | 7-288433 | 10/1995 |
| JP | 10-142168 | 5/1998 |
| JP | 2000-357583 | 12/2000 |
| JP | 2006-523921 | 10/2006 |
| JP | 2008-108491 | 5/2008 |
| JP | 2008-146967 | 6/2008 |
| JP | 2008-269793 | 11/2008 |
| JP | 2009-32638 | 2/2009 |
| JP | 2009-138954 | 6/2009 |
| JP | 2009-259616 | 11/2009 |
| JP | 2009-301747 | 12/2009 |
| JP | 2010-4453 | 1/2010 |
| WO | 2009/011111 | 1/2009 |
| WO | 2010/140342 | 12/2010 |

OTHER PUBLICATIONS

International Search Report issued Dec. 28, 2010 in corresponding International Application No. PCT/JP2010/005631.

* cited by examiner

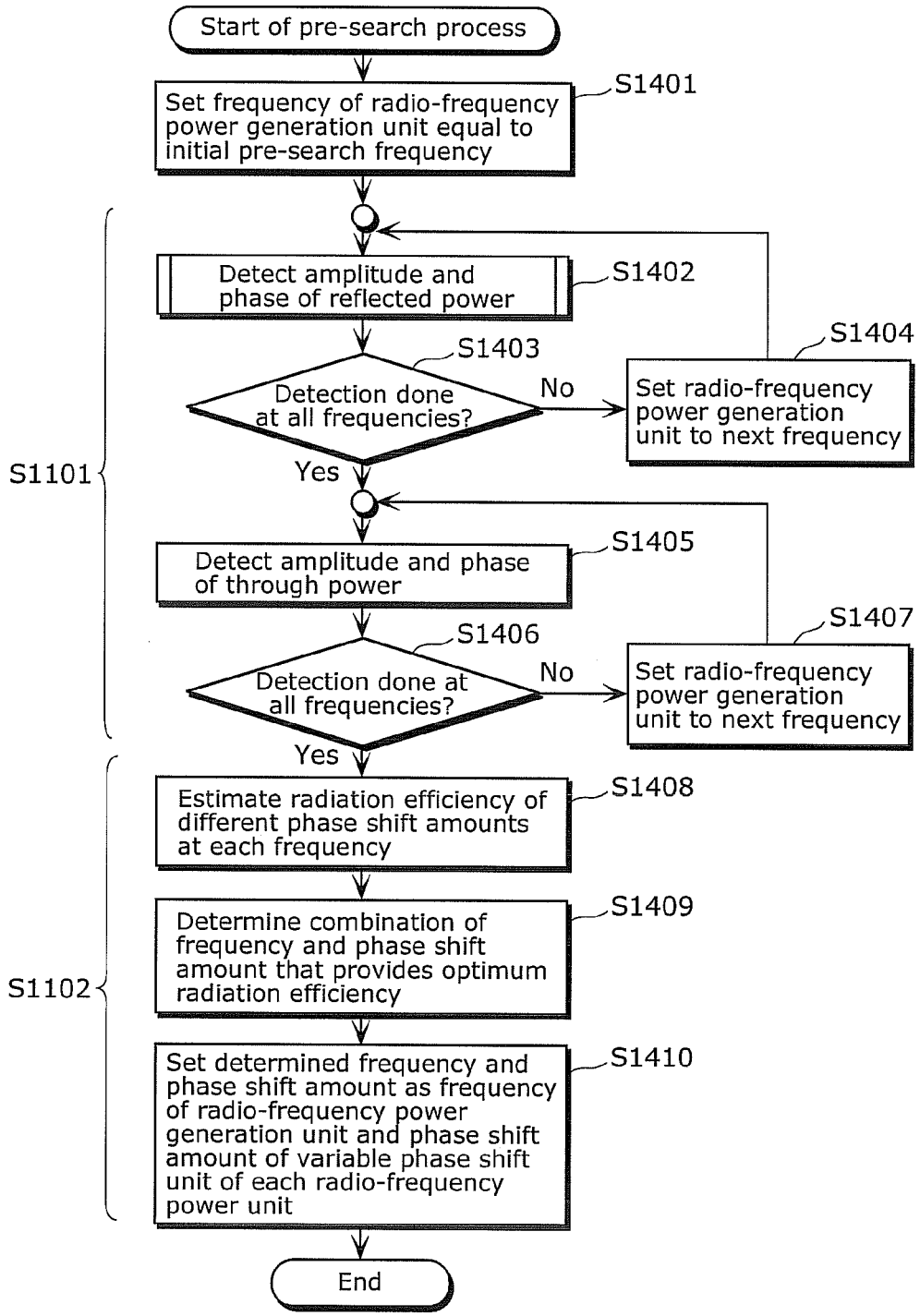

| Frequency [MHz] | S11 | S12 | S13 | S14 | S21 | S22 | ... | S43 | S44 |
|---|---|---|---|---|---|---|---|---|---|
| 2400 | $M_{2400.11}$ $\theta_{2400.11}$ | $M_{2400.12}$ $\theta_{2400.12}$ | $M_{2400.13}$ $\theta_{2400.13}$ | $M_{2400.14}$ $\theta_{2400.14}$ | $M_{2400.21}$ $\theta_{2400.21}$ | $M_{2400.22}$ $\theta_{2400.22}$ | ... | $M_{2400.43}$ $\theta_{2400.43}$ | $M_{2400.44}$ $\theta_{2400.44}$ |
| 2401 | $M_{2401.11}$ $\theta_{2401.11}$ | $M_{2401.12}$ $\theta_{2401.12}$ | $M_{2401.13}$ $\theta_{2401.13}$ | $M_{2401.14}$ $\theta_{2401.14}$ | $M_{2401.21}$ $\theta_{2401.21}$ | $M_{2401.22}$ $\theta_{2401.22}$ | ... | $M_{2401.43}$ $\theta_{2401.43}$ | $M_{2401.44}$ $\theta_{2401.44}$ |
| 2402 | $M_{2402.11}$ $\theta_{2402.11}$ | $M_{2402.12}$ $\theta_{2402.12}$ | $M_{2402.13}$ $\theta_{2402.13}$ | $M_{2402.14}$ $\theta_{2402.14}$ | $M_{2402.21}$ $\theta_{2402.21}$ | $M_{2402.22}$ $\theta_{2402.22}$ | ... | $M_{2402.43}$ $\theta_{2402.43}$ | $M_{2402.44}$ $\theta_{2402.44}$ |
| .. | .. | .. | .. | .. | .. | .. | ... | .. | .. |
| 2500 | $M_{2500.11}$ $\theta_{2500.11}$ | $M_{2500.12}$ $\theta_{2500.12}$ | $M_{2500.13}$ $\theta_{2500.13}$ | $M_{2500.14}$ $\theta_{2500.14}$ | $M_{2500.21}$ $\theta_{2500.21}$ | $M_{2500.22}$ $\theta_{2500.22}$ | ... | $M_{2500.43}$ $\theta_{2500.43}$ | $M_{2500.44}$ $\theta_{2500.44}$ |

Each column shows amplitude M in upper column and phase θ in lower column

FIG. 10

| Frequency [MHz] \ Combination of phase shift amounts | $\theta_{0,0,0,0}$ | $\theta_{30,0,0,0}$ | $\theta_{60,0,0,0}$ | ... | $\theta_{330,330,330,330}$ |
|---|---|---|---|---|---|
| 2400 | $L_{sum,2400,0,0,0,0}$ | $L_{sum,2400,30,0,0,0}$ | $L_{sum,2400,60,0,0,0}$ | ... | $L_{sum,2400,330,330,330,330}$ |
| 2401 | $L_{sum,2401,0,0,0,0}$ | $L_{sum,2401,30,0,0,0}$ | $L_{sum,2401,60,0,0,0}$ | ... | $L_{sum,2401,330,330,330,330}$ |
| 2402 | $L_{sum,2402,0,0,0,0}$ | $L_{sum,2402,30,0,0,0}$ | $L_{sum,2402,60,0,0,0}$ | ... | $L_{sum,2402,330,330,330,330}$ |
| .. | .. | .. | .. | ... | .. |
| 2500 | $L_{sum,2500,0,0,0,0}$ | $L_{sum,2500,30,0,0,0}$ | $L_{sum,2500,60,0,0,0}$ | ... | $L_{sum,2500,330,330,330,330}$ |

190

RADIO-FREQUENCY HEATING APPARATUS AND RADIO-FREQUENCY HEATING METHOD

TECHNICAL FIELD

The present invention relates to a radio-frequency heating apparatus that heats an object placed in a heating chamber, and to a radio-frequency heating method.

BACKGROUND ART

Conventional radio-frequency heating apparatuses typically include a radio-frequency power generation unit constituted of vacuum tubes called magnetrons.

In recent years, radio-frequency heating apparatuses that include, instead of the magnetron, a semiconductor device such as GaN have been developed (for example as seen in PTL 1). Such radio-frequency heating apparatuses can be made smaller in size in lower cost, yet allow frequency and phase to be easily controlled. PTL 1 discloses a technique of controlling the frequency and phase difference of radio-frequency power radiated from a plurality of radiation units so as to minimize reflected power, to thereby heat an object in a desirable state.

CITATION LIST

Patent Literature

[PTL 1] Japanese Unexamined Patent Application Publication No. 2009-32638

SUMMARY OF INVENTION

Technical Problem

The aforementioned configuration requires, however, individually changing conditions of frequency and phase of the radio-frequency power to be optimized within a given range, thereby detecting the reflected power in all the combinations of the conditions. This results in a disadvantage in that it takes a long time until the optimum heating condition is determined after a user places an object in the heating chamber and presses the start button.

The present invention has been accomplished in view of the aforementioned problem, with an object to provide a radio-frequency heating apparatus that determines an optimum heating condition in a short time.

Solution to Problem

Accordingly, the present invention provides a radio-frequency heating apparatus that heats an object placed in a heating chamber, the apparatus including at least one radio-frequency power generation unit configured to generate radio-frequency power of a set frequency; a variable phase shift unit configured to change a phase of the radio-frequency power generated by the radio-frequency power generation unit; a plurality of radio-frequency power units each including (i) a radiation unit configured to radiate the radio-frequency power of a phase changed by the variable phase shift unit to the heating chamber, and (ii) a backward power detection unit configured to detect backward power constituting a part of the radio-frequency power radiated from the radiation unit and incident into the radiation unit from the heating chamber; and a control unit configured to set a frequency for the radio-frequency power generation unit and a phase shift amount for the variable phase shift unit. The backward power detection unit is configured to: detect, on the basis of the frequency set for the radio-frequency power generation unit by the control unit, an amplitude and a phase of a reflected wave constituting the backward power inputted by reflection to the radiation unit of one of the radio-frequency power units, and an amplitude and a phase of a through wave constituting the backward power inputted to the radiation unit of the one of the radio-frequency power units, the reflected wave being part of the radio-frequency power radiated from the radiation unit of the one of the radio-frequency power units, and the through wave being part of the radio-frequency power radiated from a radiation unit of another one of the radio-frequency power units, and the control unit is configured to (i) sequentially set a plurality of frequencies for the radio-frequency power generation unit, (ii) cause the backward power detection unit of each of the radio-frequency power units to detect the amplitude and the phase of the reflected wave and the amplitude and the phase of the through wave with respect to each of the set frequencies, (iii) determine a frequency of the radio-frequency power to be generated by the radio-frequency power generation unit and a phase shift amount of the variable phase shift unit for heating the object, on the basis of a plurality of the detected amplitudes and phases of the reflected wave and the detected amplitudes and phases of the through wave, and (iv) set the determined frequency and the determined phase shift amount for the radio-frequency power generation unit and the variable phase shift unit.

The radio-frequency heating apparatus thus configured allows the radiation efficiency to be obtained without the need to actually measure the frequencies of the radio-frequency power generation unit and the phase shift amounts of the variable phase shift units with respect to all the possible combinations of those values. Therefore, the frequency to be set for the radio-frequency power generation unit and the phase shift amount to be set for the respective variable phase shift units for achieving the highest radiation efficiency can be determined in a significantly short time.

In the aforementioned radio-frequency heating apparatus, the control unit may be configured to (i) estimate by calculation an amplitude and a phase of the reflected wave and an amplitude and a phase of the through wave resulting from a given combination of the phase shift amounts in the variable phase shift unit, with respect to each of the frequencies that can be set for the radio-frequency power generation unit, by using the detected amplitude and phase of the reflected wave and the detected amplitude and phase of the through wave, and (ii) determine a frequency of the radio-frequency power to be generated by the radio-frequency power generation unit and a combination of the phase shift amounts of the variable phase shift unit to be applied for heating the object, on the basis of (a) the amplitude and the phase of the reflected wave and the amplitude and the phase of the through wave detected with respect to each of the frequencies, and (b) the amplitude and the phase of the reflected wave and the amplitude and the phase of the through wave resulting from given combinations of the phase shift amounts in the variable phase shift unit, estimated with respect to each of the frequencies.

Such an arrangement allows the radiation efficiency under a predetermined condition to be obtained by calculation on the basis of minimum measured values.

Preferably, the control unit may be configured to determine, among the given combinations, the combination in which a total amount of the reflected wave and the through wave detected by the backward power detection unit of each of the radio-frequency power units is smallest.

Preferably, the backward power detection unit may include a quadrature detection unit, and the quadrature detection unit may be configured to perform quadrature detection of the backward power by using the radio-frequency power generated by the radio-frequency power generation unit, to thereby detect an in-phase detection signal and a quadrature detection signal to be used to calculate the amplitude and the phase of the reflected wave and the amplitude and the phase of the through wave.

Such a configuration allows each of the radio-frequency power units to radiate the radio-frequency power to the heating chamber independently from one another, thereby facilitating the detection of the reflected wave and the through wave.

Preferably, each of the plurality of radio-frequency power units may further include a radio-frequency power amplification unit configured to amplify the radio-frequency power generated by the radio-frequency power generation unit, and to vary an amplification gain, and the control unit may be configured to further set an amplification gain in the radio-frequency power amplification unit.

Such a configuration simplifies the controlling procedure of the control unit.

Preferably, the radio-frequency heating apparatus may include one radio-frequency power generation unit, and may further include a distribution unit configured to divide the radio-frequency power generated by the radio-frequency power generation unit and supply the divided radio-frequency power to the plurality of radio-frequency power units.

Preferably, when the backward power detection unit of one of the radio-frequency power units detects the amplitude and the phase of the through wave, the control unit may be configured to set (i) a frequency of the radio-frequency power generation unit equal to a frequency for measuring the through wave, and (ii) an amplification gain in the radio-frequency power amplification unit such that the amplitude of the reflected wave in the one of the radio-frequency power units becomes smaller than the amplitude of the through wave.

Preferably, when the backward power detection unit of one of the radio-frequency power units detects the amplitude and the phase of the reflected wave, the control unit may be configured to set an amplification gain in the radio-frequency power amplification unit such that the amplitude of the through wave becomes smaller than the amplitude of the reflected wave in the one of the radio-frequency power units.

Preferably, the radio-frequency heating apparatus may include a plurality of the radio-frequency power generation units, and the plurality of radio-frequency power generation units may supply a plurality of radio-frequency powers thereby generated, to the plurality of radio-frequency power units.

Such a configuration further shortens the time necessary for detecting the reflected wave. In addition, the frequency of the radio-frequency power to be generated by the plurality of radio-frequency power generation units can be independently set, and therefore the radiation efficiency can be improved.

Preferably, one of the plurality of radio-frequency power generation units and one of the plurality of radio-frequency power units may be associated with each other on one-to-one basis.

Such a configuration even further shortens the time necessary for detecting the reflected wave. In addition, the radiation efficiency can be further improved.

Preferably, the plurality of radio-frequency power units may be associated with the plurality of radio-frequency power generation units, and, when the backward power detection unit of one of the radio-frequency power units is to detect the amplitude and the phase of the through wave, the control unit may be configured to set (i) the same frequency in one of the radio-frequency power generation units associated with the one of the radio-frequency power units and in another one of the radio-frequency power generation units associated with another one of the radio-frequency power units, and (ii) an amplification gain in the radio-frequency power amplification units such that the amplitude of the reflected wave in the one of the radio-frequency power units becomes smaller than the amplitude of the through wave.

Preferably, the plurality of radio-frequency power units may be associated with the plurality of radio-frequency power generation units, and, when a frequency set in one of the radio-frequency power generation units associated with one of the radio-frequency power units is the same as a frequency set in another one of the radio-frequency power generation units associated with another one of the radio-frequency power units, and when the backward power detection unit of the one of the radio-frequency power units is to detect the amplitude and the phase of the through wave, the control unit may be configured to set an amplification gain in the radio-frequency power amplification unit such that the amplitude of the through wave in the one of the radio-frequency power units becomes smaller than the amplitude of the reflected wave in the one of the radio-frequency power units.

Preferably, the control unit may be configured to (i) determine a frequency of the radio-frequency power generation unit and a phase shift amount of the variable phase shift unit as a pre-search process before heating the object, (ii) redetermine a frequency of the radio-frequency power generation unit and a phase shift amount of the variable phase shift unit as a re-search process while heating the object, and (iii) set an amplification gain for the radio-frequency power amplification unit of the plurality of radio-frequency power units, such that the radio-frequency power radiated from the radiation unit of the plurality of radio-frequency power units during the pre-search process or the re-search process becomes smaller than the radio-frequency power radiated from the radiation unit for heating the object.

Such an arrangement prevents a failure of the radio-frequency heating apparatus, especially the radio-frequency power amplification unit that includes a semiconductor element.

Preferably, the control unit may be configured to determine a frequency of the radio-frequency power generation unit and a phase shift amount of the variable phase shift unit before heating the object as a pre-search process.

With such an arrangement, the radio-frequency heating apparatus can heat the object under the optimum heating condition determined before the heating operation.

Preferably, the control unit may be further configured to redetermine a frequency of the radio-frequency power generation unit and a phase shift amount of the variable phase shift unit while heating the object as a re-search process; and set a frequency newly determined in the re-search process for the radio-frequency power generation unit, and a phase shift amount newly determined in the re-search process for the variable phase shift unit.

Such an arrangement allows the object to be heated constantly under the optimum heating condition, despite a change in temperature or shape of the object taking place during the heating operation.

Preferably, the control unit may be configured to cause each of the plurality of radio-frequency power units to detect the backward power while heating the object; and execute the re-search process in the case where at least one of a plurality of backward powers detected exceeds a threshold.

Preferably, the variable phase shift unit may be a phase shifter provided in association with each of the plurality of radio-frequency power units.

Preferably, the variable phase shift unit may be a phase-locked loop (PLL) circuit provided in association with each of the at least one radio-frequency power generation unit, and configured to change a phase of the radio-frequency power generated by the associated radio-frequency power generation unit, in accordance with a phase shift amount set by the control unit.

Such a configuration allows the phase shift amount to be changed at a frequency lower than that of the radio-frequency power, thereby facilitating the control and designing of the radio-frequency heating apparatus.

The present invention also provides a method of heating an object placed in a heating chamber with radio-frequency power radiated from a plurality of radio-frequency power units, the method including setting a frequency of the radio-frequency power radiated from the plurality of radio-frequency power units; detecting, on the basis of the set frequency, an amplitude and a phase of a reflected wave constituting the backward power inputted by reflection to the radiation unit of one of the radio-frequency power units, and an amplitude and a phase of a through wave constituting the backward power inputted to the radiation unit of the one of the radio-frequency power units, the reflected wave being part of the radio-frequency power radiated from the radiation unit of the one of the radio-frequency power units, and the through wave being part of the radio-frequency power radiated from a radiation unit of another one of the radio-frequency power units; changing the frequency of the radio-frequency power radiated from the plurality of radio-frequency power units; detecting an amplitude and a phase of the reflected wave and an amplitude and a phase of the through wave on the basis of the frequency changed in the changing of the frequency; determining a frequency and a phase of the radio-frequency power radiated from the plurality of radio-frequency power units for heating the object, on the basis of the amplitudes and the phases of the reflected wave and the amplitudes and the phases of the through wave detected in the detecting on the basis of the set frequency and in the detecting on the basis of the frequency changed; and radiating the radio-frequency power of the determined frequency and the determined phase from the plurality of radio-frequency power units thereby heating the object.

In the aforementioned method, the determining of a frequency and a phase may include estimating by calculation, by using the amplitudes and the phases of the reflected wave and the amplitudes and the phases of the through wave detected in the detecting on the basis of the set frequency and in the detecting on the basis of the frequency changed, an amplitude and a phase of the reflected wave and an amplitude and a phase of the through wave resulting from a given combination of the phase shift amounts set in the variable phase shift unit, with respect to each of the frequencies of the radio-frequency power radiated from the plurality of radio-frequency power units that can be set; and determining a frequency and a combination of phases of the radio-frequency power radiated from the plurality of radio-frequency power units for heating the object, on the basis of (i) the amplitude and the phase of the reflected wave and the amplitude and the phase of the through wave detected in the detecting on the basis of the set frequency and in the detecting on the basis of the frequency changed, and (ii) the amplitude and the phase of the reflected wave and the amplitude and the phase of the through wave estimated in the estimating by calculation.

Advantageous Effects of Invention

The radio-frequency heating apparatus and the radio-frequency heating method according to the present invention are capable of determining an optimum heating condition in a short time.

BRIEF DESCRIPTION OF DRAWINGS

FIG. 7 is a flowchart showing a procedure for performing a pre-search process.

FIG. 8 is a table showing an example of a matrix representing amplitudes and phases of a reflected power incident into each radio-frequency power unit and of a through power among the radio-frequency power units, with respect to each frequency.

FIG. 10 is a table showing overall radiation loss of the radio-frequency heating apparatus calculated on the basis of the frequency and the combinations of the phase shift amounts.

DESCRIPTION OF EMBODIMENTS

[Embodiment 1]

Figure 1:
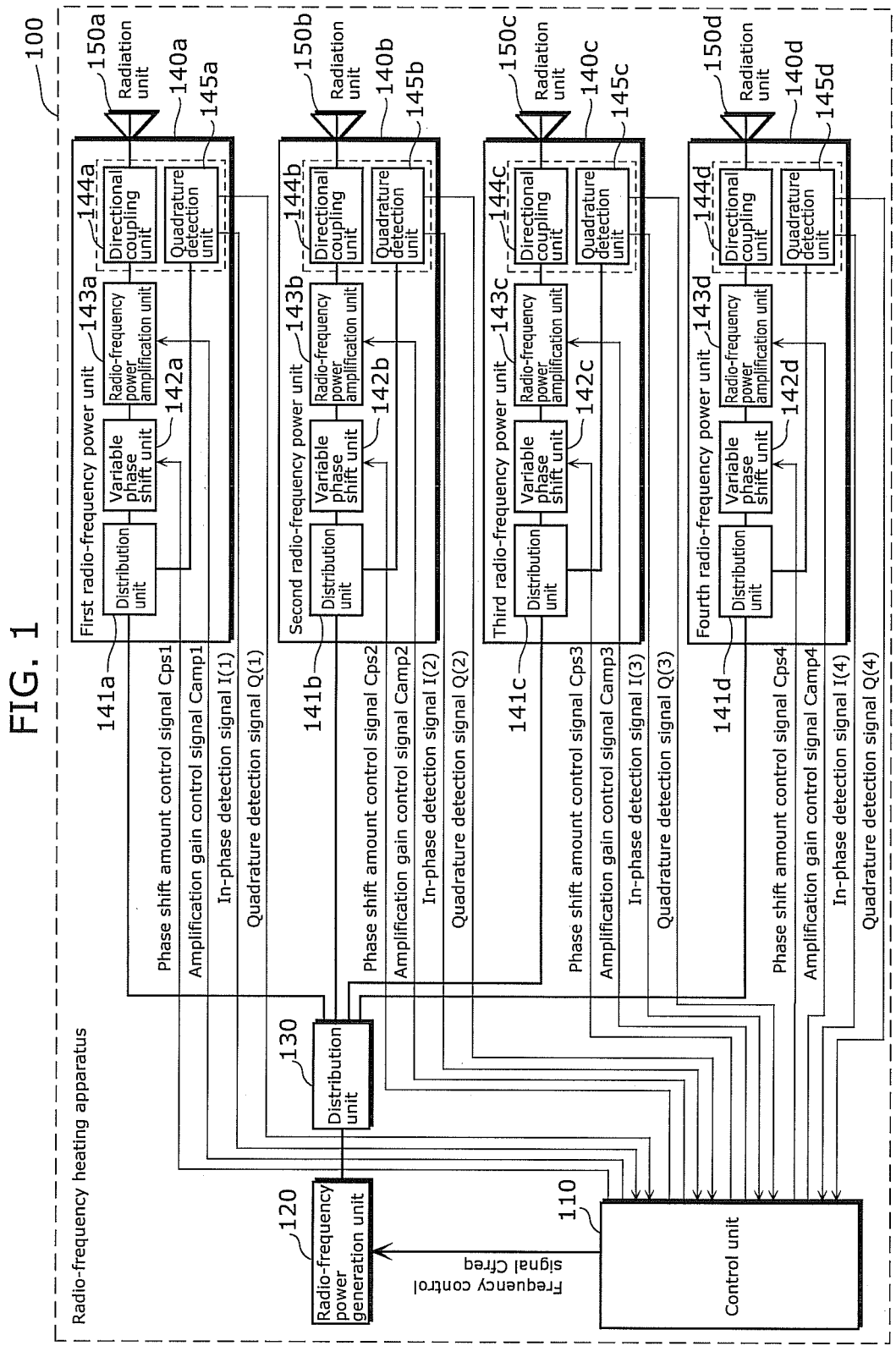
FIG. 1 is a block diagram showing a general configuration of a radio-frequency heating apparatus according to an embodiment 1.

A radio-frequency heating apparatus according to the present invention is configured to heat an object placed in a heating chamber, and includes at least one radio-frequency power generation unit configured to generate radio-frequency power of a set frequency; a variable phase shift unit configured to change a phase of the radio-frequency power generated by the radio-frequency power generation unit; a plurality of radio-frequency power units each including (i) a radiation unit configured to radiate the radio-frequency power of a phase changed by the variable phase shift unit to the heating chamber, and (ii) a backward power detection unit configured to detect backward power constituting a part of the radio-frequency power radiated from the radiation unit and incident into the radiation unit from the heating chamber; and a control unit configured to set a frequency for the radio-frequency power generation unit and a phase shift amount for the variable phase shift unit. The backward power detection unit is configured to: detect, on the basis of the frequency set for the radio-frequency power generation unit by the control unit, an amplitude and a phase of a reflected wave constituting the backward power inputted by reflection to the radiation unit of one of the radio-frequency power units, and an amplitude and a phase of a through wave constituting the backward power inputted to the radiation unit of the one of the radio-frequency power units, the reflected wave being part of the radio-frequency power radiated from the radiation unit of the one of the radio-frequency power units, and the through wave being part of the radio-frequency power radiated from a radiation unit of another one of the radio-frequency power units, and the control unit is configured to: (i) sequentially set a plurality of frequencies for the radio-frequency power generation unit, (ii) cause the backward power detection unit of each of the radio-frequency power units to detect the amplitude and the phase of the reflected wave and the amplitude and the phase of the through wave with respect to each of the set frequencies, (iii) determine a frequency of the radio-frequency power to be generated by the radio-frequency power generation unit and a phase shift amount of the variable phase shift unit for heating the object, on the basis of a plurality of the detected amplitudes and phases of the reflected wave and the detected amplitudes and phases of the through wave, and (iv) set the determined frequency and the determined phase shift amount for the radio-frequency power generation unit and the variable phase shift unit.

Hereafter, an embodiment 1 of the present invention will be described referring to the drawings.

FIG. 1 is a block diagram showing a configuration of a radio-frequency heating apparatus according to the embodiment 1 of the present invention.

The radio-frequency heating apparatus 100 shown in FIG. 1 is intended for heating an object placed in a heating chamber, and includes a control unit 110, a radio-frequency power generation unit 120, a distribution unit 130, a first radio-frequency power unit 140a, a second radio-frequency power unit 140b, a third radio-frequency power unit 140c, a fourth radio-frequency power unit 140d, and radiation units 150a to 150d. Hereinafter, the respective radio-frequency power units (first radio-frequency power unit 140a, second radio-frequency power unit 140b, third radio-frequency power unit 140c, and fourth radio-frequency power unit 140d) may be simply referred to as radio-frequency power unit 140, in the case where it is not necessary to specifically distinguish those units. Likewise, the first radio-frequency power unit 140a, the second radio-frequency power unit 140b, the third radio-frequency power unit 140c, and the fourth radio-frequency power unit 140d may be referred to as radio-frequency power unit 140a, radio-frequency power unit 140b, radio-frequency power unit 140c, and radio-frequency power unit 140d, respectively. Although the radio-frequency heating apparatus 100 includes four radio-frequency power units in FIG. 1, the number of radio-frequency power units is not specifically limited.

The control unit 110 controls the frequency, phase and output level of a plurality of radio-frequency powers radiated from the radiation units 150a to 150d. More specifically, the control unit 110 outputs a frequency control signal Cfreq indicating a frequency to the radio-frequency power generation unit 120, and outputs phase shift amount control signals Cps1 to Cps4 to the radio-frequency power units 140 indicating a phase shift amount of the radio-frequency power generated by the radio-frequency power units 140, and amplification gain control signals Camp1 to Camp4 indicating an amplification gain in the radio-frequency power unit 140. The control unit 110 also determines an optimum heating condition on the basis of in-phase detection signals I(1) to I(4) and quadrature detection signals Q(1) to Q(4) that indicate detection results with respect to each of the radio-frequency power units 140.

The radio-frequency power generation unit 120 is a variable-frequency generator that generates radio-frequency power of a frequency set by the control unit 110. More specifically, the radio-frequency power generation unit 120 is for example a phase-locked loop (PLL) circuit that generates radio-frequency power of a frequency specified by the frequency control signal Cfreq inputted from the control unit 110.

Figure 2:
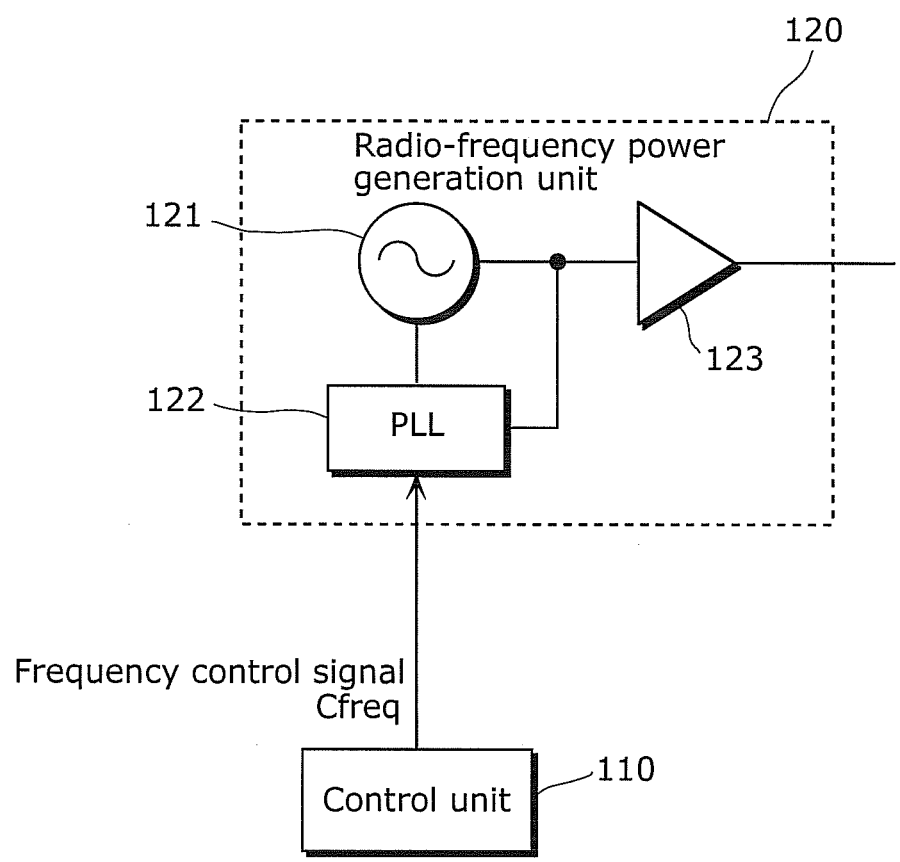
FIG. 2 is a block diagram showing a specific configuration of a radio-frequency power generation unit.

FIG. 2 is a block diagram showing a specific configuration of the radio-frequency power generation unit 120.

The radio-frequency power generation unit 120 shown in FIG. 2 includes an oscillation unit 121, a phase-locked loop 122, and an amplification unit 123.

The oscillation unit 121 is for example a voltage-controlled oscillator (VOC) that generates a radio-frequency signal of a frequency based on a voltage outputted from the phase-locked loop 122.

The phase-locked loop 122 adjusts an output voltage such that the frequency of the radio-frequency power generated by the oscillation unit 121 and the frequency control signal Cfreq indicating the set frequency inputted from the control unit 110 become equal. The amplification unit 123 is for example a transistor that amplifies the radio-frequency power generated by the oscillation unit 121.

Thus, the radio-frequency power generation unit 120 generates radio-frequency power of a frequency set by the control unit 110. Although FIG. 2 shows a single piece of amplification unit 123, the amplification unit 123 may be composed of a plurality of power amplifiers in order to obtain a high and larger power output. In this case, the plurality of power amplifiers of the amplification unit 123 may be either series-connected or connected in parallel so as to combine the power outputs.

The radio-frequency power generated by the radio-frequency power generation unit 120 is distributed in four ways by the distribution unit 130, and inputted to the radio-frequency power units 140a to 140d.

The radio-frequency power units 140a to 140d each change the phase of the radio-frequency power inputted through the distribution unit 130 by a phase shift amount set by the control unit 110, and amplify the phase-shifted radio-frequency power by an amplification gain set by the control unit 110, and then radiate the radio-frequency power to the heating chamber through the respectively associated radiation units 150a to 150d. More specifically, the radio-frequency power units 140a to 140d change the phase of the radio-frequency power in accordance with the phase shift amount control signals Cps1 to Cps4 inputted from the control unit 110 and indicating the phase shift amount. The radio-frequency power units 140a to 140d also amplify the phase-shifted radio-frequency power in accordance with the amplification gain control signals Camp1 to Camp4 inputted from the control unit 110 and indicating the amplification gain.

The radio-frequency power units 140a to 140d also detect the backward power incident thereinto from the heating chamber through the respectively associated radiation units 150a to 150d. More specifically, the radio-frequency power units 140a to 140d output the in-phase detection signals I(1) to I(4) and the quadrature detection signals Q(1) to Q(4) indicating the amplitude and the phase of the backward power inputted through the radiation unit 150a to 150d, to the control unit 110. Detailed configuration of the radio-frequency power units 140a to 140d will be subsequently described.

The radiation units 150a to 150d are for example antennas provided in association with the radio-frequency power units 140a to 140d on one-to-one basis, and radiate the radio-frequency power generated by the associated radio-frequency power units 140a to 140d to the heating chamber and receive the backward power from the heating chamber. Although the radiation units 150a to 150d are illustrated separately from the radio-frequency power units 140a to 140d in FIG. 1, this is only exemplary and the radiation units 150a to 150d may be included in the radio-frequency power units 140a to 140d.

The detailed configuration of the radio-frequency power units 140a to 140d will now be described.

As shown in FIG. 1, the first radio-frequency power unit 140a includes a distribution unit 141a, a variable phase shift unit 142a, a radio-frequency power amplification unit 143a, a directional coupling unit 144a, and a quadrature detection unit 145a. The second radio-frequency power unit 140b includes a distribution unit 141b, a variable phase shift unit 142b, a radio-frequency power amplification unit 143b, a directional coupling unit 144b, and a quadrature detection unit 145b. The third radio-frequency power unit 140c includes a distribution unit 141c, a variable phase shift unit 142c, a radio-frequency power amplification unit 143c, a directional coupling unit 144c, and a quadrature detection unit 145c. The fourth radio-frequency power unit 140d includes a distribution unit 141d, a variable phase shift unit 142d, a radio-frequency power amplification unit 143d, a directional coupling unit 144d, and a quadrature detection unit 145d.

The radio-frequency power units 140a to 140d are all configured in the same way. In other words, the distribution units 141a to 141d, the variable phase shift units 142a to 142d, the radio-frequency power amplification units 143a to 143d, the directional coupling units 144a to 144d, and the quadrature detection units 145a to 145d are respectively configured in the same way. Accordingly, although description will be made on the first radio-frequency power unit 140a alone, it should be understood that the second radio-frequency power unit 140b, the third radio-frequency power unit 140c, and the fourth radio-frequency power unit 140d perform the same functions as the first radio-frequency power unit 140a. In the following description, the distribution units 141a to 141d, the variable phase shift units 142a to 142d, the radio-frequency power amplification units 143a to 143d, the directional coupling units 144a to 144d, and the quadrature detection unit 145a to 145d may be simply referred to as distribution unit 141, variable phase shift unit 142, radio-frequency power amplification unit 143, directional coupling unit 144, and quadrature detection unit 145, respectively, without specific distinction. Likewise, the radiation units 150a to 150d may be referred to as radiation unit 150 without specific distinction. Further, the in-phase detection signals I(1) to I(4) and the quadrature detection signals Q(1) to Q(4) may be referred to as in-phase detection signal I and quadrature detection signal Q, without specific distinction.

Figure 3:
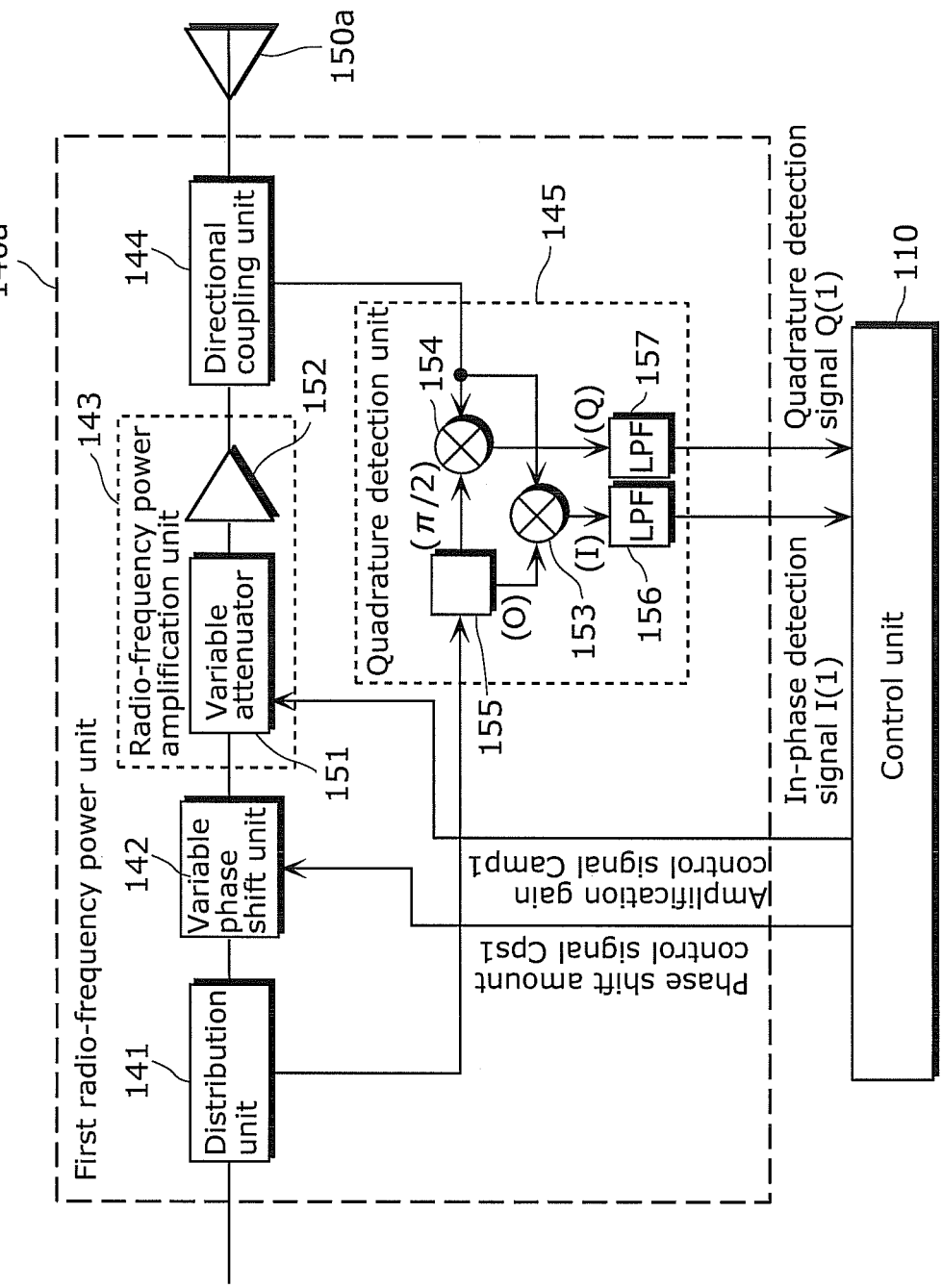
FIG. 3 is a block diagram showing a specific configuration of a first radio-frequency power unit.

FIG. 3 is a block diagram showing a specific configuration of the first radio-frequency power unit 140a. FIG. 3 also shows the control unit 110 and the radiation unit 150a associated with the first radio-frequency power unit 140a.

As shown in FIG. 3, the first radio-frequency power unit 140a includes the distribution unit 141, the variable phase shift unit 142, the radio-frequency power amplification unit 143, the directional coupling unit 144, and the quadrature detection unit 145. The distribution unit 141, the variable phase shift unit 142, the radio-frequency power amplification unit 143, the directional coupling unit 144, and the radiation unit 150a are serially connected in this order. The quadrature detection unit 145 is connected to the distribution unit 141 and the directional coupling unit 144. Here, the directional coupling unit 144 and the quadrature detection unit 145 correspond to the backward power detection unit according to the present invention.

The distribution unit 141 distributes in two ways the radio-frequency power inputted from the radio-frequency power generation unit 120 through the distribution unit 130. The distribution unit 141 may be constituted of a power divider, a directional coupler, or a hybrid coupler.

The variable phase shift unit 142 changes the phase of the radio-frequency power divided in two by the distribution unit 141 by a phase shift amount set by the control unit 110. More specifically, the variable phase shift unit 142 changes the phase of the radio-frequency signal inputted thereto in accordance with the phase shift amount control signal Cps1 inputted from the control unit 110 and indicating the phase shift amount. The variable phase shift unit 142 may be constituted of, for example, a multi bit variable phase shifter or a continuously variable phase shifter.

The multi bit variable phase shifter (for example, 3-bit step variable phase shifter), typically employed for digital control, is capable of controlling the phase shift amount in several steps by combinations of route switching. The phase shift amount is determined on the basis of the phase shift amount control signal Cps1, which is a control signal inputted from outside and indicating the phase shift amount.

In contrast, the continuously variable phase shifter is suitable for analog voltage control, and for example known as a loaded line phase shifter that employs a transmission line and a hybrid-coupled phase shifter that employs a 90° hybrid coupler. Both are configured to change a reverse voltage of a varacter diode so as to change a reflection phase between two resonant circuits, to thereby change an insertion phase shift between the input and output sides. The amount of insertion phase shift is determined on the basis of the phase shift amount control signal Cps1, which is a control signal inputted from outside and indicating the phase shift amount.

The radio-frequency power amplification unit 143 amplifies the radio-frequency power of the phase shifted by the variable phase shift unit 142, by an amplification gain according to the amplification gain control signal Camp1 inputted from the control unit 110. The radio-frequency power amplification unit 143 includes a variable attenuator 151 and a radio-frequency power amplifier 152, the former of which receives the amplification gain control signal Camp1 from the control unit 110. Although the radio-frequency power amplifier 152 is constituted of a single power amplifier in FIG. 3, the radio-frequency power amplifier 152 may be composed of a plurality of power amplifiers in order to obtain a high and larger power output. In this case, the plurality of power amplifiers of the radio-frequency power amplifier 152 may be either series-connected or connected in parallel so as to combine the power outputs.

The variable attenuator 151 attenuates the radio-frequency power of the phase shifted by the variable phase shift unit 142, by an attenuation amount according to the amplification gain control signal Camp1 inputted from the control unit 110. The structure of the variable attenuator 151 is widely known, and for example a multi bit variable attenuator or a continuously variable attenuator may be employed.

The multi bit variable attenuator (for example, 3-bit step variable phase shifter), typically employed for digital control, is capable of controlling the attenuation amount in several steps by on/off actions of a FET switch and combinations of route switching. The attenuation amount is determined on the basis of a control signal inputted from outside and indicating the attenuation amount.

In contrast, the continuously variable attenuator is suitable for analog voltage control, and for example a continuously variable attenuator that includes a PIN junction diode is known. This attenuator is configured to change a reverse bias voltage of the PIN junction so as to change a resistance between electrodes, to thereby continuously change the attenuation amount. The attenuation amount is determined on the basis of a control signal inputted from outside and indicating the attenuation amount.

The radio-frequency power amplifier 152 may be, for example, a transistor that amplifies the radio-frequency signal attenuated by the variable attenuator 151, at a predetermined amplification factor.

Thus, the radio-frequency power amplification unit 143 attenuates the inputted radio-frequency power by an attenuation amount indicated by the amplification gain control signal Camp1, and amplifies the attenuated radio-frequency power at a predetermined amplification factor. In other words, the radio-frequency power amplification unit 143 is a variable-gain amplifier that amplifies the inputted radio-frequency signal by an amplification gain according to the attenuation amount indicated by the amplification gain control signal Camp1.

Here, the variable attenuator 151 may be substituted with a variable-gain amplifier. In this case, the amplification gain is determined on the basis of a control signal inputted from outside and indicating the amplification gain.

The directional coupling unit 144 splits a portion of the backward power returning from the radiation unit 150a to the radio-frequency power amplification unit 143, and inputs the split portion to the quadrature detection unit 145. The directional coupling unit 144 also outputs the radio-frequency power amplified by the radio-frequency power amplification unit 143 to the radiation unit 150a, to thereby prevent the radio-frequency power amplified by the radio-frequency power amplification unit 143 from circumventing to the quadrature detection unit 145 which is a receiving-side circuit. Accordingly, the radio-frequency power amplified by the radio-frequency power amplification unit 143 is radiated from the radiation unit 150a to the heating chamber through the directional coupling unit 144. The specific structure of the directional coupling unit 144 is widely known. The directional coupling unit 144 may be constituted of a directional coupler, a circulator, or a hybrid coupler.

The quadrature detection unit 145 performs quadrature detection of the backward power inputted from the radiation unit 150a through the directional coupling unit 144 by using the radio-frequency power generated by the radio-frequency power generation unit 120, to thereby detect the in-phase detection signal I(1) and the quadrature detection signal Q(1) to be used to detect the amplitude and the phase of the backward power. The quadrature detection unit 145 includes an in-phase detection mixer 153, a quadrature detection mixer 154, a n/2 phase shifter 155, an in-phase side low-pass filter 156, and a quadrature side low-pass filter 157, and the in-phase side low-pass filter 156 and the quadrature side low-pass filter 157 are each connected to the control unit 110.

The n/2 phase shifter 155 receives the radio-frequency power divided by the distribution unit 141, and generates an in-phase radio-frequency power of the same phase as the inputted radio-frequency power and a quadrature radio-frequency power of the phase shifted by n/2 from the inputted radio-frequency power. The in-phase radio-frequency power is outputted to the in-phase detection mixer 153 and the quadrature radio-frequency power is outputted to the quadrature detection mixer 154. Here, although not shown, a radio-frequency power amplifier, a fixed attenuator, and a low-pass filter may be provided between the distribution unit 141 and the quadrature detection unit 145, to optimize the detection characteristic of the quadrature detection unit 145.

The split backward power, a portion of the backward power split by the directional coupling unit 144, is inputted to the quadrature detection unit 145. The split backward power inputted to the quadrature detection unit 145 is distributed in two ways and inputted to the in-phase detection mixer 153 and the quadrature detection mixer 154, respectively. Here, although not shown, a radio-frequency power amplifier, a fixed attenuator, and a low-pass filter may be provided between the directional coupling unit 144 and the quadrature detection unit 145, to optimize the detection characteristic of the quadrature detection unit 145.

The in-phase detection mixer 153 detects the split backward power by multiplying by the in-phase radio-frequency power inputted from the n/2 phase shifter 155. In other words, the in-phase detection mixer 153 performs synchronous detection of the split backward power with the in-phase radio-frequency power. The in-phase detection mixer 153 then outputs the in-phase detection signal 41) to the control unit 110 through the in-phase side low-pass filter 156, as a result of the synchronous detection, i.e., the multiplication result of the two input signals.

Likewise, the quadrature detection mixer 154 detects the split backward power by multiplying by the quadrature radio-frequency power inputted from the n/2 phase shifter 155. In other words, the quadrature detection mixer 154 performs synchronous detection of the split backward power with the quadrature radio-frequency power. The quadrature detection mixer 154 then outputs the quadrature detection signal Q(1) to the control unit 110 through the quadrature-side low-pass filter 157, as a result of the synchronous detection, i.e., the multiplication result of the two input signals.

The in-phase side low-pass filter 156 and the quadrature side low-pass filter 157 serve to suppress adjacent frequency interference. Accordingly, these filters are configured so as to suppress frequency components corresponding to a smallest difference in frequency between any given two points with respect to all the predetermined frequencies to be used for heating.

Thus, the first radio-frequency power unit 140a changes the phase of the radio-frequency power inputted from the radio-frequency power generation unit 120 through the distribution unit 130 by the phase shift amount according to the phase shift amount control signal Cps1 inputted from the control unit 110; amplifies the radio-frequency power by the amplification gain according to the amplification gain control signal Camp1; and radiates the radio-frequency power to the heating chamber through the radiation unit 150a. The first radio-frequency power unit 140a also detects the backward power incident from the heating chamber, to thereby output the in-phase detection signal I(1) and the quadrature detection signal Q(1) for calculating the amplitude and the phase of the backward power, to the control unit 110.

The control unit 110 calculates, upon receipt of the in-phase detection signal I(1) and the quadrature detection signal Q(1) from the first radio-frequency power unit 140a, the amplitude and the phase of the backward power inputted to the first radio-frequency power unit 140a through the radiation unit 150a, on the basis of the received in-phase detection signal I(1) and the quadrature detection signal Q(1). More specifically, the control unit 110 calculates the amplitude of the backward power from the square mean of the in-phase detection signal I(1) and the quadrature detection signal Q(1), and calculates the phase of the backward power from the arc tangent ($\tan^{-1}$) of the value obtained by dividing the quadrature detection signal Q(1) by the in-phase detection signal I(1).

The control unit 110 executes the aforementioned process also with respect to the second radio-frequency power unit 140b, the third radio-frequency power unit 140c, and the fourth radio-frequency power unit 140d, to thereby detect the amplitude and the phase of the backward power detected by each of the radio-frequency power units.

With the aforementioned configuration, the radio-frequency heating apparatus 100 according to this embodiment can individually detect the amplitude and the phase of the backward power inputted to each of the first to the fourth radio-frequency power units 140a to 140d.

The control unit 110 is connected to each of the variable phase shift units 142a, 142b, 142c, and 142d and the radio-frequency power amplification units 143a, 143b, 143c, and 143d. The control unit 110 individually outputs the phase shift amount control signals Cps1, Cps2, Cps3, Cps4 to the variable phase shift units 142a, 142b, 142c, and 142d, respectively, and individually outputs the amplification gain control signals Camp1, Camp2, Camp3, Camp4 to the radio-frequency power amplification units 143a, 143b, 143c, and 143d, respectively.

The variable phase shift units 142a, 142b, 142c, and 142d each change the phase shift amount in accordance with the individually corresponding phase shift amount control signals Cps1, Cps2, Cps3, Cps4 inputted from the control unit 110. The radio-frequency power amplification unit 143a, 143b, 143c, and 143d each change the amplification gain in accordance with the individually corresponding amplification gain control signals Camp1, Camp2, Camp3, Camp4 inputted from the control unit 110.

An operation of the radio-frequency heating apparatus 100 will now be described here below.

Figure 4:
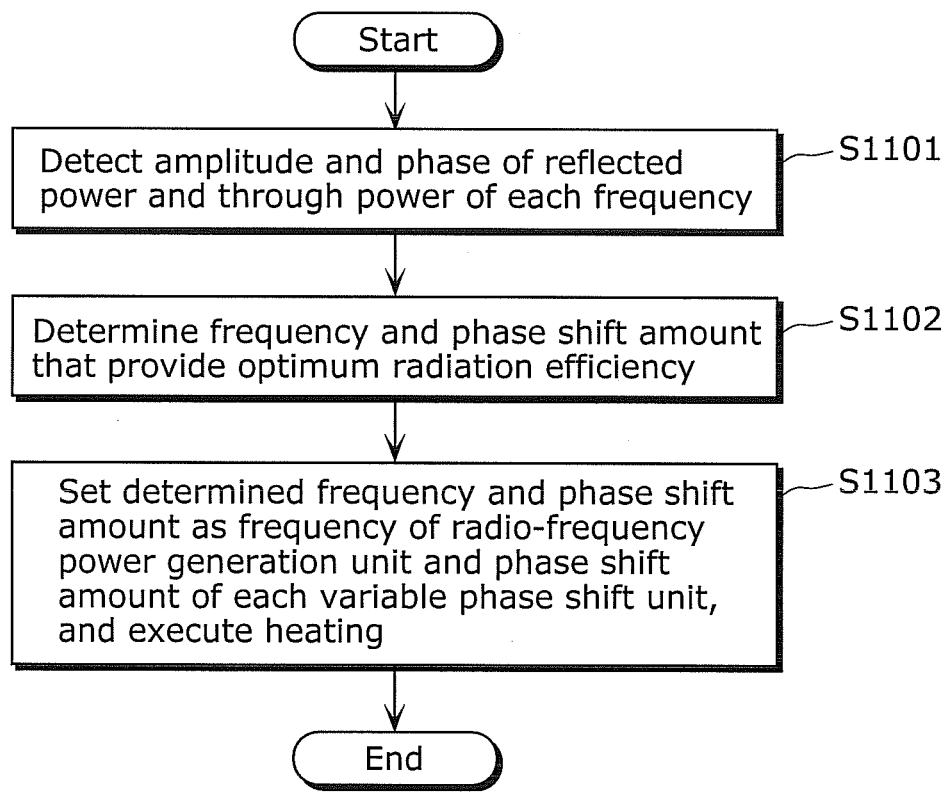
FIG. 4 is a flowchart showing a general control process of the radio-frequency heating apparatus.

FIG. 4 is a flowchart showing a general control process of the radio-frequency heating apparatus 100 shown in FIG. 1. In the radio-frequency heating apparatus 100 shown in FIG. 1, the control unit 110 executes the following operations.

First, the control unit 110 detects the phase of the reflected power and the through power with respect to each frequency (step S1101). More specifically, the control unit 110 sequentially changes the frequency control signal Cfreq so as to cause the radio-frequency power generation unit 120 to sequentially generate a plurality of frequencies. In other words, the radio-frequency power generation unit 120 switches the frequency with time and generates radio-frequency power at each frequency. The control unit 110 also detects, each time the frequency is changed, the amplitude and the phase of the reflected power and the through power that are incident into each radio-frequency power unit 140 when the radio-frequency power is actually radiated. More specifically, the control unit 110 acquires the in-phase detection signals I(1) to I(4) and the quadrature detection signals Q(1) to Q(4) outputted from the quadrature detection units 145a, 145b, 145c, and 145d, each time the frequency of the radio-frequency power to be generated by the radio-frequency power generation unit 120 is changed. The control unit 110 thus individually detects the amplitude and the phase of the reflected power and through power at the radio-frequency power units 140a, 140b, 140c, and 140d.

Here, the term "reflected power" refers to backward power inputted by reflection to the radiation unit of one of the radio-frequency power units 140, the backward power being part of the radio-frequency power radiated from the radiation unit of the one of the radio-frequency power units 140. In other words, the reflected power refers to the backward power inputted by reflection to the radiation unit 150 corresponding to one of the radio-frequency power units 140, the backward power being part of the radio-frequency power radiated from the radiation unit 150 corresponding to the one of the radio-frequency power units 140. For example, the reflected power at the First radio-frequency power unit 140a refers to a portion of the radio-frequency power radiated from the radiation unit 150a that is incident into the radiation unit 150a by reflection.

The term "through power" refers to a through-passing backward power inputted to the radiation unit of one of the radio-frequency power units 140, the backward power being part of the radio-frequency power radiated from the radiation unit of another one of the radio-frequency power units 140. In other words, the through power refers to the through-passing backward power inputted to the radiation unit 150 corresponding to one of the radio-frequency power units 140, the backward power being part of the radio-frequency power radiated from the radiation unit 150 corresponding to another one of the radio-frequency power units 140. For example, the through power at the first radio-frequency power unit 140a refers to a portion of the radio-frequency power radiated from the radiation unit 150b that is incident into the radiation unit 150a.

The reflected power and the through power are defined exclusively by the correlation between the radiation unit 150 that radiates the radio-frequency power and the radiation unit 150 that receives the radio-frequency power, irrespective of which route the radio-frequency power passes through after being radiated. For example, the through power incident into the first radio-frequency power unit 140a from the second radio-frequency power unit 140b may include, out of the radio-frequency power radiated from the second radio-frequency power unit 140b through the radiation unit 150b, a portion that has directly reached the radiation unit 150a, another portion that has been reflected by the heating chamber and the object and reached the radiation unit 150a, and still another portion that has been transmitted through the object and reached the radiation unit 150a.

Hereafter the "reflected power" and the "backward power by reflection" will be referred to as synonyms. Likewise, the "through power" and the "through-passing backward power" will be referred to as synonyms. In addition, the reflected power is synonymous with the reflected wave according to the present invention. Likewise, the through power is synonymous with the through power according to the present invention.

After thus detecting the amplitude and the phase of the reflected power and the through power of each frequency at the step S1101, the control unit 110 determines the frequency and the phase shift amount that provide the best radiation efficiency (step S1102). More specifically, the control unit 110 calculates the frequency of the radio-frequency power to be generated by the radio-frequency power generation unit 120 and the phase shift amount for the variable phase shift units 142a, 142b, 142c, and 142d that make the radiation efficiency highest, on the basis of the amplitude and the phase of the reflected power and the through power measured in each of the radio-frequency power unit 140a, 140b, 140c, and 140d. In other words, the control unit 110 determines by calculation a frequency of the radio-frequency power to be generated by the radio-frequency power generation unit 120 and a combination of the phase shift amounts of the variable phase shift unit 142a, that of the variable phase shift unit 142b, that of the variable phase shift unit 142c, and that of the variable phase shift unit 142d. A method of determining the frequency and the combination of the phase shift amounts on the basis of the amplitude and the phase of the reflected power and the through power will be subsequently described.

Then the control unit 110 controls the radio-frequency power generation unit 120 so as to generate the radio-frequency power at the frequency determined at the step S1102, and the variable phase shift units 142a, 142b, 142c, and 142d so as to change the phase by the phase shift amount determined at the step S1102, and executes the heating (step S1103).

The radio-frequency heating apparatus 100 thus configured can detect (obtain), upon causing the radio-frequency power generation unit 120 to actually radiate the radio-frequency power in different frequencies, the amplitude and the phase of the backward power by reflection and those of the through-passing backward power with respect to each of the frequencies of the radio-frequency power generation unit 120, on the basis of the in-phase detection signals I(1) to I(4) and the quadrature detection signals Q(1) to Q(4) detected by the quadrature detection units 145a, 145b, 145c, and 145d. Then the radio-frequency heating apparatus 100 calculates a radiation loss that would arise when a given frequency of the radio-frequency power generation unit 120 and a given combination of the phase shift amounts of the variable phase shift units 142a, 142b, 142c, and 142d are assumed to be adopted for heating, on the basis of the amplitude and the phase of the backward power by reflection and those of the through-passing backward power obtained as above with respect to each of the frequencies. From the result of such calculations, the frequency of the radio-frequency power generation unit 120 and the phase shift amounts of the variable phase shift units 142a, 142b, 142c, and 142d that provide the best overall radiation efficiency of the radio-frequency heating apparatus 100 can be obtained.

Accordingly, the radio-frequency heating apparatus 100 according to this embodiment can obtain by calculation the optimum radiation efficiency on the basis of minimum measured values of the frequencies and phase shift amounts, without the need to actually measure those values in all the possible frequencies of the radio-frequency power generation unit 120 and combinations of the phase shift amounts of the variable phase shift units 142a, 142b, 142c, and 142d, thereby minimizing the measurement work which requires a long time. Such an arrangement shortens the preparation time for finding out the optimum radiation pattern, between a user's heating instruction to the radio-frequency heating apparatus 100 and start of an actual heating operation.

The term "radiation efficiency" herein referred to represents a ratio of the power absorbed by the object, to the radio-frequency power radiated from the radio-frequency power units 140a to 140d through the respective radiation units 150a to 150d. More specifically, the radiation efficiency is obtained by subtracting the radiation loss from the total sum of the power radiated from the radio-frequency power units 140a to 140d through the radiation units 150a to 150d, and dividing such a value by the total sum of the radiated power. Accordingly, "high radiation efficiency" refers to the case where the largest portion of the energy of the plurality of radiated powers radiated from the radio-frequency power units 140a to 140d through the radiation units 150a to 150d is absorbed by the object out of the total sum of the radiated power. The radiation loss represents the reflected power and the through power originating from the radio-frequency power radiated from the radiation units of the radio-frequency power units 140. In other words, the radiation loss refers to the power absorbed by the radiation units 150, instead of being absorbed by the object. A specific method of obtaining the radiation loss will be subsequently described.

[Detection of Reflected Power]

Figure 5:
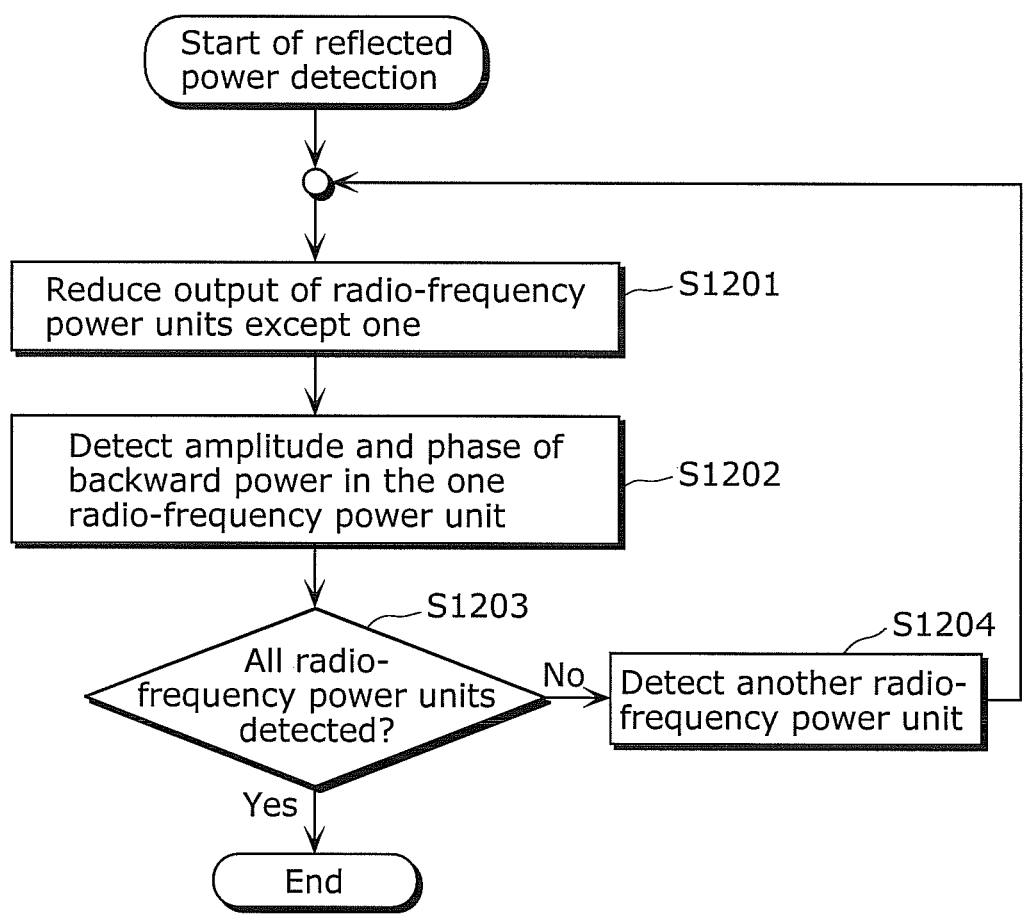
FIG. 5 is a flowchart showing a procedure for detecting a reflected power.

FIG. 5 is a flowchart showing a procedure for detecting the reflected power to be performed by the radio-frequency heating apparatus 100 according to the embodiment 1.

The control unit 110 of the radio-frequency heating apparatus 100 detects the reflected power incident into each of the radio-frequency power units 140a, 140b, 140c, and 140d, through the following controlling procedure.

The radio-frequency heating apparatus 100 shown in FIG. 1 divides the radio-frequency power generated by the radio-frequency power generation unit 120 with the distribution unit 130 in four ways, and supplies the radio-frequency power to each of the radio-frequency power units 140a, 140b, 140c, and 140d. Accordingly, all the radio-frequency power units 140a, 140b, 140c, and 140d operate in the same frequency.

As shown in FIG. 5, the control unit 110 controls the power output of the radio-frequency power units 140 (for example, second, third, and fourth radio-frequency power unit 140b, 140c, and 140d) other than one radio-frequency power unit 140 (for example, first radio-frequency power unit 140a) from which the reflected power is to be detected, such that those outputs are restricted from affecting the detection of the reflected power from the radio-frequency power unit 140 from which the reflected power is to be detected (for example, first radio-frequency power unit 140a) (step S1201). More specifically, the control unit 110 designates, for example, −30 dB to the radio-frequency power amplification unit 143 of the radio-frequency power units 140 other than the one radio-frequency power unit 140, to thereby set the attenuation amount of −30 dB for the variable attenuator 151. Such a process lowers the output level of the radio-frequency power radiated from the radio-frequency power units 140 other than the one radio-frequency power unit 140 to a level that does not affect the detection of the backward power received by the one radio-frequency power unit 140 from which the reflected power is to be detected.

The control unit 110 acquires the in-phase detection signal I and the quadrature detection signal Q (for example, in-phase detection signal I(1) and quadrature detection signal Q(1)) of the radio-frequency power unit 140 from which the reflected power is to be detected (for example, first radio-frequency power unit 140a), to thereby detect the amplitude and the phase of the backward power inputted to the radio-frequency power unit from which the reflected power is to be detected (step S1202).

At this stage, the output level of the radio-frequency power radiated from the radio-frequency power units 140 other than the one from which the reflected power is to be detected is sufficiently lower than the output level of the radio-frequency power radiated from the radio-frequency power unit 140 from which the reflected power is to be detected. Accordingly, the radio-frequency power incident into the radio-frequency power unit 140 from which the reflected power is to be detected is substantially exclusively composed of the reflection of the radio-frequency power radiated from the radio-frequency power unit 140 from which the reflected power is to be detected. Thus, the reflected power incident into the radio-frequency power unit 140 that is the subject of the detection can be detected through the steps S1201 and S1201.

The control unit 110 executes the aforementioned operation with respect to all the remaining radio-frequency power units 140. Then the control unit 110 checks whether the detection of the reflected power has been completed with respect to all the radio-frequency power units 140a to 140d (step S1203), and finishes the reflected power detection in the affirmative case (Yes at step S1203). In contrast, in the case where the reflected power detection has not been completed with all the radio-frequency power units 140a to 140d (No at step S1203), the control unit 110 designates another radio-frequency power unit 140 as the subject of the reflected power detection (step S1204), and repeats the step S1201 in which the output level of the radio-frequency power radiated from the radio-frequency power units 140 other than the designated one is lowered.

Thus, the control unit 110 detects the amplitude and the phase of the reflected power incident into all the radio-frequency power units 140a to 140d.

Here, in order to perform the quadrature detection with the quadrature detection units 145a, 145b, 145c, and 145d, the frequencies of the radio-frequency power to be detected have to be known in advance. The control unit 110 has the function of setting the frequency for the radio-frequency power generation unit 120, and hence has the information on the frequency of the radio-frequency power to be radiated from the radio-frequency power units 140a, 140b, 140c, and 140d. Utilizing such frequency information enables not only the quadrature detection of the reflected power inputted to the radio-frequency power units 140a, 140b, 140c, and 140d, but also the quadrature detection of the through power from other radio-frequency power units 140 to be performed with the respectively corresponding quadrature detection units 145a, 145b, 145c, and 145d. Because of having the frequency information of the radio-frequency power radiated from the radio-frequency power units 140a, 140b, 140c, and 140d, the control unit 110 can acquire the in-phase detection signal and the quadrature detection signal of the reflected power, to thereby detect the amplitude and the phase of the reflected power. This also applies to the acquisition of the in-phase detection signal and the quadrature detection signal of the through power.

[Detection of Through Power]

Figure 6:
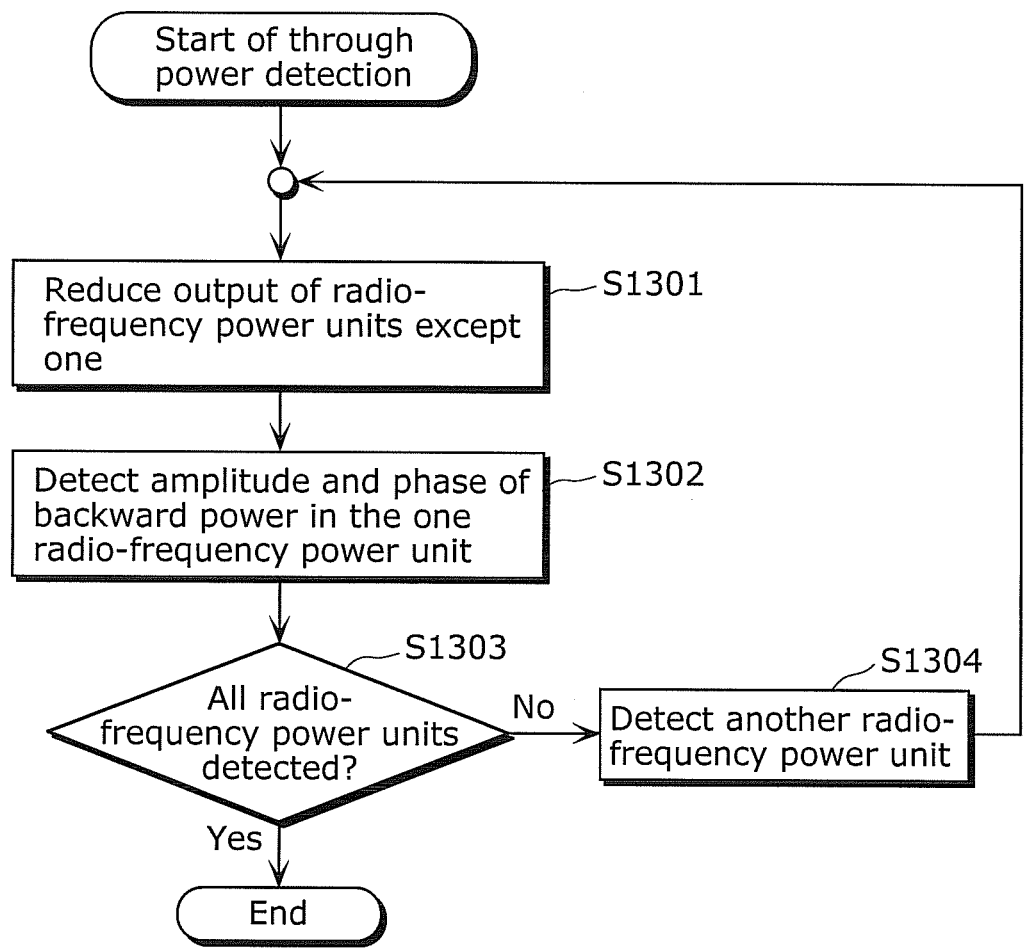
FIG. 6 is a flowchart showing a procedure for detecting a through power.

FIG. 6 is a flowchart showing a procedure for detecting the through power to be performed by the radio-frequency heating apparatus 100 according to the embodiment 1.

The control unit 110 of the radio-frequency heating apparatus 100 detects the through power among the respective radio-frequency power units 140a, 140b, 140c, and 140d, through the following controlling procedure.

As shown in FIG. 6, the control unit 110 first allows only one radio-frequency power unit 140 (for example, first radio-frequency power unit 140a) to output the radio-frequency power, and lowers the power output of the remaining radio-frequency power units 140 (for example, second, third, and fourth radio-frequency power unit 140b, 140c, 140d) such that the detection level of the reflected power of those radio-frequency power units 140 becomes sufficiently low (step S1301).

More specifically, the control unit 110 designates, for example, −30 dB to the radio-frequency power amplification unit 143 of the radio-frequency power units 140 other than the one radio-frequency power unit 140, to thereby set the attenuation amount of −30 dB for the variable attenuator 151. Such a process lowers the reflected power incident into the radio-frequency power units 140 other than the one radio-frequency power unit 140 to a level that does not affect the detection of the through power from the one radio-frequency power unit 140 and incident into the radio-frequency power units 140 other than the one radio-frequency power unit 140. For example, setting the attenuation amount of the attenuator 151b of the second radio-frequency power unit 140b as −30 dB allows the reflected power incident into the second radio-frequency power unit 140b to be lowered to such a level that does not affect the detection of the through power reaching the second radio-frequency power unit 140b from the first radio-frequency power unit 140a.

Them the control unit 110 acquires the in-phase detection signal I and the quadrature detection signal Q of the radio-frequency power units 140 controlled so as to lower the output level of the radio-frequency power, to thereby detect the amplitude and the phase of the backward power inputted to those radio-frequency power units 140 (step S1302).

Through the step S1301 in which the power output of the radio-frequency power units 140 other than the one is lowered, the output level of the radio-frequency power radiated from those radio-frequency power units 140 with the lowered power output (output level) becomes sufficiently lower than the output level of the radio-frequency power radiated from the one radio-frequency power unit 140 the output level of which has not been lowered. Accordingly, the radio-frequency power incident into the radio-frequency power units 140 with the lowered power output is substantially exclusively composed of the radio-frequency power radiated from the one radio-frequency power unit 140 the output level of which has not been lowered. Thus, the through power incident into the radio-frequency power units 140 with the lowered power output from the one radio-frequency power unit 140 the output level of which has not been lowered can be detected, through the steps S1302 in which the amplitude and the phase of the backward power incident into the radio-frequency power units 140 other than the one is detected.

For example, in the case where the power output of the second to the fourth radio-frequency power units 140b to 140d, except for the first radio-frequency power unit 140a is lowered in the step S1301 in which the power output of the radio-frequency power units 140 other than one radio-frequency power unit 140, the amplitude and the phase of the through power originating from the first radio-frequency power unit 140a and incident into each of the second to the fourth radio-frequency power units 140b to 140d can be detected through the step S1302 in which the amplitude and the phase of the backward power incident into the radio-frequency power units 140 is detected.

The control unit 110 checks whether the aforementioned operation has been completed with respect to all the radio-frequency power units 140 (step S1303). In other words, the control unit 110 confirms whether the through powers from all the radio-frequency power units 140a to 140d have been detected, and finishes the through power detection in the affirmative case (Yes at step S1303).

In contrast, in the case where the through power detection has not been completed (No at step S1303), the control unit 110 designates another radio-frequency power unit 140 as the subject of the detection (step S1204), and repeats the step S1301 in which the output level of the radio-frequency power radiated from the radio-frequency power units 140 other than the designated one is lowered. Here, the radio-frequency power unit 140 that is the subject of the detection refers to the radio-frequency power unit 140 that radiates the radio-frequency power that is the origin of the through power to be detected. In other words, lowering the power output of the radio-frequency power units 140 other than the one that is the subject of the detection enables the through power originating from the radio-frequency power unit 140 that is the subject of the detection and incident into other radio-frequency power units 140 with the lowered power output.

Thus, the control unit 110 detects the amplitude and the phase of the through power among the respective radio-frequency power units 140*a*, 140*b*, 140*c*, and 140*d*

[Pre-search Process]

Hereunder, detailed description will be made on a process to determine, by using the aforementioned detection methods of the reflected power and the through power, a frequency of the radio-frequency power to be generated by the radio-frequency power generation unit 120 and a combination of phase shift amounts of the variable phase shift units 142*a* to 142*d* to be applied for heating the object. This process corresponds to detecting the amplitude and the phase of the reflected power and the through power with respect to each frequency (step S1101) and determining the frequency and the phase shift amount that provide the best radiation efficiency (step S1102), among the steps shown in FIG. 4.

FIG. 7 is a flowchart showing a procedure for determining an optimum heating condition in advance of an actual heating operation (pre-search process) to be performed by the radio-frequency heating apparatus 100 according to the embodiment 1.

The control unit 110 of the radio-frequency heating apparatus 100 executes the pre-search process before the heating operation, as described below.

As shown in FIG. 7, the control unit 110 sets a predetermined initial frequency (for example, frequency A0) for the pre-search process as the frequency for the radio-frequency power generation unit 120 (step S1401). To be more detailed, the control unit 110 sets the initial frequency for the pre-search process as the frequency of the radio-frequency power to be generated by the radio-frequency power generation unit 120.

The control unit 110 then detects the amplitude and the phase of the reflected power with respect to all the radio-frequency power units 140*a*, 140*b*, 140*c*, and 140*d*, through the reflected power detection process shown in FIG. 5 (step S1402).

Thereafter, the control unit 110 checks whether the amplitude and the phase of the reflected power have been detected with respect to all the frequencies predetermined for the pre-search process (step S1403). In the case where the amplitude and the phase of the reflected power have not been detected with respect to all the frequencies (No at step S1403), in other words in the case where the amplitude and the phase of the reflected power still have to be detected with respect to one or more frequencies, the control unit 110 executes the following procedure. The control unit 110 sets a next predetermined frequency (for example, frequency A1) for the pre-search process as the frequency of the radio-frequency power to be generated by the radio-frequency power generation unit 120 (step S1404), and repeats the steps S1402 and S1403. Thus, the control unit 110 detects the amplitude and the phase of the reflected power incident into all the radio-frequency power units 140*a*, 140*b*, 140*c*, and 140*d*.

Upon completing the detection of the amplitude and the phase of the reflected power incident into all the radio-frequency power units 140*a*, 140*b*, 140*c*, and 140*d* with respect to all the frequencies predetermined for the pre-search process (Yes at step S1403), the control unit 110 detects the amplitude and the phase of the through power among all the radio-frequency power units 140*a*, 140*b*, 140*c*, and 140*d*, through the aforementioned detection process of the through power (step S1405).

Then the control unit 110 checks whether the amplitude and the phase of the through power have been detected with respect to all the frequencies predetermined for the pre-search process (step S1406). In the case where the amplitude and the phase of the through power have not been detected with respect to all the frequencies (No at step S1406), in other words in the case where the amplitude and the phase of the through power still have to be detected with respect to one or more frequencies, the control unit 110 executes the following procedure. The control unit 110 sets, as the aforementioned step S1404, a next predetermined frequency for the pre-search process as the frequency of the radio-frequency power to be generated by the radio-frequency power generation unit 120 (step S1407), and repeats the steps S1405 to detect the amplitude and the phase of the through power and S1406 to check whether the amplitude and the phase of the through power have been detected with respect to all the frequencies.

Through such repetitions, the control unit 110 detects the amplitude and the phase of the through power among all the radio-frequency power units 140*a*, 140*b*, 140*c*, and 140*d* with respect to all the predetermined frequencies for the pre-search process.

Here, although the frequency employed for the actual heating operation is determined in an increment of 1 MHz, the frequency to be predetermined for the pre-search process may be set in an increment of 2 MHz or 5 MHz, skipping the actual frequencies to be measured. The values from the skipped frequencies may be interpolated by approximation on the basis of the measured values. The time necessary for the interpolation is nearly negligible compared with the time for the measurement, and therefore decimating the frequencies to be measured contributes to reducing the time for the pre-search process.

Upon completing the detection of the amplitude and the phase of the reflected power incident into all the radio-frequency power units 140*a*, 140*b*, 140*c*, and 140*d* and those of the through power among all the radio-frequency power units 140*a*, 140*b*, 140*c*, and 140*d* with respect to all the frequencies predetermined for the pre-search process (Yes at step S1406), a matrix can be obtained that represent, using the amplitude and the phase, the reflected power characteristic of the radio-frequency power units 140 and the through power characteristic among the radio-frequency power units 140 with respect to each frequency.

It is to be noted that the procedure up to this stage from the start of the pre-search process correspond to the step S1101 shown in FIG. 4, in which the amplitude and the phase of the reflected power and the through power are detected with respect to each frequency.

FIG. 8 is a table showing an example of the matrix representing the amplitude and the phase of the reflected power incident into each radio-frequency power unit and the through power among the radio-frequency power units, with respect to each frequency.

When the radiation units 150*a*, 150*b*, 150*c*, and 150*d* of the respective radio-frequency power units 140*a*, 140*b*, 140*c*, and 140*d* are regarded as an input/output port of the radio-frequency power, the matrix corresponds to S parameters generally employed to indicate reflection characteristics of the ports of radio-frequency transmission elements such as an amplifier and a filter, and transmission characteristics between those ports. Hereafter, the matrix will be referred to as S parameter 170 (of the radio-frequency heating apparatus 100).

Referring to FIG. 8, a method of calculating the radiation loss by using the S parameter 170 obtained as above will be described below. FIG. 8 represents the case where four radio-frequency power units 140 are employed, i.e., in the case where the radio-frequency power units 140*a*, 140*b*, 140*c*, and 140*d* are denoted, for example, as a first, second, third, and fourth radio-frequency power unit, respectively. FIG. 8 shows the examples of the S parameter obtained as a result of detection of the amplitude M and the phase θ of the reflected power and the through power, upon setting the frequency band for the pre-search process in a range of 2400 MHz to 2500 MHz and sweeping this frequency band at an interval of 1 MHz. Values of the columns headed by the S parameter with the same numerals indicate the reflected power. For example, S11 indicates the reflected power incident into the first radio-frequency power unit 140*a*. Values of the columns headed by the S parameter with different numerals indicate the through power from the radio-frequency power unit 140 corresponding to the latter numeral to the radio-frequency power unit 140 corresponding to the former numeral. For example, S12 indicates the through power from the second radio-frequency power unit 140*b* to the first radio-frequency power unit 140*a*. Performing the quadrature detection sweeping over the frequency range as shown in FIG. 8 provides the S parameters represented by the amplitude M and the phase θ of the reflected power and the through power with respect to each of the frequencies.

amplitude and phase. For example, the radiation loss of the radio-frequency power unit 140*a* can be obtained by summing the S11, S12, 13, and S14 at the frequency set for the radio-frequency power generation unit 120. The total sum of the S parameters can be obtained as a total of the amplitude components when the frequencies are different, and by vector synthesis of the amplitude components and the phase components when the frequency is the same. The smaller the sum of the S parameters is, the smaller the radiation loss is. Hereafter, the radiation loss will be construed as synonymous with the sum of the S parameters.

In this embodiment, all the radio-frequency power units 140*a*, 140*b*, 140*c*, and 140*d* are configured to operate in the same frequency as stated earlier, and hence the total sum of the S parameters can be calculated by vector synthesis of the amplitude components and the phase components. For example, the radiation loss |S11+S12+S13+S14| of the first radio-frequency power unit 140*a* can be expressed as the following equation 1-1, in which $M_{11}$ and $\theta_{11}$ represent the amplitude and phase of the reflected power S11 into the first radio-frequency power unit 140*a*; $M_{12}$ and $\theta_{12}$ represent the amplitude and phase of the through power S12 from the second radio-frequency power unit 140*b* into the first radio-frequency power unit 140*a*; $M_{13}$ and $\theta_{13}$ represent the amplitude and phase of the through power S13 from the third radio-frequency power unit 140*c* into the first radio-frequency power unit 140*a*; and $M_{14}$ and $\theta_{14}$ represents the amplitude and phase of the through power S14 from the fourth radio-frequency power unit 140*d* into the first radio-frequency power unit 140*a*, at a given frequency.

[Math. 1]

$$|S11+S12+S13+S14| = \sqrt{\begin{array}{c}(M_{11}\cdot\sin\theta_{11}+M_{12}\cdot\sin\theta_{12}+M_{13}\cdot\sin\theta_{13}+M_{14}\cdot\sin\theta_{14})^2 + \\ (M_{11}\cdot\cos\theta_{11}+M_{12}\cdot\cos\theta_{12}+M_{13}\cdot\cos\theta_{13}+M_{14}\cdot\cos\theta_{14})^2\end{array}}$$

(Equation 1-1)

For example, S31 corresponding to the frequency of 2402 MHz can be specified as $M_{2402.31}$ in amplitude and phase $\theta_{2402.31}$ in phase.

Now, the radiation loss of the radio-frequency power units 140*a*, 140*b*, 140*c*, and 140*d* at each frequency can be calculated by using the S parameter represented by the detected Likewise, the radiation loss |S21+S22+S23+S24| of the second radio-frequency power unit 140*b*, the radiation loss |S31+S32+S33+S34| of the third radio-frequency power unit 140*c*, and the radiation loss |S41+S42+S43+S44| of the fourth radio-frequency power unit 140*d* can be expressed as the following equations 1-2 to 1-4, like 1-1.

[Math. 2]

$$|S21+S22+S23+S24| = \sqrt{\begin{array}{c}(M_{21}\cdot\sin\theta_{21}+M_{22}\cdot\sin\theta_{22}+M_{23}\cdot\sin\theta_{23}+M_{24}\cdot\sin\theta_{24})^2 + \\ (M_{21}\cdot\cos\theta_{21}+M_{22}\cdot\cos\theta_{22}+M_{23}\cdot\cos\theta_{23}+M_{24}\cdot\cos\theta_{24})^2\end{array}}$$

(Equation 1-2)

[Math. 3]

$$|S31+S32+S33+S34| = \sqrt{\begin{array}{c}(M_{31}\cdot\sin\theta_{31}+M_{32}\cdot\sin\theta_{32}+M_{33}\cdot\sin\theta_{33}+M_{34}\cdot\sin\theta_{34})^2 + \\ (M_{31}\cdot\cos\theta_{31}+M_{32}\cdot\cos\theta_{32}+M_{33}\cdot\cos\theta_{33}+M_{34}\cdot\cos\theta_{34})^2\end{array}}$$

(Equation 1-3)

[Math. 4]

$$|S41 + S42 + S43 + S44| = \qquad\qquad\text{(Equation 1-4)}$$
$$\sqrt{\begin{array}{l}(M_{41}\cdot\sin\theta_{41} + M_{42}\cdot\sin\theta_{42} + M_{43}\cdot\sin\theta_{43} + M_{44}\cdot\sin\theta_{44})^2 + \\ (M_{41}\cdot\cos\theta_{41} + M_{42}\cdot\cos\theta_{42} + M_{43}\cdot\cos\theta_{43} + M_{44}\cdot\cos\theta_{44})^2\end{array}}$$

The total sum of the radiation loss of all the radio-frequency power units 140 expressed by the aforementioned equations 1-1 to 1-4 corresponds to the overall radiation loss of the radio-frequency heating apparatus 100, at the relevant frequency.

Then the control unit 110 estimates radiation efficiency with respect to different phase shift amounts at each frequency (step S1408).

Here, a method of calculating the radiation loss that would arise when different phase shift amounts are assumed to be set for the variable phase shift unit 142 of the respective radio-frequency power units 140 will be described.

Upon changing the phase shift amount realized by the variable phase shift unit 142 of one of the radio-frequency power units 140, the phase of the radio-frequency power, radiated from the radiation unit 150 of the radio-frequency power unit 140 associated with the variable phase shift unit 142 that has changed the phase shift amount, is shifted in the same amount as the phase shift amount realized. For example, upon changing the phase shift amount of the variable phase shift unit 142b of the second radio-frequency power unit 140b by +φ, the phase components of the reflected power S22 into the second radio-frequency power unit 140b, the through power S12 from the second radio-frequency power unit 140b into the first radio-frequency power unit 140a, the through power S32 from the second radio-frequency power unit 140c into the third radio-frequency power unit 140c, and the through power S42 from the second radio-frequency power unit 140b into the fourth radio-frequency power unit 140d are shifted by +φ. Accordingly, the radiation loss of the first radio-frequency power unit 140a in this case can be calculated by substituting $\theta_{m2}+\phi$ for $\theta_{m2}$ (m=1 to 4) of the equations 1-1 to 1-4.

Likewise, for example, when the phase shift amount of the variable phase shift unit 142a of the first radio-frequency power unit 140a is changed by φ1; the phase shift amount of the variable phase shift unit 142b of the second radio-frequency power unit 140b is changed by φ2; the phase shift amount of the variable phase shift unit 142c of the third radio-frequency power unit 140c is changed by φ3; and the phase shift amount of the variable phase shift unit 142d of the fourth radio-frequency power unit 140d is changed by φ4, the radiation loss |S11+S12+S13+S14| of the first radio-frequency power unit 140a, the radiation loss |S21+S22+S23+S24| of the second radio-frequency power unit 140b, the radiation loss |S31+S32+S33+S34| of the third radio-frequency power unit 140c, and the radiation loss |S41+S42+S43+S44| of the fourth radio-frequency power unit 140d can be expressed as the following equations 2-1 to 2-4, respectively.

[Math. 5]

$$|S11 + S12 + S13 + S14| = \qquad\qquad\text{(Equation 2-1)}$$
$$\sqrt{\begin{array}{l}(M_{11}\cdot\sin(\theta_{11} + \phi_1) + M_{12}\cdot\sin(\theta_{12} + \phi_2) + M_{13}\cdot\sin(\theta_{13} + \phi_3) + M_{14}\cdot\sin(\theta_{14} + \phi_4))^2 + \\ (M_{11}\cdot\cos(\theta_{11} + \phi_1) + M_{12}\cdot\cos(\theta_{12} + \phi_2) + M_{13}\cdot\cos(\theta_{13} + \phi_3) + M_{14}\cdot\cos(\theta_{14} + \phi_4))^2\end{array}}$$

[Math. 6]

$$|S21 + S22 + S23 + S24| = \qquad\qquad\text{(Equation 2-2)}$$
$$\sqrt{\begin{array}{l}(M_{21}\cdot\sin(\theta_{21} + \phi_1) + M_{22}\cdot\sin(\theta_{22} + \phi_2) + M_{23}\cdot\sin(\theta_{23} + \phi_3) + M_{24}\cdot\sin(\theta_{24} + \phi_4))^2 + \\ (M_{21}\cdot\cos(\theta_{21} + \phi_1) + M_{22}\cdot\cos(\theta_{22} + \phi_2) + M_{23}\cdot\cos(\theta_{23} + \phi_3) + M_{24}\cdot\cos(\theta_{24} + \phi_4))^2\end{array}}$$

[Math. 7]

$$|S31 + S32 + S33 + S34| = \qquad\qquad\text{(Equation 2-3)}$$
$$\sqrt{\begin{array}{l}(M_{31}\cdot\sin(\theta_{31} + \phi_1) + M_{32}\cdot\sin(\theta_{32} + \phi_2) + M_{33}\cdot\sin(\theta_{33} + \phi_3) + M_{34}\cdot\sin(\theta_{34} + \phi_4))^2 + \\ (M_{31}\cdot\cos(\theta_{31} + \phi_1) + M_{32}\cdot\cos(\theta_{32} + \phi_2) + M_{33}\cdot\cos(\theta_{33} + \phi_3) + M_{34}\cdot\cos(\theta_{34} + \phi_4))^2\end{array}}$$

[Math. 8]

$$|S41 + S42 + S43 + S44| = \qquad\qquad\text{(Equation 2-4)}$$
$$\sqrt{\begin{array}{l}(M_{41}\cdot\sin(\theta_{41} + \phi_1) + M_{42}\cdot\sin(\theta_{42} + \phi_2) + M_{43}\cdot\sin(\theta_{43} + \phi_3) + M_{44}\cdot\sin(\theta_{44} + \phi_4))^2 + \\ (M_{41}\cdot\cos(\theta_{41} + \phi_1) + M_{42}\cdot\cos(\theta_{42} + \phi_2) + M_{43}\cdot\cos(\theta_{43} + \phi_3) + M_{44}\cdot\cos(\theta_{44} + \phi_4))^2\end{array}}$$

The radiation loss of the respective radio-frequency power units 140 that would arise when the phase shift amount of the variable phase shift unit 142 of the respective radio-frequency power units 140 is changed by a given value can be calculated in accordance with those equations 2-1 to 2-4.

Accordingly, the radiation loss of each of the radio-frequency power units 140 can be obtained by calculation with respect to the frequency and the combinations of the phase shift amounts of the variable phase shift unit 142.

Figure 9:
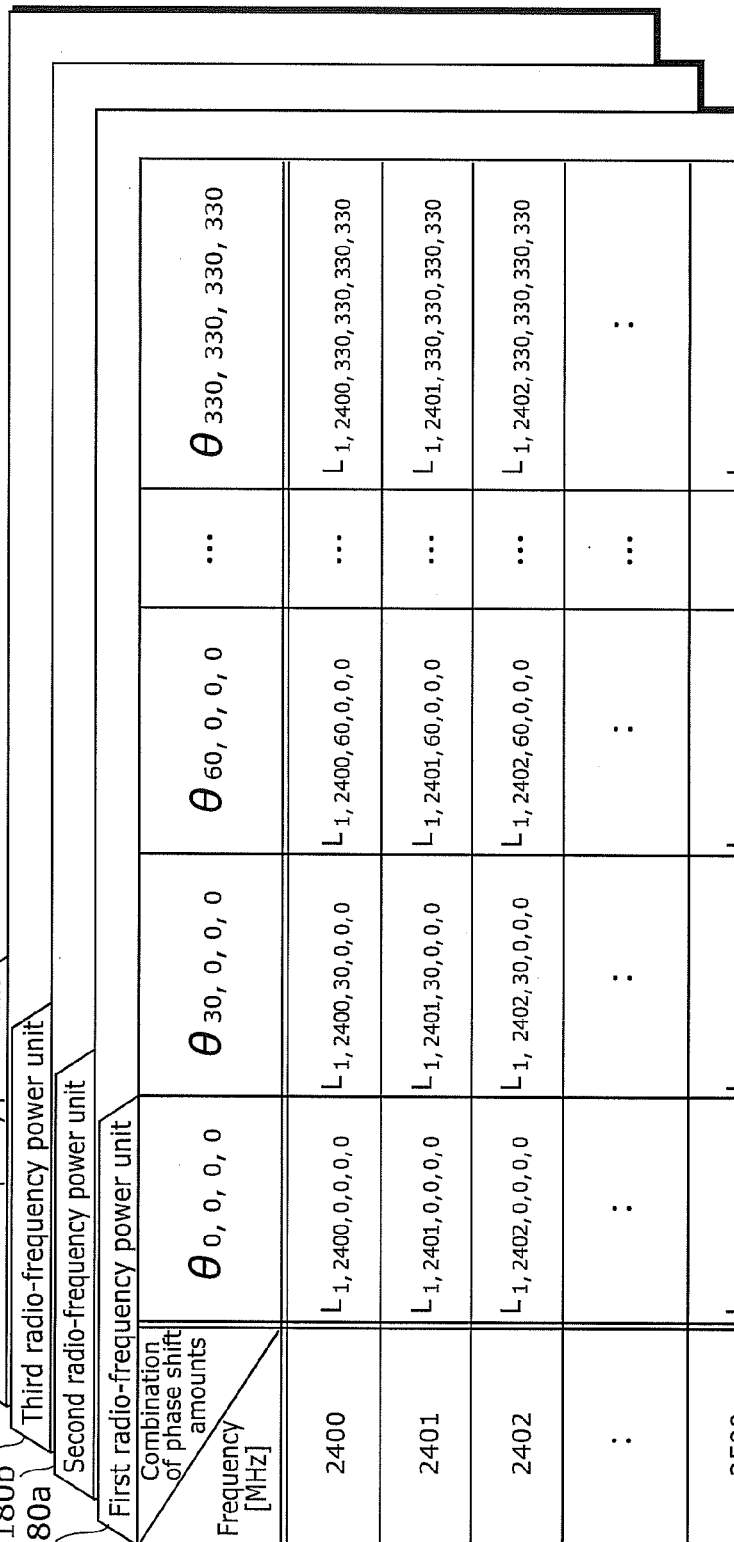
FIG. 9 is a table showing radiation loss of each radio-frequency power unit calculated on the basis of frequencies and combinations of phase shift amounts.

FIG. 9 is a table showing the radiation loss of each radio-frequency power unit 140 calculated with respect to the frequency and the combinations of the phase shift amounts. More specifically, FIG. 9 shows the radiation loss 180a of the first radio-frequency power unit, the radiation loss 180b of the second radio-frequency power unit, the radiation loss 180c of the third radio-frequency power unit, and the radiation loss 180d of the fourth radio-frequency power unit.

In FIG. 9, the combinations of the phase shift amounts of the variable phase shift units 142a to 142d are expressed as $\theta_{ps1, ps2, ps3, ps4}$, where ps1 represents the phase shift amount of the variable phase shift unit 142a, ps2 represents that of the variable phase shift unit 142b, ps3 represents that of the variable phase shift unit 142c, and ps4 represents that of the variable phase shift unit 142d. The radiation loss is expressed as $L_{u, f, ps1, ps2, ps3, ps4}$, where u represents the radio-frequency power unit (for example, 1 corresponds to first radio-frequency power unit 140a), and f represents the frequency (MHz).

In the case where the phase shift amount of the variable phase shift units 142a to 142d has been set, for example, as 0 degree through the aforementioned process (steps S1401 to S1407), the radiation loss represented by the combination of the phase shift amounts $\theta_{0, 0, 0, 0}$ shown in FIG. 9 corresponds to the radiation loss obtained through the actual measurement. In other words, the radiation losses represented by the combinations of the phase shift amounts other than the combination $\theta_{0, 0, 0, 0}$ are the radiation losses obtained by calculation.

As described above, the radio-frequency heating apparatus 100 according to the embodiment 1 is capable of estimating by calculation the radiation loss of each of the first to the fourth radio-frequency power units 140a to 140d that would arise from different combinations of the phase shift amounts of the variable phase shift units 142a to 142d, on the basis of the actually measured radiation loss of each of the first to the fourth radio-frequency power units 140a to 140d.

In other words, the radio-frequency heating apparatus 100 can obtain the radiation loss of each of the first to the fourth radio-frequency power units 140a to 140d that would arise from different combinations of the phase shift amounts, without the need to actually perform the measurement of the radiation loss with respect to all the combinations of the phase shift amounts of the variable phase shift units 142a to 142d. Such an arrangement contributes to significantly shortening the time necessary for obtaining the radiation loss of each of the first to the fourth radio-frequency power units 140a to 140d, compared with actually measuring the radiation loss with respect to different combinations of the phase shift amounts in order to obtain the radiation loss of each of the first to the fourth radio-frequency power units 140a to 140d that would arise from those different combinations of the phase shift amounts.

The control unit 110 now calculates the overall radiation loss of the radio-frequency heating apparatus 100, on the basis of the radiation loss of the respective radio-frequency power units 140 shown in FIG. 9.

FIG. 10 is a table showing the overall radiation loss of the radio-frequency heating apparatus 100 calculated on the basis of the frequency and the combinations of the phase shift amounts.

The overall radiation loss 190 of the radio-frequency heating apparatus 100 shown in FIG. 10 is expressed as $L_{sum, f, ps1, ps2, ps3, ps4}$. This value corresponds to the total sum of the radiation loss 180a of the first radio-frequency power unit, the radiation loss 180b of the second radio-frequency power unit, the radiation loss 180c of the third radio-frequency power unit, and the radiation loss 180d of the fourth radio-frequency power unit, shown in FIG. 9.

Through the procedure of estimating the radiation efficiency with different phase shift amounts at each frequency as above (step S1408), the control unit 110 calculates the overall radiation loss of the radio-frequency heating apparatus 100 that would arise when a given combination of the phase shift amounts of the respective variable phase shift units 142a, 142b, 142c, and 142d is assumed to be adopted for heating, on the basis of the actually measured amplitude and phase of the reflected power and the through power of the respective radio-frequency power units 140. The radiation efficiency of the radio-frequency heating apparatus 100 can thus be estimated.

The control unit 110 then determines the frequency and the combination of the phase shift amounts that provide the best radiation efficiency of the radio-frequency heating apparatus 100 (step S1409). In other words, the control unit 110 determines the frequency and the combination of the phase shift amounts that provide the smallest overall radiation loss 190 of the radio-frequency heating apparatus.

Thereafter, the control unit 110 sets the frequency and the phase shift amount determined at the step S1409 as the frequency of the radio-frequency power to be generated by the radio-frequency power generation unit 120 and the phase shift amount of each of the variable phase shift units 142a, 142b, 142c, and 142d (step S1410), and finishes the pre-search process.

As described above, in the pre-search process the radiation loss that would arise when a given frequency of the radio-frequency power generation unit 120 and a given combination of the phase shift amounts of the variable phase shift units 142a, 142b, 142c, and 142d are assumed to be adopted for heating is calculated, on the basis of the individual detection results of the amplitude and the phase of the reflected power and the through power from each of the radio-frequency power units 140 at the set frequencies. Accordingly, the frequency of the radio-frequency power generation unit 120 and the combination of the phase shift amounts of the variable phase shift units 142a, 142b, 142c, and 142d that provide the best overall radiation efficiency of the radio-frequency heating apparatus 100 can be determined by merely performing the actual measurement with respect to one combination of the phase shift amounts, as a minimum.

Therefore, as mentioned above, the time necessary for determining the best condition can be significantly shortened, compared with the case where the actual measurement is performed with respect to all the frequencies of the radio-frequency power generation unit 120 and all the combinations of the phase shift amounts of the variable phase shift units 142a, 142b, 142c, and 142d. Consequently, the pre-search process for determining the optimum frequency condition can be performed in a short time, before the user presses the start button of the radio-frequency heating apparatus 100 to proceed to the actual heating operation.

It will now be assumed that the frequency can be set at 101 points between 2.4 GHz and 2.5 GHz at an increment of 1 MHz and the phase shift amount can be set at 12 points from 0 to 360 degrees at intervals of 30 degrees, and that four radio-frequency power units 140 are employed. With the currently available technique it takes approximately 0.1 ms for performing the measurement of one frequency point, and hence it takes approximately 210 seconds ($12^4 \times 101$) to complete the measurement of all the combinations of those points. In other words, in the case where the measurement is actually performed with respect to all the combinations of the phase shift amounts of the variable phase shift units 142 of each of the frequency power units 140 at all the frequency points of the radio-frequency power generation unit 120, it takes as long as approximately 210 seconds before the user can start the actual heating operation.

In contrast, the radio-frequency heating apparatus 100 according to this embodiment only detects the in-phase detection signal and the quadrature detection signal of the reflected power and the through power at the radio-frequency power units 140 at the 101 points in the frequency band of 2.4 GHz to 2.5 GHz with the phase shift amount of the variable phase shift units 142 of each radio-frequency power unit 140 set at a given point, and then calculates the amplitude and the phase. Accordingly, the amplitude and the phase of the backward power originating from reflection, as well as the amplitude and the phase of the through-passing backward power can be obtained at each of the frequencies only in approx. 40 ms necessary for measuring 101×4 points. After obtaining the S parameters represented by the amplitude and the phase of those 101×4 points, the frequency of the radio-frequency power generation unit 120 and the phase shift amount of the variable phase shift units 142 that provide the optimum radiation efficiency can be determined by the calculation performed by the control unit 110, which is by far quicker than the actual measurement, and therefore a preparation time of one second or shorter, generally accepted as stand-by time by consumers, can well be achieved.

Further, a vector synthesis method can be incorporated in the calculation process of the optimum combination of the phase shift amounts of each of the variable phase shift units 142a, 142b, 142c, and 142d, to thereby reduce the number of arithmetic steps, thus further reducing the calculation time.

For example, it is assumed that a vector having an amplitude of $M_1$ and a phase of $\theta_1$ and a vector having an amplitude of $M_2$ and a phase of $\theta_2$ are to be synthesized. According to the vector synthesis theory, when the phases of the two vectors are the same, i.e., $\theta_1=\theta_2$, the magnitude of the synthesized vector is expressed by $M_1+M_2$ which is largest, and when the phases of the two vectors are different by 180 degrees, i.e., $|\theta_1-\theta_2|=180°$, the magnitude of the synthesized vector is expressed by $|M_1-M_2|$ which is smallest. In the case of $M_1=M_2$, the magnitude of the synthesized vector becomes 0.

The control unit 110 may utilize the aforementioned theory to thereby reduce the number of arithmetic steps thus shortening the calculation time, on the basis of the in-phase detection signals I and the quadrature detection signals Q of the reflected power and the through power detected at the respective radio-frequency power units 140. For example, the vectors may be grouped into the vector having the largest amplitude and other vectors, and the phase shift amount may be determined such that the difference in phase between the vector having the largest amplitude and the synthesized vector of all the other vectors becomes 180 degrees, and that the magnitude of the vector having the largest amplitude and that of the synthesized vector of all the other vectors become equal. In this case, the value to be set as the phase shift amount that makes the synthesized vector of all the vectors smallest, i.e., that makes the radiation loss minimum, can be obtained without the need to calculate with respect to all the possible combinations of the phase shift amounts in a round robin format.

Figure 11:
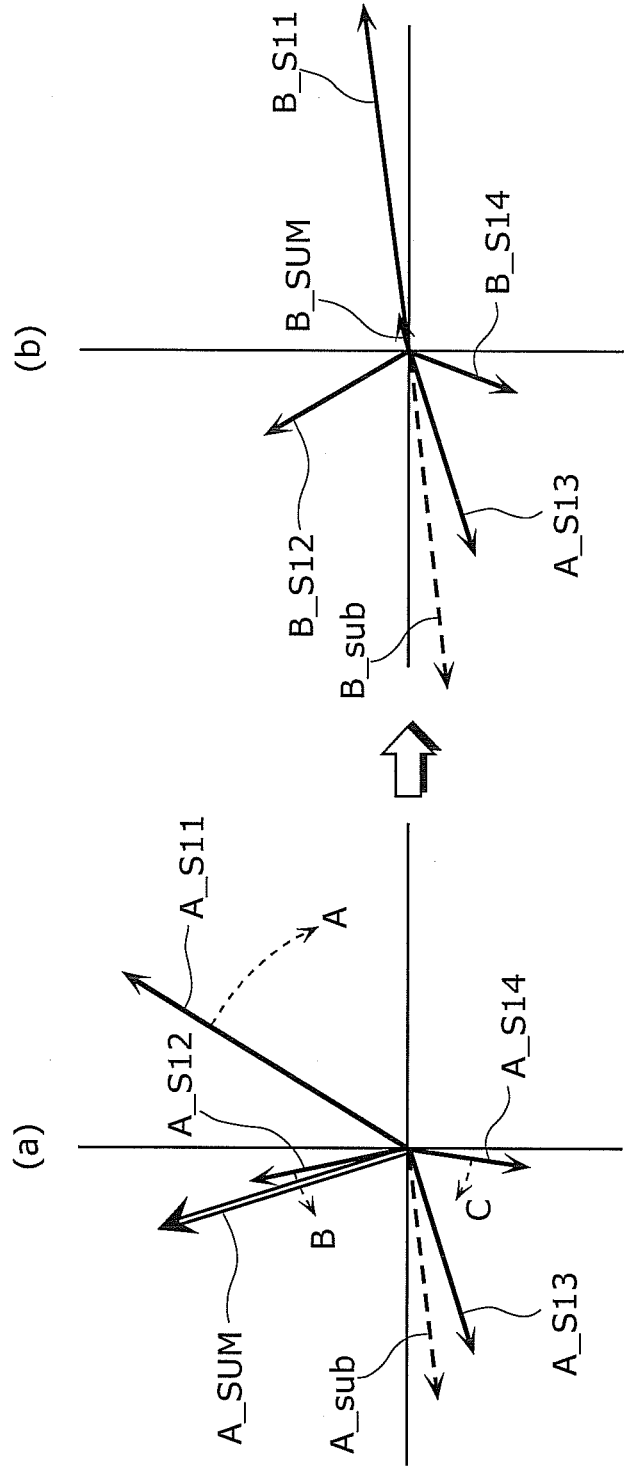
FIG. 11 shows diagrams for explaining combinations of the phase shift amounts on the basis of a vector synthesis method.

FIG. 11 shows diagrams for explaining the combination of the phase shift amounts on the basis of the vector synthesis method.

Referring to FIG. 11, a specific example of the method of determining the combination of the phase shift amounts that makes the radiation loss minimum utilizing the theory of the vector synthesis will be described here below.

FIG. 11(a) illustrates vectors representing the amplitude and the phase of the backward power detected by the quadrature detection unit 145a of the first radio-frequency power unit 140a under a certain condition. More specifically, FIG. 11(a) shows a vector A_S11 of the reflected power into the first radio-frequency power unit 140a, a vector A_S12 of the through power from the second radio-frequency power unit 140b into the first radio-frequency power unit 140a, a vector A_S13 of the through power from the third radio-frequency power unit 140c into the first radio-frequency power unit 140a, and a vector A_S14 of the through power from the fourth radio-frequency power unit 140d into the first radio-frequency power unit 140a, as well as a synthesized vector A_SUM of the vectors A_S11, A_S12, A_S13, A_S14 respectively representing the four backward powers. The length of the arrow represents the magnitude, and the angle of the arrow represents the phase of the vectors. The magnitude of the synthesized vector A_SUM of the vectors A_S11, A_S12, A_S13, A_S14 of the four backward powers corresponds to the radiation loss of the first radio-frequency power unit 140a, and hence reducing the size of the synthesized vector A_SUM results in reducing the radiation loss of the first radio-frequency power unit 140a.

The detected four vectors are grouped into the vector A_S11 which is the largest and the remaining vectors A_S12, A_S13, A_S14, and the group of the vectors A_S12, A_S13, A_S14 is synthesized to calculate the magnitude and the phase of a sub-synthesized vector A_sub.

Then the phase shift amount of the variable phase shift unit 142a of the first radio-frequency power unit 140a is determined, such that the difference in phase between the largest vector A_S11 and the sub-synthesized vector A_sub becomes 180 degrees (as broken-line arrow A).

After that, the phase shift amounts of the variable phase shift unit 142b of the second radio-frequency power unit 140b and the variable phase shift unit 142d of the fourth radio-frequency power unit 140d are respectively determined such that the magnitude of the sub-synthesized vector A_sub becomes equal to the magnitude of the largest vector A_S11 (as broken-line arrows B and C).

FIG. 11(b) shows vectors representing the amplitude and the phase of the backward power that are detected by the quadrature detection unit 145a of the first radio-frequency power unit 140a in the case where the phase shift amounts determined as above are respectively set in each of the variable phase shift units 142. More specifically, FIG. 11(b) shows a vector B_S11 of the reflected power into the first radio-frequency power unit 140a, a vector B_S12 of the through power from the second radio-frequency power unit 140b into the first radio-frequency power unit 140a, the vector A_S13 of the through power from the third radio-frequency power unit 140c into the first radio-frequency power unit 140a, and the vector B_S14 of the through power from the fourth radio-frequency power unit 140d into the first radio-frequency power unit 140a, as well as a synthesized vector B_SUM of the vectors B_S11, B_S12, A_S13, B_S14 of the four backward powers. The vector B_S11 which is the largest and a sub-synthesized vector B_sub of the remaining vectors B_S12, A_S13, B_S14 are substantially the same in magnitude and define a phase difference of approximately 180 degrees, and the magnitude of the synthesized vector B_SUM representing the four backward powers is far smaller than that of the synthesized vector A_SUM representing the four backward powers before setting the phase shift amounts. This means that the radiation loss of the first radio-frequency power unit 140*a* has been significantly reduced.

Although the detection of the amplitude and the phase of all the reflected powers is followed by the detection of the amplitude and the phase of all the through powers according to this embodiment, the detection of the amplitude and the phase of all the reflected powers may be preceded by the detection of the amplitude and the phase of all the through powers, or the amplitude and the phase of the reflected power and those of the through power may be alternately detected. From the radio-frequency power unit 140 that is radiating the radio-frequency power, the amplitude and the phase of the reflected power can be detected while detecting those of the through power. Therefore, the amplitude and the phase of the reflected power and those of the through power may be simultaneously detected from such radio-frequency power units 140.

[Re-search Process]

Figure 12:
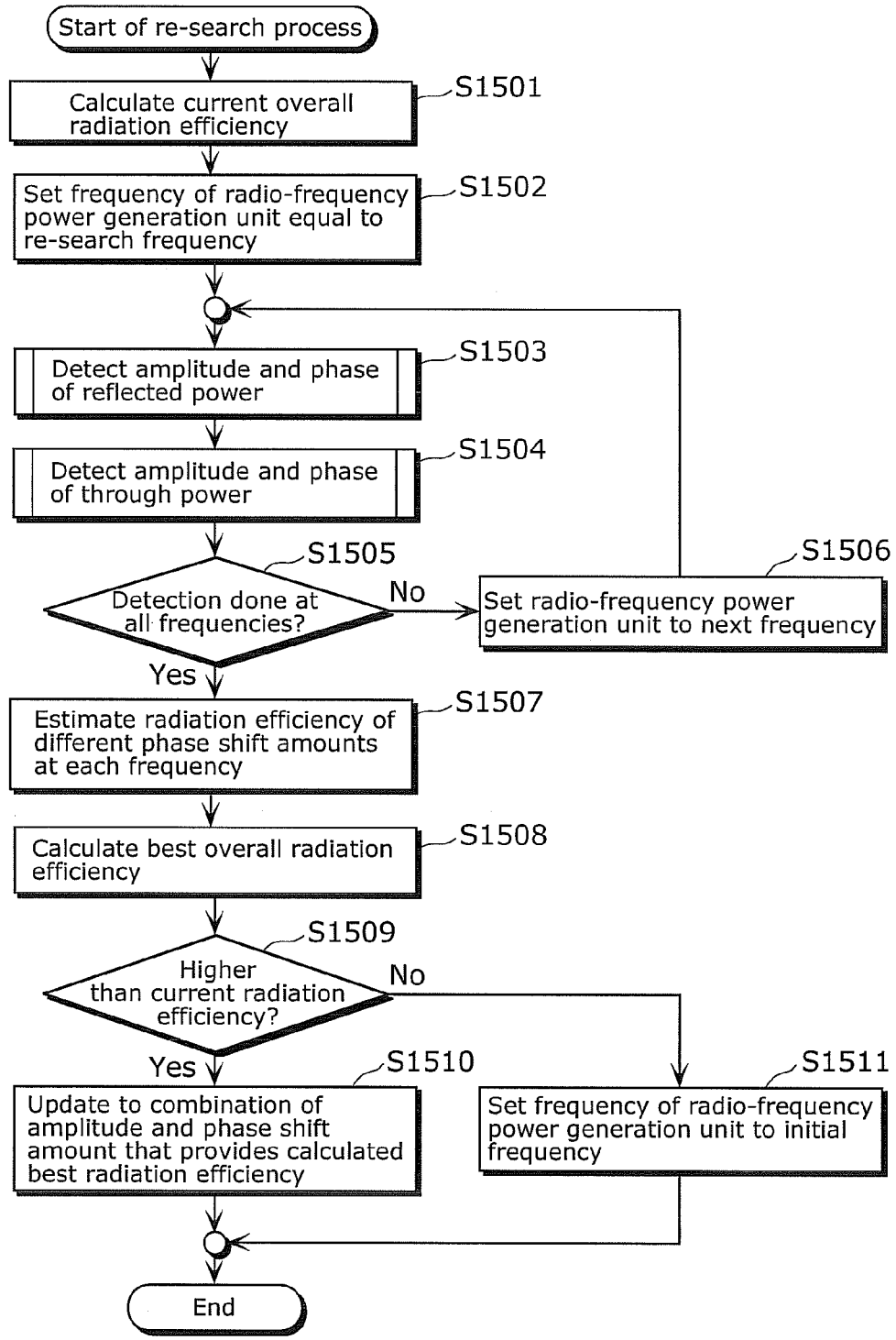
FIG. 12 is a flowchart showing a procedure for performing a re-search process.

FIG. 12 is a flowchart showing a procedure of a re-search process to be performed by the radio-frequency heating apparatus 100 according to the embodiment 1.

The control unit 110 of the radio-frequency heating apparatus 100 performs the re-search process during a heating operation, as described here below.

As shown in FIG. 12, the control unit 110 first detects the amplitude and the phase of the reflected power and the through power of the radio-frequency power units 140*a*, 140*b*, 140*c*, and 140*d*, at the frequency and the phase shift amount actually adopted for heating, in accordance with the aforementioned detection procedure of the reflected power and the through power, and calculates the overall radiation efficiency of the radio-frequency heating apparatus 100 (step S1501).

Then the control unit 110 sets a predetermined frequency for the re-search process as the frequency for the radio-frequency power generation unit 120 (step S1502), and detects the amplitude and the phase of the reflected power incident into all the radio-frequency power units 140*a*, 140*b*, 140*c*, and 140*d*, in accordance with the aforementioned detection procedure of the reflected power (step S1503).

The control unit 110 also detects the amplitude and the phase of the through power among all the radio-frequency power units 140*a*, 140*b*, 140*c*, and 140*d*, in accordance with the aforementioned detection procedure of the through power (step S1504).

Thereafter, the control unit 110 checks whether the detection has been completed with respect to all the frequencies predetermined for the re-search process (step S1505). In the case where the detection has not been completed (No at step S1505), the control unit 110 sets a next predetermined frequency for the re-search process as the frequency of the radio-frequency power to be generated by the radio-frequency power generation unit 120 (step S1506), and repeats the steps S1503 and S1504 to detect the amplitude and the phase of the reflected power and those of the through power.

Through the repetitions of the aforementioned procedure, the control unit 110 detects the amplitude and the phase of the reflected power and those of the through power of all the radio-frequency power units 140*a*, 140*b*, 140*c*, and 140*d*, with respect to all the frequencies predetermined for the re-search process.

Upon completing the detection of the amplitude and the phase of the reflected power and those of the through power of all the radio-frequency power units 140*a*, 140*b*, 140*c*, and 140*d* with respect to all the frequencies predetermined for the re-search process (Yes at step S1505), the control unit 110 estimates by calculation the radiation loss that would arise when a given frequency of the radio-frequency power generation unit 120 and a given combination of the phase shift amounts of the respective variable phase shift units 142*a*, 142*b*, 142*c*, and 142*d* are assumed to be adopted for heating, as described referring to the pre-search process, on the basis of the information of the amplitude and the phase of the reflected power and the through power (step S1507). Here, the specific procedure at the step S1507 is similar to the step S1408 shown in FIG. 7 for estimating the radiation efficiency resulting from different phase shift amounts at each frequency.

Then the control unit 110 calculates the values that provide the best overall radiation efficiency of the radio-frequency heating apparatus 100 (step S1508).

After that, the control unit 110 compares the values that provide the best overall radiation efficiency of the radio-frequency heating apparatus 100 obtained through the re-search process (values calculated at step S1508) with the current values realizing the overall radiation efficiency of the radio-frequency heating apparatus 100, calculated earlier (value calculated at step S1501) (step S1509).

In the case where the values that provide the best overall radiation efficiency obtained through the re-search process result in radiation efficiency higher than the current radiation efficiency calculated earlier, the control unit 110 sets the frequency and the combination of the phase shift amounts calculated through the re-search process, which provide the best radiation efficiency, for the radio-frequency power generation unit 120 and the variable phase shift units 142*a* to 142*d* (step S1510). In other words, the control unit 110 updates the frequency of the radio-frequency power generation unit 120 and the phase shift amounts of the variable phase shift units 142*a* to 142*d*. On the contrary, in the case where the values realizing the current radiation efficiency calculated earlier provide higher radiation efficiency than the values that provide the best radiation efficiency calculated through the re-search process, the control unit 110 sets the frequency of the radio-frequency power generation unit 120 at the frequency adopted before performing the re-search process (step S1511).

Here, although the values obtained through the re-search process, which provide the best radiation efficiency under a certain condition of the frequency and the phase, result in higher radiation efficiency than the current one, it is not necessary to adopt the values from the re-search process in the case where, for example, the level of the backward power into one of the radio-frequency power units 140 exceeds a predetermined threshold. In other words, the conditions that provide the optimum radiation efficiency may be adopted from among the conditions that can keep the level of the backward power into the respective radio-frequency power units 140 within the predetermined threshold. Such a threshold may be determined, for example, in accordance with stand voltages of amplifiers at each frequency, so as to prevent a failure of the amplifier containing a semiconductor device.

Thus, the radio-frequency heating apparatus 100 according to this embodiment can constantly heat the object under the optimum heating condition by performing the re-search process, even though the optimum heating condition fluctuates because of a change in temperature and shape of the object during the heating operation.

In addition, when calculating the best overall radiation efficiency of the radio-frequency heating apparatus 100 at the step S1508, the control unit 110 may calculate the radiation loss that would arise when a given frequency of the radio-frequency power generation unit 120 and a given combination of the phase shift amounts of the variable phase shift units 142*a*, 142*b*, 142*c*, and 142*d* are assumed to be adopted for heating, on the basis of the individual detection results of the amplitude and the phase of the reflected power and the through power from each of the radio-frequency power units 140 at the set frequencies, to thereby determine the frequency of the radio-frequency power generation unit 120 and the phase shift amounts of the variable phase shift units 142*a*, 142*b*, 142*c*, and 142*d* that provide the best radiation efficiency. In this case, as mentioned above, the time necessary for determining the best condition can be significantly shortened, compared with the case where the actual measurement is performed with respect to all the frequencies of the radio-frequency power generation unit 120 and all the combinations of the phase shift amounts of the variable phase shift units 142*a*, 142*b*, 142*c*, and 142*d*. Consequently, the re-search process can be performed in a short time, which results in shortened extension of the heating time required for modifying the heating time because of the temperature change of the object, and in reduced stand-by time of the user before the heating is finished.

To determine the timing for activating the re-search process, the level of the output power of the radio-frequency power units 140, calculated from the amplitude and the phase of the reflected power detected by acquiring the in-phase detection signals I(1) to I(4) and the quadrature detection signals Q(1) to Q(4) from the respective radio-frequency power units 140*a*, 140*b*, 140*c*, and 140*d* may be compared with a predetermined threshold constantly or periodically during the heating operation, so as to perform the re-search process in the case where the power level of the backward power into at least one of the radio-frequency power units 140 has exceeded the threshold.

Thus, the radio-frequency heating apparatus 100 according to this embodiment can constantly heat the object under the optimum heating condition by setting the predetermined threshold and performing the re-search process as above when the threshold is exceeded, despite the fluctuation of the values of the reflected power and the through power originating from a change in temperature and shape of the object.

Further, in order to prevent a malfunction of the radio-frequency heating apparatus 100, especially the amplifier containing a semiconductor device, because of an excessive reflected power or through power, the control unit 110 may control, during the pre-search or re-search process, the amplification gain of the radio-frequency power amplification units 143*a*, 143*b*, 143*c*, and 143*d* such that the radio-frequency power to be output from the respectively corresponding radio-frequency power units 140*a*, 140*b*, 140*c*, and 140*d* becomes smaller than the radio-frequency power to be outputted in the actual heating operation.

Thus, the radio-frequency heating apparatus 100 according to this embodiment is configured to heat the object placed in the heating chamber, and includes at least one radio-frequency power generation unit 120 configured to generate radio-frequency power of a set frequency; the variable phase shift units 142*a* to 142*d* configured to change the phase of the radio-frequency power generated by the radio-frequency power generation unit 120; the plurality of radio-frequency power units 140*a* to 140*d* each including the radio-frequency power unit 150 configured to radiate the radio-frequency power of the phase changed by the variable phase shift units 142*a* to 142*d* to the heating chamber, and the backward power detection unit configured to detect the backward power composed of a part of the radio-frequency power radiated from the radiation unit 150 and incident into the radiation unit from the heating chamber; and the control unit 110 configured to set a frequency for the radio-frequency power generation unit 120 and a phase shift amount for each of the variable phase shift units 142*a* to 142*d*. Here, the backward power detection unit corresponds to the directional coupling unit 144 and the quadrature detection unit 145, as stated earlier.

The quadrature detection unit 145 is configured to detect the amplitude and the phase of the reflected wave constituting the backward power inputted by reflection to the radiation unit 150 of one of the radio-frequency power units 140, and the amplitude and the phase of the through wave constituting the backward power inputted to the radiation unit 150 of the one of the radio-frequency power units 140, the reflected wave being part of the radio-frequency power radiated from the radiation unit 150 of the one of the radio-frequency power units 140 at a frequency set for the radio-frequency power generation unit 120 by the control unit 110, and the through wave being part of the radio-frequency power radiated from the radiation unit 150 of another one of the radio-frequency power units 140.

The control unit 110 is configured to sequentially set a plurality of frequencies for the radio-frequency power generation unit 120; cause the quadrature detection unit 145 of each of the radio-frequency power units 140 to detect the amplitude and the phase of the reflected wave and the amplitude and the phase of the through wave with respect to each of the set frequencies; determine the frequency of the radio-frequency power to be generated by the radio-frequency power generation unit 120 and the phase shift amount of the variable phase shift units for heating the object, on the basis of the detected amplitude and phase of the plurality of reflected waves and the detected amplitude and phase of the through waves; and set the determined frequency and phase shift amount for the radio-frequency power generation unit 120 and the variable phase shift units 142*a* to 142*d*.

The configuration described above allows the radiation loss of each of the first to the fourth radio-frequency power units 140*a* to 140*d* resulting from different combinations of the phase shift amounts of the variable phase shift units 142*a* to 142*d* to be obtained in a short time, on the basis of the actually measured radiation loss of each of the first to the fourth radio-frequency power units 140*a* to 140*d*. Consequently, the optimum frequency and combination of the phase shift amounts can be determined in a short time, before the user presses the start button of the radio-frequency heating apparatus 100 to proceed to the actual heating operation, so that the user can enjoy improved convenience for use.

Further, the radio-frequency heating apparatus 100 according to the embodiment 1 includes a single radio-frequency power generation unit 120, and all the radio-frequency power units 140 operate at the same frequency, which minimizes the number of parameters for determining the heating condition. In other words, it suffices to change only the frequency of the radio-frequency power generation unit 120 in the actual measurement, and therefore the number of measurement steps can be minimized and the heating condition can be determined through a simple operation. Consequently, the pre-search and the re-search processes can be performed in a significantly short time.

[Embodiment 2]

A radio-frequency heating apparatus according to this embodiment is different in including two radio-frequency power generation units, from the radio-frequency heating apparatus 100 according to the embodiment 1 which includes just one radio-frequency power generation unit 120. Such a configuration allows the frequencies of the two radio-frequency power generation units to be individually set, thereby further improving the optimum radiation efficiency.

Hereafter, the radio-frequency heating apparatus according to this embodiment will be described focusing on the difference from the radio-frequency heating apparatus 100 according to the embodiment 1, referring to the drawings. In the description of the embodiment 2, the constituents that have the same function as those of the embodiment 1 will be given the same numeral, and the description thereof will not be repeated. Likewise, the description will not be repeated regarding the process that provides the effects similar to those of the embodiment 1.

Figure 13:
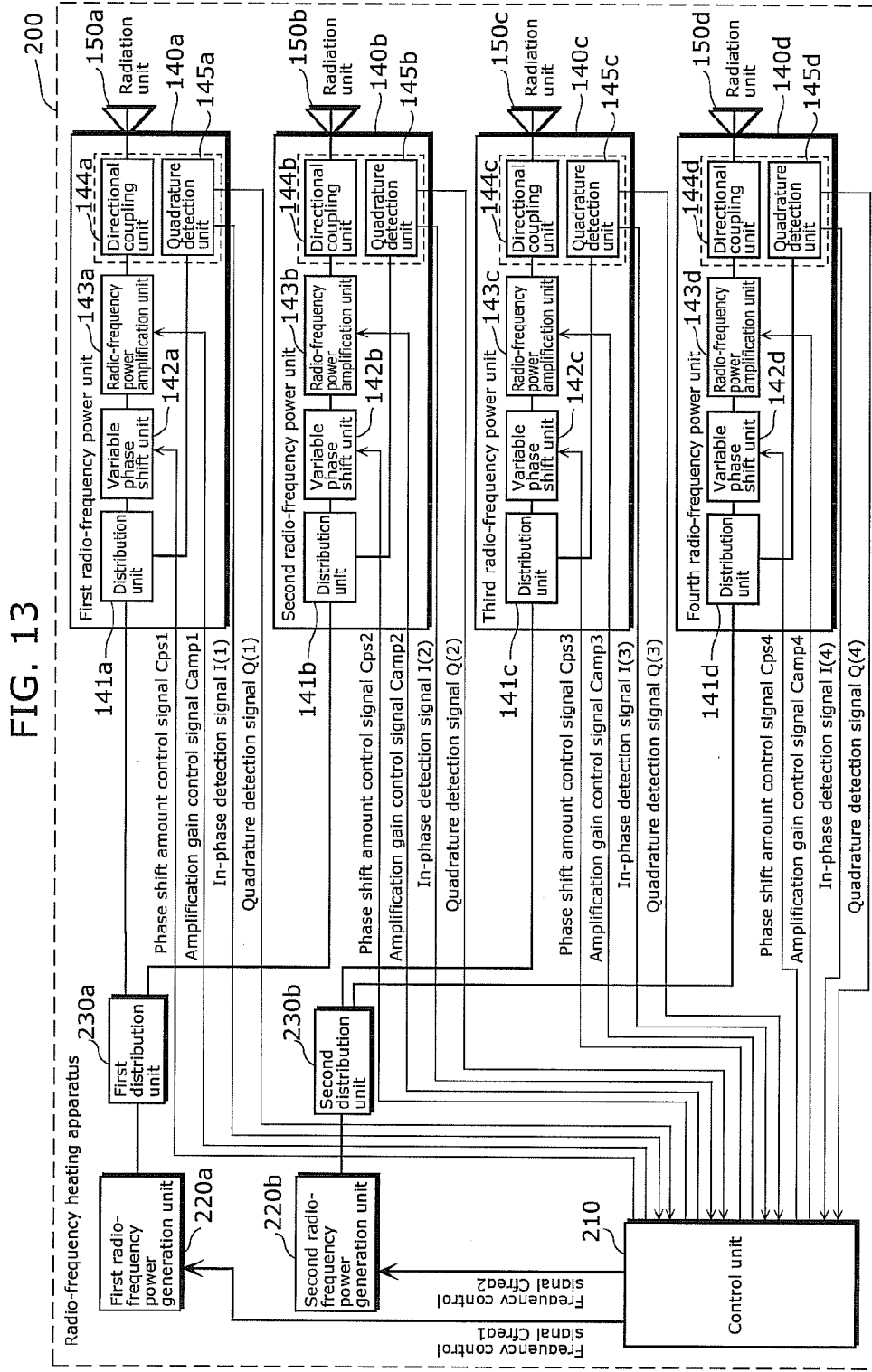
FIG. 13 is a block diagram showing a general configuration of a radio-frequency heating apparatus according to an embodiment 2.

FIG. 13 is a block diagram showing a general configuration of the radio-frequency heating apparatus according to the embodiment 2 of the present invention.

The radio-frequency heating apparatus 200 shown in FIG. 13 includes, in contrast to the radio-frequency heating apparatus 100 according to the embodiment 1 shown in FIG. 1, a first radio-frequency power generation unit 220a and a second radio-frequency power generation unit 220b in place of the radio-frequency power generation unit 120, a first distribution unit 230a and a second distribution unit 230b in place of the distribution unit 130, and a control unit 210 instead of the control unit 110.

The first radio-frequency power generation unit 220a generates radio-frequency power of a frequency designated by the frequency control signal Cfreq1 inputted from the control unit 210. The generated radio-frequency power is split by the first distribution unit 230a and inputted to the first radio-frequency power unit 140a and the second radio-frequency power unit 140b. In other words, the first radio-frequency power generation unit 220a supplies the radio-frequency power to the first and the second radio-frequency power unit 140a and 140b.

The second radio-frequency power generation unit 220b generates radio-frequency power of a frequency designated by the frequency control signal Cfreq2 inputted from the control unit 210. The generated radio-frequency power is split by the first distribution unit 230b and inputted to the third radio-frequency power unit 140c and the fourth radio-frequency power unit 140d. In other words, the second radio-frequency power generation unit 220b supplies the radio-frequency power to the third and the fourth radio-frequency power unit 140c and 140d. Hereinafter, the first radio-frequency power generation unit 220a and the second radio-frequency power generation unit 220b may be simply referred to as radio-frequency power generation unit 220a and radio-frequency power generation unit 220b.

The control unit 210 outputs the frequency control signal Cfreq1 and the frequency control signal Cfreq2 to the two radio-frequency power generation units, namely the first radio-frequency power generation unit 220a and the second radio-frequency power generation unit 220b, in contrast to the control unit 110 shown in FIG. 1. Thus, the control unit 210 sets the frequency of the radio-frequency power to be generated by the first radio-frequency power generation unit 220a and the frequency of the radio-frequency power to be generated by the second radio-frequency power generation unit 220b, independently from each other. Here, setting the frequency independently from each other means that the frequency of the radio-frequency power to be generated by the first radio-frequency power generation unit 220a does not depend on the frequency of the radio-frequency power to be generated by the second radio-frequency power generation unit 220b. In other words, the frequency of the two radio-frequency powers may be either equal or different.

The basic controlling procedure of the radio-frequency heating apparatus 200 according to this embodiment is similar to that of the radio-frequency heating apparatus 100 according to the embodiment 1. However, in the radio-frequency heating apparatus 200 according to this embodiment shown in FIG. 13 the first and the second radio-frequency power unit 140a, 140b operate at the frequency generated by the first radio-frequency power generation unit 220a and the third and the fourth radio-frequency power unit 140c, 140d operate at the frequency generated by the second radio-frequency power generation unit 220b, in contrast to the radio-frequency heating apparatus 100 shown in FIG. 1 in which all the radio-frequency power units 140a, 140b, 140c, and 140d operate at the same frequency.

With such a configuration, when the radio-frequency power is radiated actually changing the frequency of the radio-frequency power generation units, namely the first radio-frequency power generation unit 220a and the second radio-frequency power generation unit 220b, the amplitude and the phase of the backward power inputted by reflection and those of the through-passing backward power corresponding to combinations of frequencies of each of the radio-frequency power generation units 220a and 220b can be detected (obtained), on the basis of the in-phase detection signals I(1) to I(4) and the quadrature detection signals Q(1) to Q(4) detected by the quadrature detection units 145a, 145b, 145c, and 145d.

By using the values of the detected amplitude and phase of the reflected power and the through power with respect to each combination of the frequencies, the radiation loss that would arise when a given combination of the phase shift amounts is assumed to be adopted for heating can be calculated, and a combination of the frequencies and a combination of the phase shift amounts that provide the best overall radiation efficiency of the radio-frequency heating apparatus 200 can be determined on the basis of the calculation result. In other words, the optimum radiation efficiency can be obtained by calculation on the basis of a minimum number of measured values, without the need to actually measure those values in all the possible combinations of the frequencies of the radio-frequency power generation units 220a and 220b and the phase shift amounts of the variable phase shift units 142a, 142b, 142c, and 142d, thereby minimizing the measurement work which requires a long time. Such an arrangement shortens the preparation time for finding out the optimum radiation pattern, between a user's heating instruction to the radio-frequency heating apparatus 100 and start of an actual heating operation.

The specific structure of the radio-frequency power generation units 220a and 220b is the same as that of the radio-frequency power generation unit 120 shown in FIG. 2 according to the embodiment 1, and hence the description thereof will not be repeated.

Although the radio-frequency heating apparatus 200 shown in FIG. 13 includes two radio-frequency power generation units (first radio-frequency power generation unit 220a and second radio-frequency power generation unit 220b) and four radio-frequency power units (first radio-frequency power unit 140a, second radio-frequency power unit 140b, third radio-frequency power unit 140c, and fourth radio-frequency power unit 140d), the number of the radio-frequency power generation units and that of the radio-frequency power units are not specifically limited, provided that a plurality of radio-frequency power generation units and a plurality of radio-frequency power units are included.

[Detection of Reflected Power]

Figure 14:
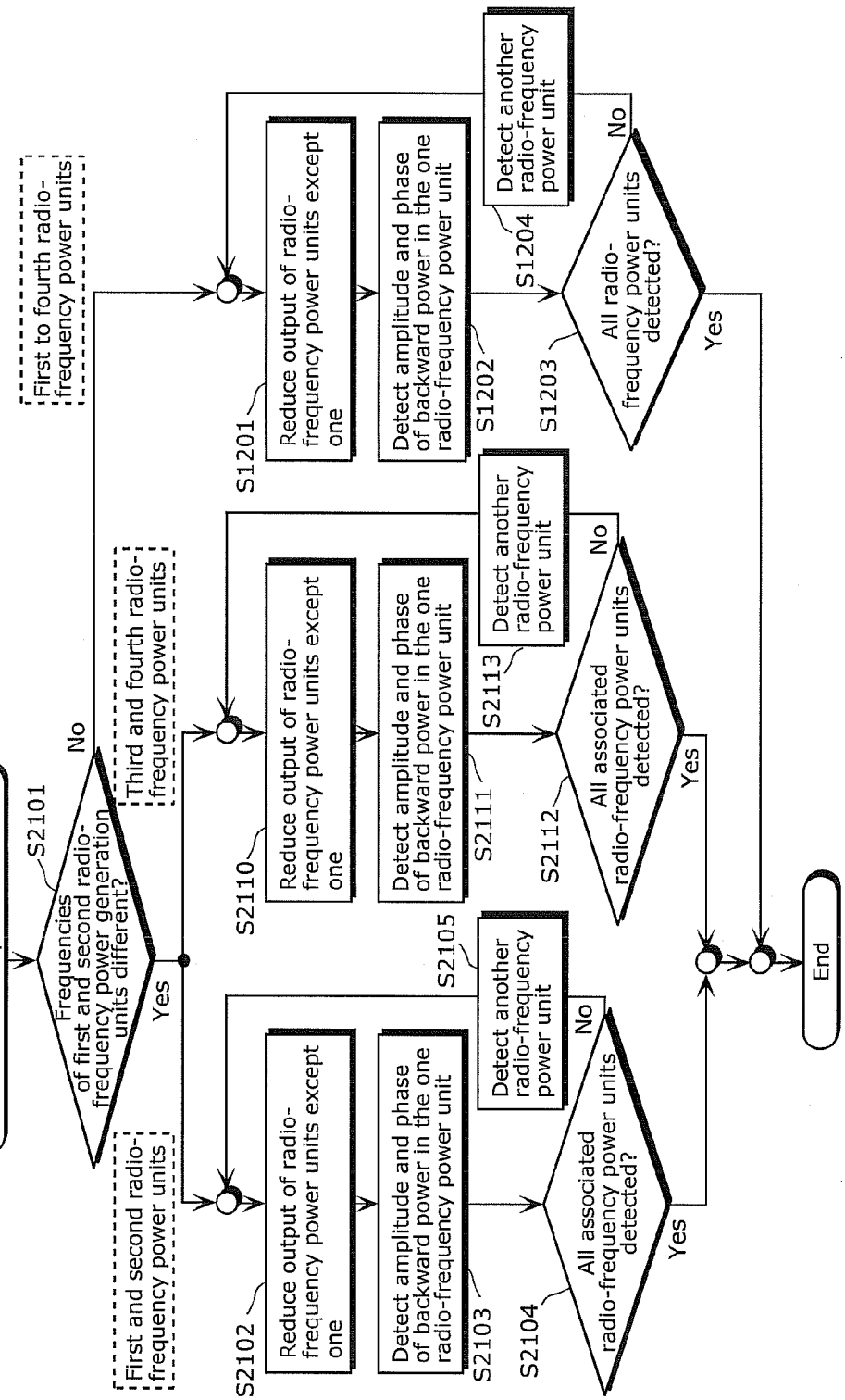
FIG. 14 is a flowchart showing another procedure for detecting a reflected power.

FIG. 14 is a flowchart showing a procedure for detecting the reflected power to be performed by the radio-frequency heating apparatus 200 according to the embodiment 2.

The control unit 210 of the radio-frequency heating apparatus 200 detects the reflected power incident into each of the radio-frequency power units 140a, 140b, 140c, and 140d, through the following controlling procedure.

The procedure for detecting the reflected power shown in FIG. 14 is different from the method shown in FIG. 5 described with reference to the embodiment 1, in that different procedures are performed depending on whether the first radio-frequency power generation unit 220a and the second radio-frequency power generation unit 220b are operating at different frequencies or at the same frequency.

First, the control unit 210 checks whether the first radio-frequency power generation unit 220a and the second radio-frequency power generation unit 220b are generating different frequencies (step S2101).

In the case where the first radio-frequency power generation unit 220a and the second radio-frequency power generation unit 220b are operating at different frequencies (Yes at step S2101), the control unit 210 divides the radio-frequency power units into groups of the units operating at the same frequency, and detects the reflected power incident into each of the radio-frequency power units. In other words, the control unit 210 divides the radio-frequency power units into the group consisting of the first radio-frequency power unit 140a and the second radio-frequency power unit 140b that receive the radio-frequency power from the first radio-frequency power generation unit 220a, and the group consisting of the third radio-frequency power unit 140c and the fourth radio-frequency power unit 140d that receive the radio-frequency power from the second radio-frequency power generation unit 220b.

First, the process for detecting the reflected power incident into the radio-frequency power units 140a and 140b in the group that receives the radio-frequency power generated by the first radio-frequency power generation unit 220a will be described.

As shown in FIG. 14, the control unit 210 controls the power output of the radio-frequency power unit 140 (for example, second radio-frequency power unit 140b) other than the radio-frequency power unit 140 from which the reflected power is to be detected (for example, first radio-frequency power unit 140a), such that the output is restricted from affecting the detection of the reflected power from the radio-frequency power unit 140 from which the reflected power is to be detected (for example, first radio-frequency power unit 140a) (step S2102).

Then upon controlling the amplification gain of the radio-frequency power amplification unit 143 of the radio-frequency power unit 140 (for example, second radio-frequency power unit 140b) other than the radio-frequency power unit 140 from which the reflected power is to be detected, the control unit 210 acquires the in-phase detection signal I and the quadrature detection signal Q of the radio-frequency power unit 140 from which the reflected power is to be detected (for example, first radio-frequency power unit 140a), to thereby detect the amplitude and the phase of the backward power (step S2103).

Thus, the amplitude and the phase of the reflected power incident into, for example, the first radio-frequency power unit 140a can be detected.

Then the control unit 210 checks whether the detection of the reflected power has been completed with respect to all the radio-frequency power units 140 associated with the first radio-frequency power generation unit 220a (for example, first and second radio-frequency power unit 140a and 140b) (step S2104). In the case where the reflected power detection has not been completed (No at step S2104), the control unit 210 designates another radio-frequency power unit 140 as the subject of the reflected power detection (step S2105), and repeats the step S2102 in which the output level of the radio-frequency power radiated from the radio-frequency power unit 140 other than the designated one is lowered, and the step S2103 in which the amplitude and the phase of the backward power incident into the radio-frequency power unit 140 designated as the subject of the detection is detected.

In contrast, in the case where the reflected power detection has been completed with all the radio-frequency power units 140 associated with the first radio-frequency power generation unit 220a (Yes at step S2104), the control unit 210 finishes the detection of the amplitude and the phase of the reflected power with respect to the group of the radio-frequency power units 140 radiating the radio-frequency power generated by the first radio-frequency power generation unit 220a.

At the same time, in parallel with the procedure of the steps S2102 to S2105, the control unit 210 performs the same operation to detect the reflected power incident into the third and the fourth radio-frequency power unit 140c and 140d radiating the radio-frequency power generated by the second radio-frequency power generation unit 220b (steps S2110 to S2112).

In the aforementioned procedure, since the respective groups are operating at different frequencies, the detection of the reflected power can be carried out free from interference between the groups. Therefore, the procedure for detecting the reflected power with respect to the respective groups (steps S2101 to S2105 and steps S2110 to S2113) can be simultaneously performed in parallel.

Thus, the radio-frequency heating apparatus 200 according to this embodiment can shorten the time necessary for detecting the amplitude and the phase of the reflected power incident into the first to the fourth radio-frequency power units 140a, 140b, 140c, and 140d, and can also shorten the time for performing the pre-search and re-search processes to be subsequently described. Therefore, the radio-frequency heating apparatus 200 can further shorten the time from the user's instruction to start heating to the completion of the heating operation, compared with the radio-frequency heating apparatus 100 according to the embodiment 1.

In the case where the first radio-frequency power generation unit 220a and the second radio-frequency power generation unit 220b are operating at the same frequency (No at step S2101), all of the first to the fourth radio-frequency power units 140a, 140b, 140c, and 140d are operating at the same frequency, and therefore the control unit 210 detects the reflected power through the same detection procedure as the procedure shown in FIG. 5 according to the embodiment 1 (steps S1201 to S1204).

[Detection of Through Power]

Figure 15:
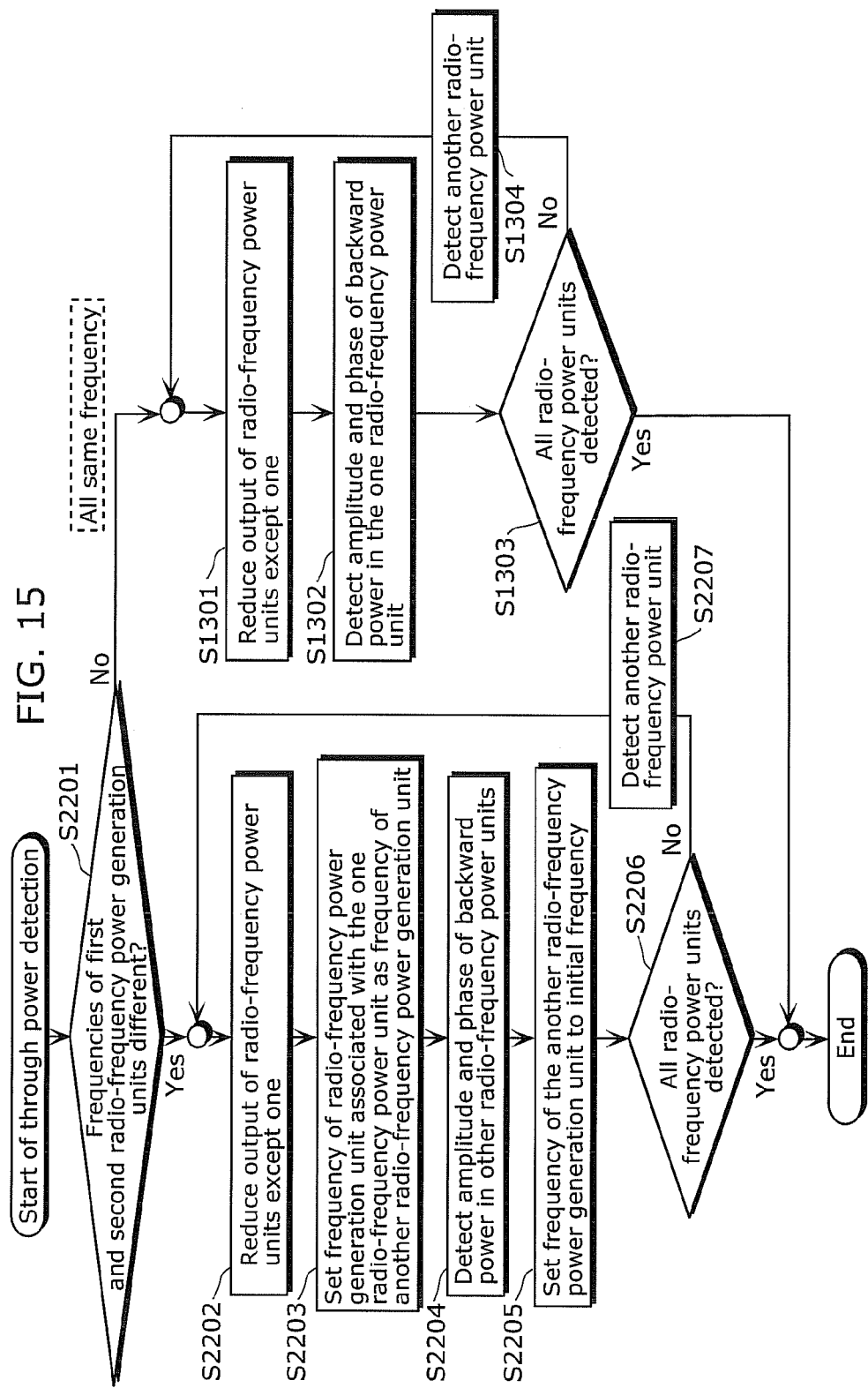
FIG. 15 is a flowchart showing another procedure for detecting a through power.

FIG. 15 is a flowchart showing a procedure for detecting the through power to be performed by the radio-frequency heating apparatus 200 according to the embodiment 2.

The control unit 210 of the radio-frequency heating apparatus 200 detects the through power among the radio-frequency power units 140a, 140b, 140c, and 140d, through the following controlling procedure.

The process for detecting the through power shown in FIG. 15 is different from the method shown in FIG. 6 described with reference to the embodiment 1, in that different procedures are performed depending on whether the first radio-frequency power generation unit 220a and the second radio-frequency power generation unit 220b are operating at different frequencies or at the same frequency.

First, the control unit 210 checks whether the first radio-frequency power generation unit 220a and the second radio-frequency power generation unit 220b are generating different frequencies (step S2201).

In the case where the first radio-frequency power generation unit 220a and the second radio-frequency power generation unit 220b are operating at different frequencies (Yes at step S2201), the control unit 210 causes one of the radio-frequency power units 140 (for example, first radio-frequency power unit 140a) to output the radio-frequency power. The control unit 210 controls the amplification gain of the radio-frequency power amplification unit 143 of the remaining radio-frequency power units 140 (for example, second, third, and fourth radio-frequency power unit 140b, 140c, and 140d) so as to reduce the power output of these units, so that the detection level of the reflected power incident into the respective radio-frequency power units 140 becomes sufficiently low (step S2202).

Then the control unit 210 sets the frequency of the radio-frequency power generation unit (for example, first radio-frequency power generation unit 220a) associated with the one radio-frequency power unit 140 (for example, first radio-frequency power unit 140a) outputting the radio-frequency power, as the frequency for the other radio-frequency power generation unit (for example, second radio-frequency power generation unit 220b) operating at a frequency different from that of the radio-frequency power generation unit associated with the one radio-frequency power unit 140.

Thereafter, the control unit 210 acquires the in-phase detection signal I and the quadrature detection signal Q of the remaining radio-frequency power units 140 controlled so as to reduce the output level of the radio-frequency power, and detects the amplitude and the phase of the backward power (step S2204). Through such a procedure, the amplitude and the phase of the through power originating from the one radio-frequency power unit 140 outputting the radio-frequency power and incident into each of the remaining radio-frequency power units 140 (for example, from first radio-frequency power unit 140a into second radio-frequency power unit 140b, third radio-frequency power unit 140c, and fourth radio-frequency power unit 140d) can be detected.

Upon completing the acquisition of the in-phase detection signals I(2) to I(4) and the quadrature detection signals Q(2) to Q(4) from the remaining radio-frequency power units 140 controlled so as to reduce the output level of the radio-frequency power (for example, second, third, and fourth radio-frequency power unit 140b, 140c, and 140d), the control unit 210 resets the frequency of the radio-frequency power generation unit (for example, second radio-frequency power generation unit 220b) in which the frequency has been changed, to the frequency before the change (step S2205). However, in the subsequent procedure of detecting the through power between different combinations of the radio-frequency power units, in the case where another radio-frequency power unit to be made to output the radio-frequency power in the next detection of the through power is the radio-frequency power unit (for example, second radio-frequency power unit 140b) operating at the same frequency as the one radio-frequency power unit (for example, first radio-frequency power unit 140a) currently outputting the radio-frequency power, the process of resetting the frequency of the radio-frequency power generation unit (for example, second radio-frequency power generation unit 220b) in which the frequency has been changed, to the frequency before the change (step S2205) may be skipped.

Then the control unit 210 checks whether the detection of the through power with respect to all the radio-frequency power units 140 has been completed (step S2206). In the negative case (No at step S2206), the control unit 210 designates another radio-frequency power unit 140 as the subject of detection (step S2207), and repeats the procedure from the step S2202 of lowering the output level of the radio-frequency power units 140 other than the designated radio-frequency power unit 140 to the step S2205 of resetting the frequency of the radio-frequency power generation unit to the initial frequency.

In contrast, in the case where the detection of the through power with respect to all the radio-frequency power units 140 has been completed (Yes at step S2206), the detection of the through power is finished.

Through such a procedure, the amplitude and the phase of the through power among all the radio-frequency power units 140 can be detected.

In the case where the first radio-frequency power generation unit 220a and the second radio-frequency power generation unit 220b are operating at the same frequency (No at step S2201), all of the first to the fourth radio-frequency power units 140a, 140b, 140c, and 140d are operating at the same frequency. Accordingly, the control unit 210 detects the through power through the same detection procedure as the procedure shown in FIG. 6 according to the embodiment 1.

[Pre-search Process]

Figure 16:
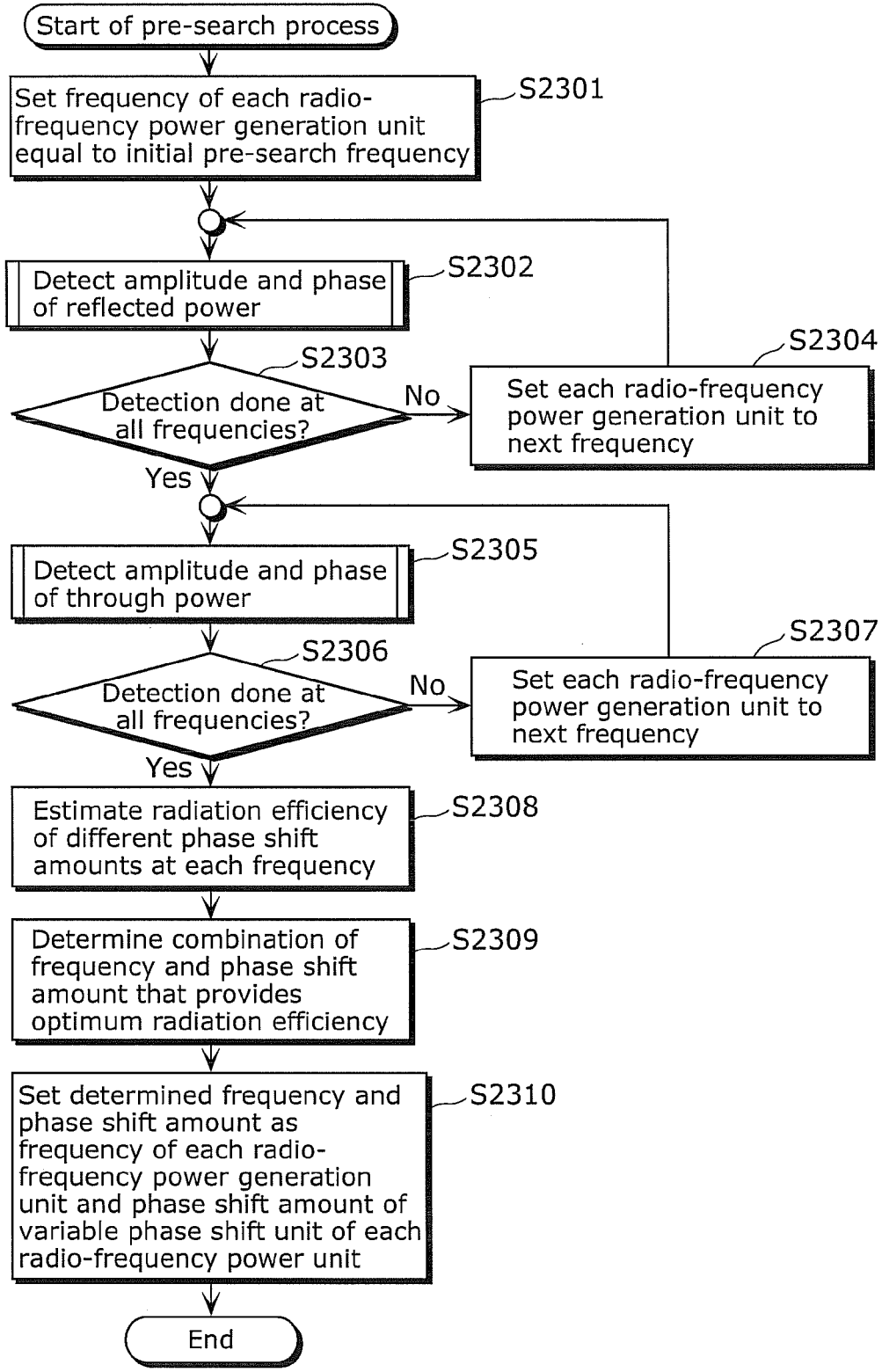
FIG. 16 is a flowchart showing another procedure for performing a pre-search process.

FIG. 16 is a flowchart showing a procedure for determining an optimum heating condition in advance of an actual heating operation (pre-search process) to be performed by the radio-frequency heating apparatus 200 according to the embodiment 2.

The pre-search process shown in FIG. 16 is generally the same as the pre-search process shown in FIG. 7 according to the embodiment 1, except that the first radio-frequency power generation unit 220a and the second radio-frequency power generation unit 220b are independently controlled for setting the frequency.

The control unit 210 of the radio-frequency heating apparatus 200 executes the pre-search process before the heating operation, as described below. Hereafter, the first radio-frequency power generation unit 220a and the second radio-frequency power generation unit 220b may be simply referred to as radio-frequency power generation unit 220a and radio-frequency power generation unit 220b, respectively.

As shown in FIG. 16, the control unit 210 sets a predetermined initial frequency for the pre-search process as the frequency for the radio-frequency power generation units 220a and 220b (for example, frequency A0 for first radio-frequency power generation unit 220a, and frequency B0 for second radio-frequency power generation unit 220b) (step S2301).

The control unit 210 then detects the amplitude and the phase of the reflected power with respect to all the radio-frequency power units 140a, 140b, 140c, and 140d, through the aforementioned reflected power detection procedure (step S2302).

Upon completing the detection of the reflected power incident into all the radio-frequency power units 140a, 140b, 140c, 140d, the control unit 210 checks whether the amplitude and the phase of the reflected power have been detected with respect to all the frequencies predetermined for the pre-search process (step S2303).

In the case where the amplitude and the phase of the reflected power have not been detected with respect to all the frequencies (No at step S2303), the control unit 210 sets a next frequency predetermined for the pre-search process (for example, frequency A1 for first radio-frequency power generation unit 220a and frequency B1 for second radio-frequency power generation unit 220b) as the frequency of the radio-frequency power generation units 220a, 220b (step S2304), and repeats the step S2302 of detecting the amplitude and the phase of the reflected power at the next frequency predetermined for the pre-search process.

Thus, the control unit 210 detects the amplitude and the phase of the reflected power incident into all the radio-frequency power units 140a, 140b, 140c, and 140d, at all the frequencies predetermined for the pre-search process (Yes at step S2303).

Upon completing the detection of the amplitude and the phase of the reflected power incident into all the radio-frequency power units 140a, 140b, 140c, 140d at all the frequencies predetermined for the pre-search process (Yes at step S2303), the control unit 210 detects the amplitude and the phase of the through power among all the radio-frequency power units 140a, 140b, 140c, and 140d, in accordance with the aforementioned procedure for detecting the through power (step S2305).

Then the control unit 210 checks whether the amplitude and the phase of the through power have been detected with respect to all the frequencies predetermined for the pre-search process (step S2306). In the case where the amplitude and the phase of the through power have not been detected with respect to all the frequencies (No at step S2306), in other words in the case where the amplitude and the phase of the through power still have to be detected with respect to one or more frequencies, the control unit 210 executes the following procedure. The control unit 210 sets a next predetermined frequency for the pre-search process as the frequency of the radio-frequency power to be generated by the radio-frequency power generation units 220a, 220b (step S2307), as in the aforementioned step S2304 of setting a next frequency predetermined for the pre-search process, and repeats the step S2305 to detect the amplitude and the phase of the through power.

Thus, the control unit 210 detects the amplitude and the phase of the through power among all the radio-frequency power units 140a, 140b, 140c, and 140d, at all the frequencies predetermined for the pre-search process (Yes at step S2306).

Upon completing the detection of the amplitude and the phase of the reflected power incident into all the radio-frequency power units 140a, 140b, 140c, and 140d and those of the through power among all the radio-frequency power units 140a, 140b, 140c, and 140d with respect to all the frequencies predetermined for the pre-search process (Yes at step S2306), a matrix as shown in FIG. 8 can be obtained that represent, using the amplitude and the phase, the reflected power characteristic of the radio-frequency power units 140 and the through power characteristic among the radio-frequency power units 140 with respect to each frequency, as in the embodiment 1.

A method of calculating the radiation loss of the radio-frequency heating apparatus 200 by using the S parameter 170 obtained as above will be described below.

The radiation loss of the radio-frequency power units 140a, 140b, 140c, and 140d at a given combination of frequencies can be calculated by using the S parameter represented by the detected amplitude and phase. For example, the radiation loss of the radio-frequency power unit 140a can be obtained by summing the S11 and S12 at the frequency set for the radio-frequency power generation unit 220a, and summing the S13 and S14 at the frequency set for the radio-frequency power generation unit 220b. The total sum of the S parameters can be obtained as a total of the amplitude components when the frequencies are different, and by vector synthesis of the amplitude components and the phase components when the frequency is the same.

In this embodiment, since two radio-frequency power generation units 220a and 220b are provided, the combination of the frequencies respectively set for the radio-frequency power generation units 220a and 220b should be considered. In the case where the frequency set for the first radio-frequency power generation unit 220a and the frequency set for the second radio-frequency power generation unit 220b are the same, all the radio-frequency power units 140a, 140b, 140c, and 140d operate at the same frequency. Accordingly, the total sum of the S parameters can be calculated by vector synthesis of the amplitude components and the phase components, as in the embodiment 1 (equations 1-1 to 1-4).

In contrast, in the case where the frequency set for the first radio-frequency power generation unit 220a and the frequency set for the second radio-frequency power generation unit 220b are different, the first radio-frequency power unit 140a and the second radio-frequency power unit 140b operate at the same frequency, and hence the total sum of the S parameters representing the reflected power S11 of the first radio-frequency power unit 140a, the reflected power S22 of the second radio-frequency power unit 140b, and the through power S12, S21 between the first and the second radio-frequency power unit 140a, 140b can be calculated by vector synthesis. Likewise, since the third radio-frequency power unit 140c and the fourth radio-frequency power unit 140d operate at the same frequency, and therefore the total sum of the S parameters representing the reflected power S33 of the third radio-frequency power unit 140c, the reflected power S44 of the fourth radio-frequency power unit 140d, and the through power S34, S43 between the third and the fourth radio-frequency power unit 140c, 140d can be calculated by vector synthesis.

On the other hand, since the first and the second radio-frequency power unit 140a, 140b and the third and the fourth radio-frequency power unit 140c, 140d operate at different frequencies, the total sum of the S parameters representing the through power S13, S14, S23, S24, S31, S32, S41, and S42 among the first and the second radio-frequency power unit 140a, 140b and the third and the fourth radio-frequency power unit 140c, 140d can be calculated as the total of the amplitude components.

For example, in the case where the first and the second radio-frequency power generation unit 220a, 220b are set at different frequencies, the radiation loss |S11+S12+S13+S14| of the first radio-frequency power unit 140a can be expressed as the following equation 3-1, in which $M_{11}$ and $\theta_{11}$ represent the amplitude and phase of the reflected power S11 into the first radio-frequency power unit 140a; $M_{12}$ and $\theta_{12}$ represent the amplitude and phase of the through power S12 from the second radio-frequency power unit 140b into the first radio-frequency power unit 140a; $M_{13}$ and $\theta_{13}$ represent the amplitude and phase of the through power S13 from the third radio-frequency power unit 140c into the first radio-frequency power unit 140a; and $M_{14}$ and $\theta_{14}$ represents the amplitude and phase of the through power S14 from the fourth radio-frequency power unit 140d into the first radio-frequency power unit 140a.

[Math. 9]

$$|S11+S12+S13+S14| = \sqrt{(M_{11}\cdot\sin\theta_{11}+M_{12}\cdot\sin\theta_{12})^2+(M_{11}\cdot\cos\theta_{11}+M_{12}\cdot\cos\theta_{12})^2} + \sqrt{(M_{13}\cdot\sin\theta_{13}+M_{14}\cdot\sin\theta_{14})^2+(M_{13}\cdot\cos\theta_{13}+M_{14}\cdot\cos\theta_{14})^2}$$

(Equation 3-1)

Likewise, the radiation loss |S21+S22+S23+S24| of the second radio-frequency power unit 140b, the radiation loss |S31+S32+S33+S34| of the third radio-frequency power unit 140c, and the radiation loss |S41+S42+S43+S44| of the fourth radio-frequency power unit 140d can be expressed as the following equations 3-2 to 3-4, like 3-1.

[Math. 10]

$$|S21+S22+S23+S24| = \sqrt{(M_{21}\cdot\sin\theta_{21}+M_{22}\cdot\sin\theta_{22})^2+(M_{21}\cdot\cos\theta_{21}+M_{22}\cdot\cos\theta_{22})^2} + \sqrt{(M_{23}\cdot\sin\theta_{23}+M_{24}\cdot\sin\theta_{24})^2+(M_{23}\cdot\cos\theta_{23}+M_{24}\cdot\cos\theta_{24})^2}$$

(Equation 3-2)

[Math. 11]

$$|S31+S32+S33+S34| = \sqrt{(M_{31}\cdot\sin\theta_{31}+M_{32}\cdot\sin\theta_{32})^2+(M_{31}\cdot\cos\theta_{31}+M_{32}\cdot\cos\theta_{32})^2} + \sqrt{(M_{33}\cdot\sin\theta_{33}+M_{34}\cdot\sin\theta_{34})^2+(M_{33}\cdot\cos\theta_{33}+M_{34}\cdot\cos\theta_{34})^2}$$

(Equation 3-3)

[Math. 12]

$$|S41+S42+S43+S44| = \sqrt{(M_{41}\cdot\sin\theta_{41}+M_{42}\cdot\sin\theta_{42})^2+(M_{41}\cdot\cos\theta_{41}+M_{42}\cdot\cos\theta_{42})^2} + \sqrt{(M_{43}\cdot\sin\theta_{43}+M_{44}\cdot\sin\theta_{44})^2+(M_{43}\cdot\cos\theta_{43}+M_{44}\cdot\cos\theta_{44})^2}$$

(Equation 3-4)

The total sum of the radiation loss of all the radio-frequency power units 140a to 140d corresponds to the overall radiation loss of the radio-frequency heating apparatus 200, at the relevant combination of the frequencies.

Now, a method of calculating the radiation loss that would arise when different phase shift amounts are set for the variable phase shift unit 142 of the respective radio-frequency power units 140 will be described.

For example, in the case where the first and the second radio-frequency power generation unit 220a, 220b are set in different frequencies as described earlier, the radiation loss |S11+S12+S13+S14| of the first radio-frequency power unit 140a, the radiation loss |S21+S22+S23+S24| of the second radio-frequency power unit 140b, the radiation loss |S31+S32+S33+S34| of the third radio-frequency power unit 140c, and the radiation loss |S41+S42+S43+S44| of the fourth radio-frequency power unit 140d that would respectively arise when the phase shift amount of the variable phase shift unit 142a of the first radio-frequency power unit 140a is changed by φ1; the phase shift amount of the variable phase shift unit 142b of the second radio-frequency power unit 140b is changed by φ2; the phase shift amount of the variable phase shift unit 142c of the third radio-frequency power unit 140c is changed by φ3; and the phase shift amount of the variable phase shift unit 142d of the fourth radio-frequency power unit 140d is changed by φ4 can be expressed as the following equations 4-1 to 4-4, respectively.

[Math. 13]

$$|S11+S12+S13+S14| = \sqrt{(M_{11}\cdot\sin(\theta_{11}+\phi_1)+M_{12}\cdot\sin(\theta_{12}+\phi_2))^2+(M_{11}\cdot\cos(\theta_{11}+\phi_1)+M_{12}\cdot\cos(\theta_{12}+\phi_2))^2} + \sqrt{(M_{13}\cdot\sin(\theta_{13}+\phi_3)+M_{14}\cdot\sin(\theta_{14}+\phi_4))^2+(M_{13}\cdot\cos(\theta_{13}+\phi_3)+M_{14}\cdot\cos(\theta_{14}+\phi_4))^2}$$

(Equation 4-1)

[Math. 14]

$$|S21+S22+S23+S24| = \sqrt{(M_{21}\cdot\sin(\theta_{21}+\phi_1)+M_{22}\cdot\sin(\theta_{22}+\phi_2))^2+(M_{21}\cdot\cos(\theta_{21}+\phi_1)+M_{22}\cdot\cos(\theta_{22}+\phi_2))^2} + \sqrt{(M_{23}\cdot\sin(\theta_{23}+\phi_3)+M_{24}\cdot\sin(\theta_{24}+\phi_4))^2+(M_{23}\cdot\cos(\theta_{23}+\phi_3)+M_{24}\cdot\cos(\theta_{24}+\phi_4))^2}$$

(Equation 4-2)

[Math. 15]

$$|S31 + S32 + S33 + S34| = \\ \sqrt{(M_{31} \cdot \sin(\theta_{31} + \phi_1) + M_{32} \cdot \sin(\theta_{32} + \phi_2))^2 + (M_{31} \cdot \cos(\theta_{31} + \phi_1) + M_{32} \cdot \cos(\theta_{32} + \phi_2))^2} + \\ \sqrt{(M_{33} \cdot \sin(\theta_{33} + \phi_3) + M_{34} \cdot \sin(\theta_{34} + \phi_4))^2 + (M_{33} \cdot \cos(\theta_{33} + \phi_3) + M_{34} \cdot \cos(\theta_{34} + \phi_4))^2}$$

(Equation 4-3)

[Math. 16]

$$|S41 + S42 + S43 + S44| = \\ \sqrt{(M_{41} \cdot \sin(\theta_{41} + \phi_1) + M_{42} \cdot \sin(\theta_{42} + \phi_2))^2 + (M_{41} \cdot \cos(\theta_{41} + \phi_1) + M_{42} \cdot \cos(\theta_{42} + \phi_2))^2} + \\ \sqrt{(M_{43} \cdot \sin(\theta_{43} + \phi_3) + M_{44} \cdot \sin(\theta_{44} + \phi_4))^2 + (M_{43} \cdot \cos(\theta_{43} + \phi_3) + M_{44} \cdot \cos(\theta_{44} + \phi_4))^2}$$

(Equation 4-4)

The radiation loss of the respective radio-frequency power units 140 that would arise when the phase shift amount of the variable phase shift unit 142 of the respective radio-frequency power units 140 is changed by a given value can be calculated in accordance with those equations 4-1 to 4-4, and also the overall radiation loss of the radio-frequency heating apparatus 200 can be calculated.

As described above, the control unit 210 calculates the radiation loss that would arise when a given frequency of the radio-frequency power generation units 220a, 220b and a given combination of the phase shift amounts of the variable phase shift units 142a, 142b, 142c, and 142d are assumed to be adopted for heating, on the basis of the information of the amplitude and the phase of the reflected power and the through power, to thereby determine the frequencies of the respective radio-frequency power generation units 220a, 220b and the combination of the phase shift amounts of the variable phase shift units 142a, 142b, 142c, and 142d that provide the best overall radiation efficiency of the radio-frequency heating apparatus 200 (step S2309).

Thereafter, the control unit 210 sets the frequency and the phase shift amounts determined at the step S2309 as the frequencies of the radio-frequency power generation units 220a, 220b and the phase shift amounts of each of the variable phase shift units 142a, 142b, 142c, and 142d (step S2310), and finishes the pre-search process.

As described above, in the pre-search process according to this embodiment, the frequency of the radio-frequency power to be generated by the first radio-frequency power generation unit 220a and the frequency of the radio-frequency power to be generated by the second radio-frequency power generation unit 220b can be independently set, and therefore the reflected power and the through power can be detected in a shorter time compared with the pre-search process according to the embodiment 1.

In addition, as in the pre-search process according to the embodiment 1, the radiation loss that would arise when a given combination of the phase shift amounts of the variable phase shift units 142a, 142b, 142c, and 142d are assumed to be adopted for heating is calculated with respect to the respective frequencies of the radio-frequency power generation units 220a, 220b, on the basis of the individual detection results of the amplitude and the phase of the reflected power and the through power from each of the radio-frequency power units 140 at the set frequencies set for the pre-search process. Accordingly, the combination of the frequencies of the radio-frequency power generation units 220a, 220b and the combination of the phase shift amounts of the variable phase shift units 142a, 142b, 142c, and 142d that provide the best overall radiation efficiency of the radio-frequency heating apparatus 200 can be determined by merely performing the actual measurement with respect to one combination of the phase shift amounts, as a minimum.

Therefore, as mentioned above, the time necessary for determining the best condition can be significantly shortened, compared with the case where the actual measurement is performed with respect to all the frequencies of the radio-frequency power generation units 220a, 220b and all the combinations of the phase shift amounts of the variable phase shift units 142a, 142b, 142c, and 142d. Consequently, the pre-search process for determining the optimum frequency condition can be performed in a short time, before the user presses the start button of the radio-frequency heating apparatus 200 to proceed to the actual heating operation.

It will now be assumed that the frequency can be set at 101 points between 2.4 GHz and 2.5 GHz at an increment of 1 MHz and the phase shift amount can be set at 12 points from 0 to 360 degrees at intervals of 30 degrees, and that four radio-frequency power units 140 are employed. With the currently available technique it takes approximately 0.1 ms for performing the measurement of one frequency point, and hence it takes approximately six hours ($12^4 \times 101^2$) to complete the measurement of all the combinations of those points. In other words, in the case where the measurement is actually performed with respect to all the combinations of the frequencies of the radio-frequency power generation units 220a, 220b and all the combinations of the phase shift amounts of the variable phase shift units 142 of each of the frequency power units 140, it takes as long as approximately six hours before the user can start the actual heating operation, which is unrealistic.

In contrast, the radio-frequency heating apparatus 200 according to this embodiment only detects the in-phase detection signal I and the quadrature detection signal Q of the reflected power and the through power at the radio-frequency power units 140 at the 101 points in the frequency band of 2.4 GHz to 2.5 GHz with the phase shift amount of the variable phase shift units 142 of each radio-frequency power unit 140 set at a given point, and then calculates the amplitude and the phase. Accordingly, the amplitude and the phase of the backward power originating from reflection, as well as the amplitude and the phase of the through-passing backward power can be obtained at each of the frequencies in only approx. 40 ms necessary for measuring 101×4 points. After obtaining the S parameters represented by the amplitude and the phase of those 101×4 points, the frequencies of the radio-frequency power generation units 220a and 220b and the phase shift amount of the variable phase shift units 142 that provide the optimum radiation efficiency can be determined by the calculation performed by the control unit 210, which is by far quicker than the actual measurement, and therefore a preparation time of one second or shorter, generally accepted as stand-by time by consumers, can well be achieved.

Further, the vector synthesis method can be incorporated in the calculation process of the optimum combination of the phase shift amounts of each of the variable phase shift units 142a, 142b, 142c, and 142d, to thereby reduce the number of arithmetic steps, thus further reducing the calculation time.

Although the detection of the amplitude and the phase of all the reflected powers is followed by the detection of the amplitude and the phase of all the through powers according to this embodiment, the detection of the amplitude and the phase of all the reflected powers may be preceded by the detection of the amplitude and the phase of all the through powers, or the amplitude and the phase of the reflected power and those of the through power may be alternately detected. From the radio-frequency power unit 140 that is radiating the radio-frequency power, the amplitude and the phase of the reflected power can be detected while detecting those of the through power. Therefore, the amplitude and the phase of the reflected power and those of the through power may be simultaneously detected from such radio-frequency power units 140.

[Re-search Process]

Figure 17:
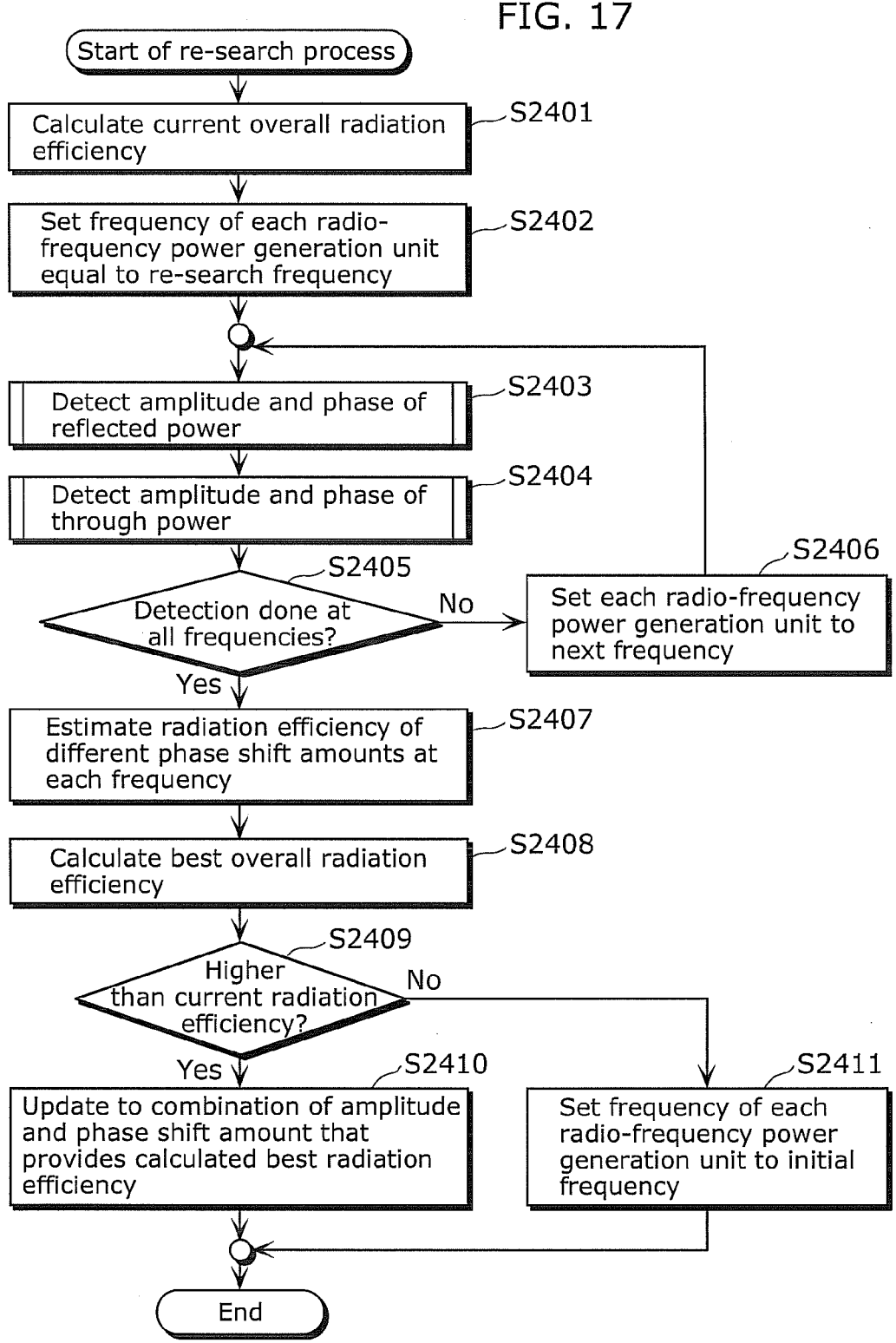
FIG. 17 is a flowchart showing another procedure for performing a re-search process.

FIG. 17 is a flowchart showing a procedure of a re-search process to be performed by the radio-frequency heating apparatus 200 according to the embodiment 2.

The control unit 210 of the radio-frequency heating apparatus 200 performs the re-search process during a heating operation, as described here below.

The re-search process shown in FIG. 17 is generally the same as the re-search process shown in FIG. 12 according to the embodiment 1, except that the first radio-frequency power generation unit 220a and the second radio-frequency power generation unit 220b are independently controlled for setting the frequency.

As shown in FIG. 17, control unit 210 first detects the amplitude and the phase of the reflected power and the through power of the radio-frequency power units 140a, 140b, 140c, and 140d, at the frequency and the phase shift amount actually adopted for heating, in accordance with the aforementioned detection procedure of the reflected power and the through power shown in FIGS. 14 and 15, and calculates the overall radiation efficiency of the radio-frequency heating apparatus 200 (step S2401).

Then the control unit 210 sets a predetermined frequency for the re-search process as the frequency for the respective radio-frequency power generation units 220a, 220b (step S2402), and detects the amplitude and the phase of the reflected power incident into all the radio-frequency power units 140a, 140b, 140c, and 140d, in accordance with the aforementioned detection procedure of the reflected power (step S2403).

The control unit 210 also detects the amplitude and the phase of the through power among all the radio-frequency power units 140a to 140d, in accordance with the aforementioned detection procedure of the through power (step S2404).

Thereafter, the control unit 210 checks whether the reflected power and the through power have been detected with respect to all the frequencies predetermined for the re-search process (step S2405). In the case where the reflected power and the through power have not been detected with respect to all the frequencies (No at step S2405), in other words in the case where the amplitude and the phase of the reflected power and the through power still have to be detected with respect to one or more frequencies; the control unit 210 sets a next predetermined frequency for the re-search process as the frequency of the radio-frequency power to be generated by the respective radio-frequency power generation units 220a and 220b (step S2406), and repeats the steps S2403 and S2404 to detect the amplitude and the phase of the reflected power and those of the through power.

Through the repetitions of the aforementioned procedure, the control unit 210 updates all the frequencies predetermined for the re-search process, and detects the amplitude and the phase of the reflected power and those of the through power of all the radio-frequency power units 140a, 140b, 140c, and 140d.

Upon completing the detection of the amplitude and the phase of the reflected power and those of the through power of all the radio-frequency power units 140a, 140b, 140c, and 140d with respect to all the frequencies predetermined for the re-search process (Yes at step S2405), the control unit 210 estimates by calculation the radiation loss that would arise when given frequencies of the radio-frequency power generation units 220a, 220b and a given combination of the phase shift amounts of the respective variable phase shift units 142a, 142b, 142c, and 142d are assumed to be adopted for heating, as described referring to the pre-search process, on the basis of the information of the amplitude and the phase of the reflected power and the through power (step S2407). Here, the specific procedure at the step S2407 is similar to the step S2308 shown in FIG. 16 for estimating the radiation efficiency resulting from different phase shift amounts at each frequency.

Then the control unit 210 calculates the values that provide the best overall radiation efficiency of the radio-frequency heating apparatus 200 (step S2408).

After that, the control unit 210 compares the values that provide the best overall radiation efficiency of the radio-frequency heating apparatus 200 obtained through the re-search process (values calculated at step S2408) with the current values realizing the overall radiation efficiency of the radio-frequency heating apparatus 200, calculated earlier (step S2409).

In the case where the values that provide the best overall radiation efficiency obtained through the re-search process result in radiation efficiency higher than the current radiation efficiency calculated earlier, the control unit 210 sets the frequency and the combination of the phase shift amounts calculated through the re-search process, which provide the best radiation efficiency, for the radio-frequency power generation units 220a, 220b and the variable phase shift units 142a to 142d (step S2410). In other words, the control unit 210 updates the frequencies of the radio-frequency power generation units 220a, 220b and the phase shift amounts of the variable phase shift units 142a to 142d. On the contrary, in the case where the values realizing the current radiation efficiency calculated earlier provide higher radiation efficiency than the values that provide the best radiation efficiency calculated through the re-search process, the control unit 210 sets the frequencies of the radio-frequency power generation units 220a, 220b at the frequency adopted before performing the re-search process (step S2411).

Here, although the values obtained through the re-search process, which provide the best radiation efficiency under a certain condition of the frequency and the phase, result in higher radiation efficiency than the current one, it is not necessary to adopt the values from the re-search process in the case where, for example, the level of the backward power into one of the radio-frequency power units 140 exceeds a predetermined threshold. In other words, the conditions that provide the optimum radiation efficiency may be adopted from among the conditions that can keep the level of the backward power into the respective radio-frequency power units 140 within the predetermined threshold. Such a threshold may be determined, for example, in accordance with stand voltages of amplifiers at each frequency, so as to prevent a failure of the amplifier containing a semiconductor device.

Thus, the radio-frequency heating apparatus 200 according to this embodiment can constantly heat the object under the optimum heating condition by performing the re-search process, even though the optimum heating condition fluctuates because of a change in temperature and shape of the object during the heating operation.

In addition, when calculating the best overall radiation efficiency of the radio-frequency heating apparatus 200 at the step S2408, the control unit 210 may calculate the radiation loss that would arise when given frequencies of the radio-frequency power generation units 220a, 220b and a given combination of the phase shift amounts of the variable phase shift units 142a, 142b, 142c, and 142d are assumed to be adopted for heating, on the basis of the individual detection results of the amplitude and the phase of the reflected power and the through power from each of the radio-frequency power units 140 at the set frequencies, to thereby determine the frequencies of the radio-frequency power generation units 220a, 220b and the phase shift amounts of the variable phase shift units 142a, 142b, 142c, and 142d that provide the best radiation efficiency. In this case, as mentioned above, the time necessary for determining the best condition can be significantly shortened, compared with the case where the actual measurement is performed with respect to all the frequencies of the radio-frequency power generation units 220a, 220b and all the combinations of the phase shift amounts of the variable phase shift units 142a, 142b, 142c, and 142d. Consequently, the re-search process can be performed in a short time, which results in shortened extension of the heating time required for modifying the heating time because of the temperature change of the object, and in reduced stand-by time of the user before the heating is finished.

To determine the timing for activating the re-search process, the level of the output power of the radio-frequency power units 140, calculated from the amplitude and the phase of the reflected power detected by acquiring the in-phase detection signals I(1) to I(4) and the quadrature detection signals Q(1) to Q(4) from the respective radio-frequency power units 140a, 140b, 140c, and 140d may be compared with a predetermined threshold constantly or periodically during the heating operation, so as to perform the re-search process in the case where the power level of the backward power into at least one of the radio-frequency power units 140 has exceeded the threshold.

Thus, the radio-frequency heating apparatus 200 according to this embodiment can constantly heat the object under the optimum heating condition as the radio-frequency heating apparatus 100 according to the embodiment 1, by setting the predetermined threshold and performing the re-search process as above when the threshold is exceeded, despite the fluctuation of the values of the reflected power and the through power originating from a change in temperature and shape of the object.

Further, in order to prevent a malfunction of the radio-frequency heating apparatus 200, especially the amplifier containing a semiconductor device, because of an excessive reflected power or through power, the control unit 210 may control, during the pre-search or re-search process, the amplification gain of the radio-frequency power amplification units 143a, 143b, 143c, and 143d such that the radio-frequency power to be output from the respectively corresponding radio-frequency power units 140a, 140b, 140c, and 140d becomes smaller than the radio-frequency power to be outputted in the actual heating operation.

As described above, the radio-frequency heating apparatus 200 according to this embodiment includes the first radio-frequency power generation unit 220a and the second radio-frequency power generation unit 220b, corresponding to the plurality of radio-frequency power generation units.

Such a configuration enables the time necessary for detecting the reflected power incident into the respective radio-frequency power units 140 to be further shortened compared with the radio-frequency heating apparatus 100 according to the embodiment 1. Consequently, the optimum combinations of the frequencies and of the phase shift amounts can be determined in a shorter time, before the user presses the start button of the radio-frequency heating apparatus 200 to proceed to the actual heating operation, so that the user can enjoy improved convenience for use.

Further, in contrast to radio-frequency heating apparatus 100 according to the embodiment 1, the radio-frequency heating apparatus 200 according to this embodiment includes two radio-frequency power generation units, namely the first radio-frequency power generation unit 220a and the second radio-frequency power generation unit 220b, and independently controls the frequencies to be generated by each of these radio-frequency power generation units. Therefore, the radio-frequency heating apparatus 200 provides a higher degree of freedom in setting the frequencies of the plurality of radio-frequency powers to be radiated to the heating chamber, thereby achieving improved optimum radiation efficiency.

[Embodiment 3]

A radio-frequency heating apparatus according to this embodiment includes four radio-frequency power generation units that each supply radio-frequency power to each of four radio-frequency power unit, while the radio-frequency heating apparatus 200 according to the embodiment 2 includes two radio-frequency power generation units. Such a configuration allows the frequencies of the radio-frequency power radiated from all the radio-frequency power to be individually controlled, thereby still further improving the optimum radiation efficiency. Hereafter, the embodiment 3 of the present invention will be described focusing on the difference from the embodiment 2, referring to the drawings. In the description of the embodiment 3, the constituents that have the same function as those of the embodiments 1 and 2 will be given the same numeral, and the description thereof will not be repeated. Likewise, the description will not be repeated regarding the process that provides the effects similar to those of the embodiments 1 and 2.

Figure 18:
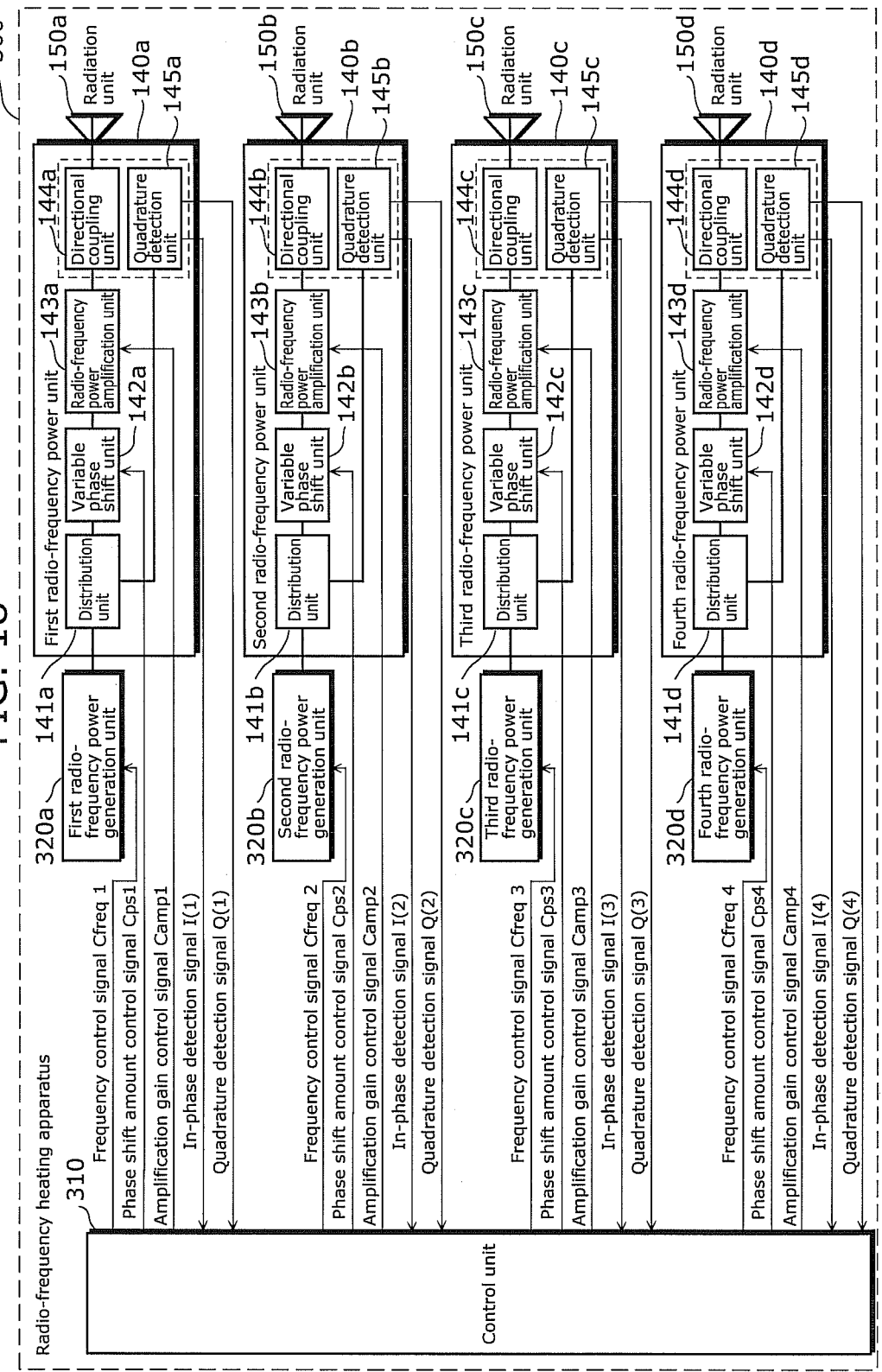
FIG. 18 is a block diagram showing a general configuration of a radio-frequency heating apparatus according to an embodiment 3.

FIG. 18 is a block diagram showing a general configuration of the radio-frequency heating apparatus according to the embodiment 3 of the present invention.

The radio-frequency heating apparatus 300 shown in FIG. 18 includes, in contrast to the radio-frequency heating apparatus 200 shown in FIG. 13, a first radio-frequency power generation unit 320a, a second radio-frequency power generation unit 320b, a third radio-frequency power generation unit 320c, and a fourth radio-frequency power generation unit 320d, in place of the first radio-frequency power generation units 220a and the second radio-frequency power generation unit 220b, and a control unit 310 in place of the control unit 210. The configuration of the radio-frequency power units 140a, 140b, 140c, and 140d is the same as that in the embodiments 1 and 2, and hence the description thereof will not be repeated. The first to the fourth radio-frequency power generation units 320a to 320d may be simply referred to as radio-frequency power generation units 320a to 320d.

The radio-frequency power generated by the first radio-frequency power generation unit 320a is inputted to the first radio-frequency power unit 140a; the radio-frequency power generated by the second radio-frequency power generation unit 320b is inputted to the second radio-frequency power unit 140b; the radio-frequency power generated by the third radio-frequency power generation unit 320c is inputted to the third radio-frequency power unit 140c; and radio-frequency power generated by the fourth radio-frequency power generation unit 320d is inputted to the fourth radio-frequency power unit 140d, respectively. The radio-frequency power inputted from each of the radio-frequency power generation units 320a, 320b, 320c, and 320d to the respectively associated radio-frequency power units 140a, 140b, 140c, and 140d is inputted to each of the variable phase shift units 142a, 142b, 142c, and 142d through the distribution units 141a, 141b, 141c, and 141d, respectively. The radio-frequency powers inputted to the variable phase shift units 142a, 142b, 142c, and 142d are subjected to a phase shift process, and then inputted to the radio-frequency power amplification units 143a, 143b, 143c, and 143d, respectively. The radio-frequency powers inputted to the radio-frequency power amplification units 143a, 143b, 143c, and 143d are amplified to a power level appropriate for heating the object, and then radiated from the radiation units 150a, 150b, 150c, and 150d to the object, through the directional coupling units 144a, 144b, 144c, and 144d.

The control unit 310 outputs the frequency control signals Cfreq1 to Cfreq4 respectively to the radio-frequency power amplification unit 143a to 143d, in contrast to the control unit 210 shown in FIG. 13. More specifically, the control unit 310 is connected to each of the radio-frequency power generation units 320a, 320b, 320c, and 320d, the variable phase shift units 142a, 142b, 142c, and 142d, and the radio-frequency power amplification units 143a, 143b, 143c, and 143d, and outputs the frequency control signals Cfreq1, Cfreq2, Cfreq3, and Cfreq4 to the respectively corresponding radio-frequency power generation units 320a, 320b, 320c, and 320d.

Each of the radio-frequency power generation units 320a, 320b, 320c, and 320d changes the frequency of the radio-frequency power to be generated, in accordance with the individual frequency control signals Cfreq1, Cfreq2, Cfreq3, and Cfreq4 inputted from the control unit 310.

The general controlling procedure of the radio-frequency heating apparatus 300 shown in FIG. 18 is similar to the flowchart shown in FIG. 4 showing the controlling procedure of the radio-frequency heating apparatus 100 according to the embodiment 1.

However, while the radio-frequency heating apparatus 100 described referring to FIG. 1 operates all the radio-frequency power units 140a, 140b, 140c, and 140d at the same frequency, the radio-frequency heating apparatus 300 shown in FIG. 18 according to this embodiment operates the first radio-frequency power unit 140a at a frequency generated by the first radio-frequency power generation unit 320a, the second radio-frequency power unit 140b at a frequency generated by the second radio-frequency power generation unit 320b, the third radio-frequency power unit 140c at a frequency generated by the third radio-frequency power generation unit 320c, and the fourth radio-frequency power unit 140d at a frequency generated by the fourth radio-frequency power generation unit 320d.

With such a configuration of the radio-frequency heating apparatus 300, when the radio-frequency power is radiated actually changing the frequencies of the radio-frequency power generation units 320a, 320b, 320c, and 320d, the amplitude and the phase of the backward power inputted by reflection and those of the through-passing backward power corresponding to combinations of frequencies of each of the radio-frequency power generation units 320a, 320b, 320c, and 320d can be detected (obtained), on the basis of the in-phase detection signals I(1) to I(4) and the quadrature detection signals Q(1) to Q(4) detected by the quadrature detection units 145a, 145b, 145c, and 145d.

Utilizing the values of the detected amplitude and phase of the backward power inputted by reflection and those of the through-passing backward power with respect to each of the frequencies, the radiation loss that would arise when a given combination of the frequencies of the radio-frequency power generation units 320a, 320b, 320c, and 320d and of the phase shift amounts of the variable phase shift units 142a, 142b, 142c, and 142d are assumed to be adopted for heating can be calculated. Then a combination of the frequencies of the radio-frequency power generation units 320a, 320b, 320c, and 320d and a combination of the phase shift amounts of the variable phase shift units 142a, 142b, 142c, and 142d that provide the best overall radiation efficiency of the radio-frequency heating apparatus 300 can be determined on the basis of the calculation result. In other words, the optimum radiation efficiency can be obtained by calculation on the basis of a minimum number of measured values, without the need to actually measure those values in all the possible combinations of the frequencies of the radio-frequency power generation units 320a, 320b, 320c, and 320d and the phase shift amounts of the variable phase shift units 142a, 142b, 142c, and 142d, thereby minimizing the measurement work which requires a long time. Such an arrangement shortens the preparation time for finding out the optimum radiation pattern, between a user's heating instruction to the radio-frequency heating apparatus 300 and start of an actual heating operation.

The specific structure of the radio-frequency power generation units 320a, 320b, 320c, and 320d is the same as that of the radio-frequency power generation unit 120 shown in FIG. 2 according to the embodiment 1, and hence the description thereof will not be repeated.

Although the radio-frequency heating apparatus 300 shown in FIG. 18 includes four radio-frequency power generation units and four radio-frequency power units, the number of the radio-frequency power generation units and the radio-frequency power units are not specifically limited, as long as the same number of radio-frequency power generation units and radio-frequency power units are provided.

[Detection of Reflected Power]

Figure 19:
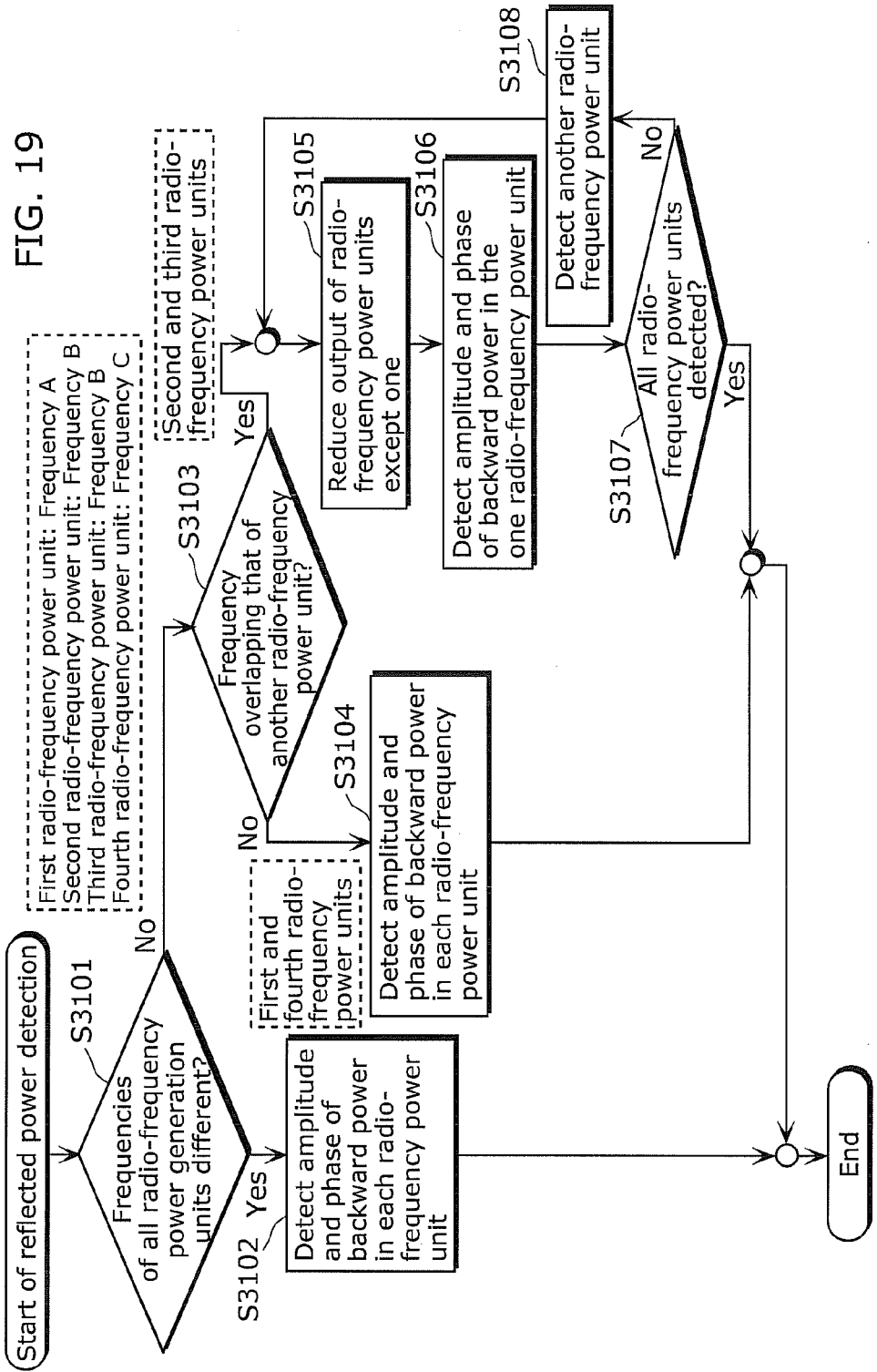
FIG. 19 is a flowchart showing still another procedure for detecting a reflected power.

FIG. 19 is a flowchart showing a procedure for detecting the reflected power to be performed by the radio-frequency heating apparatus 300 according to the embodiment 3.

The control unit 310 of the radio-frequency heating apparatus 300 detects the reflected power incident into each of the radio-frequency power units 140a, 140b, 140c, and 140d, through the following controlling procedure.

The procedure for detecting the reflected power shown in FIG. 19, to be performed by the control unit 310 of the radio-frequency heating apparatus 300, differs depending on whether the radio-frequency power generation units 320a, 320b, 320c, and 320d are all operating at different frequencies, or two or more of the radio-frequency power generation units are operating at the same frequency.

First, the control unit 310 checks whether the first to the fourth radio-frequency power generation units 320a to 320d are generating different frequencies (step S3101).

In the case where the radio-frequency power generation units 320a, 320b, 320c, and 320d are all operating at different frequencies (Yes at step S3101), the control unit 310 acquires the in-phase detection signals I(1) to I(4) and the quadrature detection signals Q(1) to Q(4) from the respective radio-frequency power units 140a, 140b, 140c, and 140d, to thereby detect the amplitude and the phase of the backward power incident into each of the radio-frequency power units 140a, 140b, 140c, and 140d (step S3102). This procedure can be performed in parallel among the respective radio-frequency power units 140. Accordingly, the reflected power incident into the radio-frequency power units 140a, 140b, 140c, and 140d can be detected in a short time.

In the case where two or more radio-frequency power generation units are operating at the same frequency (No at step S3101), for example when the first radio-frequency power generation unit 320a is operating at a frequency A, the second and the third radio-frequency power generation unit 320b, 320c are operating at a frequency B, and the fourth radio-frequency power generation unit 320d is operating at a frequency C, the control unit 310 checks whether the frequencies among the radio-frequency power units 140 (step S3103).

The control unit 310 acquires the in-phase detection signal and the quadrature detection signal from the radio-frequency power unit the frequency of which does not overlap with that of another radio-frequency power unit 140 (No at step S3103), for example the first and the fourth radio-frequency power units 140a, 140d, and detects the amplitude and the phase of the backward power incident into the radio-frequency power unit the frequency of which does not overlap with that of another radio-frequency power unit 140 (step S3104). This procedure can be performed in parallel among the radio-frequency power units 140 the frequency of which does not overlap with that of another. Accordingly, the reflected power incident into the radio-frequency power units 140 the frequency of which does not overlap with that of another can be detected in a short time.

With respect to the radio-frequency power unit 140 the frequency of which overlaps with that of another (Yes at step S3103), for example the second and the third radio-frequency power unit 140b, 140c, the control unit 310 controls the power output of the radio-frequency power unit 140 (for example, third radio-frequency power unit 140c) other than a specific one of the radio-frequency power units 140 (for example, second radio-frequency power unit 140b) such that the detection of the reflected power into the specific one of the radio-frequency power units 140 is not affected by that power output (step S3105). After controlling the amplification gain of the radio-frequency power amplification unit of the radio-frequency power unit 140 other than the specific one, the control unit 310 acquires the in-phase detection signal and the quadrature detection signal of the specific radio-frequency power unit 140 which is the subject of the reflected power detection, to thereby detect the amplitude and the phase of the backward power into the specific radio-frequency power unit 140 (step S3106).

Then the control unit 310 checks whether the detection of the reflected power has been completed with respect to all the radio-frequency power units 140 (step S3107), and in the negative case (No at step S3107) the control unit 310 designates another radio-frequency power unit 140 as the subject of the reflected power detection (step S3108), and repeats the step S3105 in which the output level of the radio-frequency power radiated from the radio-frequency power unit 140 other than the designated one is lowered, and the step S3106 in which the amplitude and the phase of the backward power incident into the radio-frequency power unit 140 designated as the subject of the detection is detected.

In contrast, in the case where the reflected power detection has been completed with all the radio-frequency power units 140 (Yes at step S3107), the control unit 310 finishes the procedure for detecting the reflected power. Through such procedure, the reflected power incident into the radio-frequency power unit 140 the frequency of which overlaps with that of another can be detected.

Thus, the reflected power into the radio-frequency power units 140 the frequencies of which do not overlap with those of other radio-frequency power units can be simultaneously detected, and therefore the detection can be performed in a short time. Since the radio-frequency heating apparatus 300 according to this embodiment is capable of independently setting a frequency for each of the radio-frequency power units 140, the radio-frequency heating apparatus 300 can detect the amplitude and the phase of the reflected power in a shorter time compared with the radio-frequency heating apparatus 200 according to the embodiment 2.

[Detection of Through Power]

Figure 20:
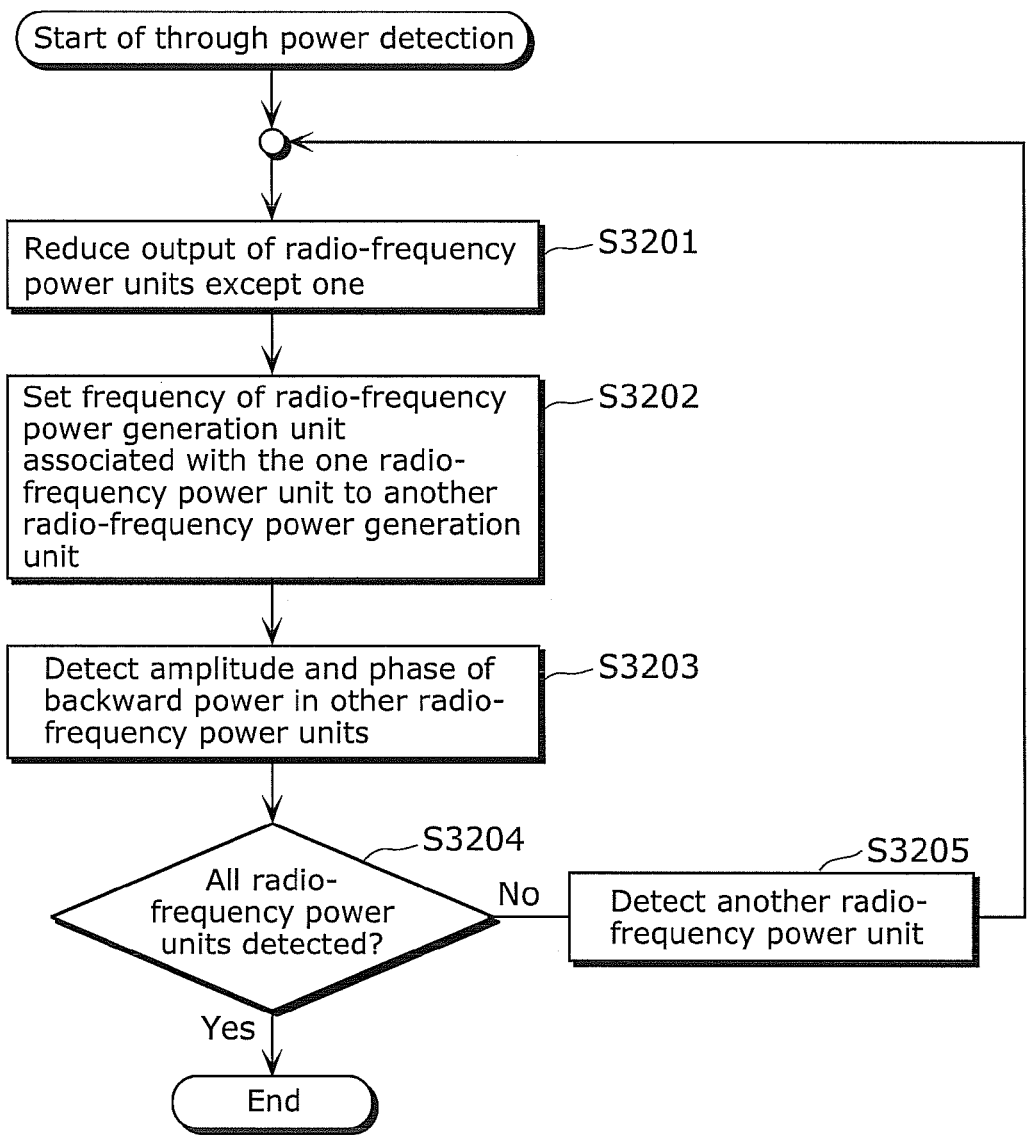
FIG. 20 is a flowchart showing still another procedure for detecting a through power.

FIG. 20 is a flowchart showing a procedure for detecting the through power to be performed by the radio-frequency heating apparatus 300 according to the embodiment 3.

The control unit 310 of the radio-frequency heating apparatus 300 detects the through power among the radio-frequency power units 140a, 140b, 140c, and 140d, through the following controlling procedure.

As shown in FIG. 20, the control unit 310 causes one of the radio-frequency power units 140 (for example, first radio-frequency power unit 140a operating at the frequency A) to output the radio-frequency power, and controls the amplification gain of the radio-frequency power amplification unit of the remaining radio-frequency power units 140 (for example, second, third, and fourth radio-frequency power units 140b, 140c, and 140d operating at given frequencies) so as to reduce the power output of these units, so that the detection level of the reflected power incident into the respective radio-frequency power units 140 becomes sufficiently low (step S3201).

Then the control unit 310 controls the frequencies of the radio-frequency power generation units (for example, second, third, and fourth radio-frequency power generation unit 320b, 320c, 320d) which are respectively supplying the radio-frequency power to the radio-frequency power units 140 (for example, second, third, and fourth radio-frequency power unit 140b, 140c, 140d) controlled so as to reduce the output level, such that the frequency of these radio-frequency power generation units becomes equal to the frequency (for example, frequency A) of the radio-frequency power generation unit (for example, first radio-frequency power generation unit 320a) supplying the radio-frequency power to the one radio-frequency power unit 140 (for example, first radio-frequency power unit 140a) outputting the radio-frequency power (step S3202).

The control unit 310 acquires the in-phase detection signal I and the quadrature detection signal Q of the remaining radio-frequency power units 140 (for example, second, third, and fourth radio-frequency power unit 140b, 140c, 140d), and detects the amplitude and the phase of the through power originating from the one radio-frequency power unit 140 (for example, first radio-frequency power unit 140a) outputting the radio-frequency power and incident into each of the remaining radio-frequency power units 140 (for example, second, third, and fourth radio-frequency power unit), more specifically the through power from the first radio-frequency power unit 140a to the second radio-frequency power unit 140b, the through power from the first radio-frequency power unit 140a to the third radio-frequency power unit 140c, and the through power from the first radio-frequency power unit 140a to the fourth radio-frequency power unit 140d (step S3203).

Then the control unit 310 checks whether the detection of the through power with respect to all the radio-frequency power units 140 has been completed (step S3204), and in the negative case (No at step S3204), the control unit 310 designates another radio-frequency power unit 140 as the subject of detection (step S3205), and repeats the procedure from the step S3202 of lowering the output level of the radio-frequency power units 140 other than the designated radio-frequency power unit 140, to the step S3203 of detecting the amplitude and the phase of the backward power into the other radio-frequency power unit 140.

In contrast, in the case where the detection of the through power with respect to all the radio-frequency power units 140 has been completed (Yes at step S3204), the detection of the through power is finished.

Through such a procedure, the amplitude and the phase of the through power among all the radio-frequency power units 140 can be detected.

The detection of the through power may be performed as follows.

Figure 21:
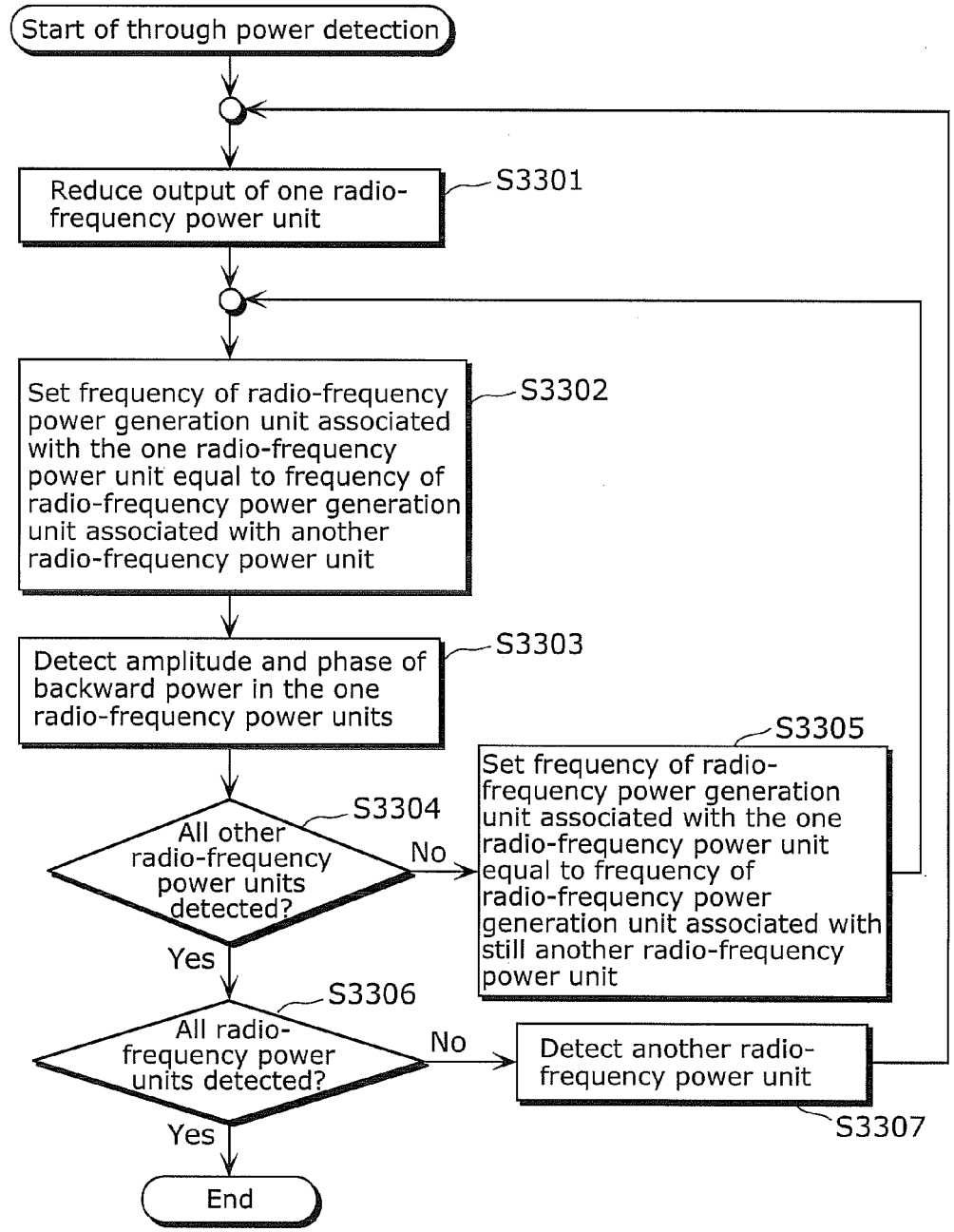
FIG. 21 is a flowchart showing still another procedure for detecting a through power.

FIG. 21 is a flowchart showing another procedure for detecting the through power to be performed by the radio-frequency heating apparatus 300 according to the embodiment 3.

As shown in FIG. 21, the control unit 310 controls the amplification gain of the radio-frequency power amplification unit of one of the radio-frequency power units 140 (for example, first radio-frequency power unit 140a operating at the frequency A), so as to reduce the power output of this radio-frequency power unit, so that the detection level of the reflected power incident into this radio-frequency power unit 140 becomes sufficiently low (step S3301).

Then the control unit 310 controls the frequency of the radio-frequency power generation unit (for example, first radio-frequency power generation unit 320a) which is supplying the radio-frequency power to the radio-frequency power unit 140 (for example, first radio-frequency power unit 140a) controlled so as to reduce the output level, such that the frequency of this radio-frequency power generation unit becomes equal to the frequency (for example, frequency B) of the radio-frequency power generation unit (for example, second radio-frequency power generation unit 320b) supplying the radio-frequency power to one (for example, second radio-frequency power unit 140b) of the other radio-frequency power units 140 (for example, second radio-frequency power unit 140b operating at the frequency B, third radio-frequency power unit 140c operating at the frequency C, and fourth radio-frequency power unit 140d operating at the frequency D) (step S3302).

Thereafter, the control unit 310 acquires the in-phase detection signal I and the quadrature detection signal Q of the radio-frequency power unit 140 (for example, first radio-frequency power unit 140a) controlled so as to reduce the output level, and detects the amplitude and the phase of the backward power originating from the one radio-frequency power unit 140 (for example, second radio-frequency power unit 140b) operating at the same frequency and incident into the radio-frequency power unit 140 (for example, first radio-frequency power unit 140a) controlled so as to reduce the output level (step S3303).

Then the control unit 310 checks whether the detection of the amplitude and the phase of the backward power, originating from all other radio-frequency power units 140 and incident into the one radio-frequency power unit 140 controlled so as to reduce the power output, has been completed (step S3304).

In the negative case (No at step S3304), the control unit 310 controls the frequency of the radio-frequency power unit 140 controlled so as to reduce the output level, such that the frequency of this radio-frequency power unit becomes equal to the frequency (for example, frequency C) of another of the radio-frequency power units 140 (step S3305), and repeats the procedure of the step S3302 of setting the frequency of the one radio-frequency power unit 140 controlled so as to reduce the power output equal to the frequency of another radio-frequency power unit 140, and the step S3303 of detecting the amplitude and the phase of the backward power.

Through such a procedure, the amplitude and the phase of the through power, originating from all other radio-frequency power units 140 (for example, second to fourth radio-frequency power units 140b to 140d) and incident into the one radio-frequency power unit 140 (for example, first radio-frequency power unit 140a) controlled so as to reduce the power output, can be detected (Yes at step S3304).

Then the control unit 310 checks whether the detection of the through power with respect to all the radio-frequency power units 140 has been completed (step S3306), and in the negative case (No at step S3306), the control unit 310 designates another radio-frequency power unit 140 (for example, second radio-frequency power unit 140b operating at the frequency B) as the subject of detection (step S3307).

The control unit 310 repeats the procedure of reducing the power output of the radio-frequency power unit 140 newly designated as the subject of detection (step S3301) and the subsequent steps.

In contrast, in the case where the detection of the through power with respect to all the radio-frequency power units 140 has been completed (Yes at step S3306), the detection of the through power is finished.

Through such a procedure, the amplitude and the phase of the through power among all the radio-frequency power units 140 can be detected.

[Pre-search Process]

To determine the optimum heating condition in advance of the actual heating operation (pre-search process), the radio-frequency heating apparatus 300 according to the embodiment 3 performs a procedure similar to the embodiment 2 shown in FIG. 16.

Upon completing the detection of the amplitude and the phase of the reflected power incident into all the radio-frequency power units 140a, 140b, 140c, and 140d and those of the through power among all the radio-frequency power units 140a, 140b, 140c, and 140d with respect to all the frequencies predetermined for the pre-search process, a matrix as shown in FIG. 8 can be obtained that represent, using the amplitude and the phase, the reflected power characteristic of the radio-frequency power units 140 and the through power characteristic among the radio-frequency power units 140 with respect to each frequency, as in the embodiments 1 and 2.

A method of calculating the radiation loss of the radio-frequency heating apparatus 300 by using the S parameters obtained as above will be described below.

The radiation loss of the radio-frequency power units 140a, 140b, 140c, and 140d at a given combination of frequencies can be calculated by using the S parameter represented by the detected amplitude and phase.

For example, the radiation loss of the first radio-frequency power unit 140a can be obtained by summing the S11 at the frequency set for the first radio-frequency power generation unit 320a, S12 at the frequency set for the second radio-frequency power generation unit 320b, S13 at the frequency set for the third radio-frequency power generation unit 320c, and S14 at the frequency set for the fourth radio-frequency power generation unit 320d. The total sum of the S parameters can be obtained as a total of the amplitude components when the frequencies are different, and by vector synthesis of the amplitude components and the phase components when the frequency is the same.

In this embodiment, since four radio-frequency power generation units 320a, 320b, 320c, and 320d and four radio-frequency power units 140a, 140b, 140c, and 140d are provided, and each of the radio-frequency power generation units 320a, 320b, 320c, and 320d is associated with each of the radio-frequency power units 140a, 140b, 140c, and 140d on one-to-one basis, the total sum of the S parameters of the respective radio-frequency power units 140 is calculated in different manners depending on the combination of frequencies set in each of the radio-frequency power generation units 320a, 320b, 320c, and 320d.

In the case where the radio-frequency power generation unit 320a, 320b, 320c, 320d are all operating at the same frequency, the total sum of the S parameters of the respective radio-frequency power units 140 can be calculated by vector synthesis of the amplitude components and the phase components, as in the embodiment 1 (equations 1-1 to 1-4).

In the case where the radio-frequency power generation units 320a, 320b, 320c, and 320d are operating at different frequencies (for example, first radio-frequency power generation unit 320a operating at frequency A, second and third radio-frequency power generation unit 320b, 320c operating at frequency B, and fourth radio-frequency power generation unit 320d operating at frequency C), the total sum of the S parameters of the respective radio-frequency power units 140 can be calculated as a total of the amplitude components.

For example, on the assumption that, in the case where the radio-frequency power generation units 320a, 320b, 320c, and 320d are all set at different frequencies, the reflected power S11 into the first radio-frequency power unit 140a has the amplitude of $M_{11}$ and the phase of $\theta_{11}$; the through power S12 from the second radio-frequency power unit 140b into the first radio-frequency power unit 140a has the amplitude of $M_{12}$ and the phase of $\theta_{12}$; the through power S13 from the third radio-frequency power unit 140c into the first radio-frequency power unit 140a has the amplitude of $M_{13}$ and the phase of $\theta_{13}$; and the through power S14 from the fourth radio-frequency power unit 140d into the first radio-frequency power unit 140a has the amplitude of $M_{14}$ and the phase of $\theta_{14}$, the radiation loss |S11+S12+S13+S14| of the first radio-frequency power unit 140a can be expressed as the following equation.

$$|S11+S12+S13+S14|=M_{11}+M_{12}+M_{13}+M_{14} \quad \text{(Equation 5-1)}$$

$$|S21+S22+S23+S24|=M_{21}+M_{22}+M_{23}+M_{24} \quad \text{(Equation 5-2)}$$

$$|S31+S32+S33+S34|=M_{31}+M_{32}+M_{33}+M_{34} \quad \text{(Equation 5-3)}$$

$$|S41+S42+S43+S44|=M_{41}+M_{42}+M_{43}+M_{44} \quad \text{(Equation 5-4)}$$

The total sum of the radiation loss of all the radio-frequency power units 140 corresponds to the overall radiation loss of the radio-frequency heating apparatus 300, at the relevant combination of the frequencies.

In the case where some of the radio-frequency power generation units are operating at the same frequency and others are operating at different frequencies, for example when the second and the third radio-frequency power generation unit 320b, 320c are operating at the same frequency and the first radio-frequency power generation unit 320a and the second radio-frequency power generation unit 320b (or third radio-frequency power generation unit 320c) and the fourth radio-frequency power generation unit 320d are operating at different frequencies (for example, first radio-frequency power generation unit 320a operating at frequency A, second and third radio-frequency power generation unit 320b, 320c operating at frequency B, and fourth radio-frequency power generation unit 320d operating at frequency C), the total sum of the S parameters of the respective radio-frequency power units 140 can be calculated as a total of the amplitude components with respect to the S parameters of different frequencies, and by vector synthesis of the amplitude components and phase components, with respect to the S parameters of the same frequency.

For example, in the case where the second and the third radio-frequency power generation unit 320b, 320c are operating at the same frequency and the first radio-frequency power generation unit 320a and the second radio-frequency power generation unit 320b (or third radio-frequency power generation unit 320c) and the fourth radio-frequency power generation unit 320d are operating at different frequencies as the aforementioned example, the radiation loss |S11+S12+S13+S14| of the first radio-frequency power unit 140a can be expressed as the following equation 6-1, in which $M_{11}$ and $\theta_{11}$ represent the amplitude and phase of the reflected power S11 into the first radio-frequency power unit 140a; $M_{12}$ and $\theta_{12}$ represent the amplitude and phase of the through power S12 from the second radio-frequency power unit 140b into the first radio-frequency power unit 140a; $M_{13}$ and $\theta_{13}$ represent the amplitude and phase of the through power S13 from the third radio-frequency power unit 140c into the first radio-frequency power unit 140a; and $M_{14}$ and $\theta_{14}$ represents the amplitude and phase of the through power S14 from the fourth radio-frequency power unit 140d into the first radio-frequency power unit 140a, at a given frequency.

[Math. 17]

$$|S11+S12+S13+S14| = M_{11} + M_{14} + \sqrt{(M_{12}\cdot\sin\theta_{12} + M_{13}\cdot\sin\theta_{13})^2 + (M_{12}\cdot\cos\theta_{12} + M_{13}\cdot\cos\theta_{13})^2} \quad \text{(Equation 6-1)}$$

Likewise, the radiation loss |S21+S22+S23+S24| of the second radio-frequency power unit 140b, the radiation loss |S31+S32+S33+S34| of the third radio-frequency power unit 140c, and the radiation loss |S41+S42+S43+S44| of the fourth radio-frequency power unit 140d can be expressed as the following equations 5-2 to 5-4, like 5-1.

Likewise, the radiation loss |S21+S22+S23+S24| of the second radio-frequency power unit 140b, the radiation loss |S31+S32+S33+S34| of the third radio-frequency power unit 140c, and the radiation loss |S41+S42+S43+S44| of the fourth radio-frequency power unit 140d can be expressed as the following equations, as 6-1.

[Math. 18]

$$|S21 + S22 + S23 + S24| = \frac{}{M_{21} + M_{24} + \sqrt{(M_{22} \cdot \sin\theta_{22} + M_{23} \cdot \sin\theta_{23})^2 + (M_{22} \cdot \cos\theta_{22} + M_{23} \cdot \cos\theta_{23})^2}}$$ (Equation 6-2)

[Math. 19]

$$|S31 + S32 + S33 + S34| = \frac{}{M_{31} + M_{34} + \sqrt{(M_{32} \cdot \sin\theta_{32} + M_{33} \cdot \sin\theta_{33})^2 + (M_{32} \cdot \cos\theta_{32} + M_{33} \cdot \cos\theta_{33})^2}}$$ (Equation 6-3)

[Math. 20]

$$|S41 + S42 + S43 + S44| = \frac{}{M_{41} + M_{44} + \sqrt{(M_{42} \cdot \sin\theta_{42} + M_{43} \cdot \sin\theta_{43})^2 + (M_{42} \cdot \cos\theta_{42} + M_{43} \cdot \cos\theta_{43})^2}}$$ (Equation 6-4)

The total sum of the radiation loss of all the radio-frequency power units 140 corresponds to the overall radiation loss of the radio-frequency heating apparatus 300, at the relevant combination of the frequencies.

Now, a method of calculating the radiation loss that would arise when different phase shift amounts are set for the variable phase shift unit 142 of the respective radio-frequency power units 140 will be described.

For example, in the case where the second and the third radio-frequency power generation unit 320b, 320c are operating at the same frequency and the first radio-frequency power generation unit 320a and the second radio-frequency power generation unit 320b (or third radio-frequency power generation unit 320c) and the fourth radio-frequency power generation unit 320d are operating at different frequencies as the aforementioned example, the radiation loss |S11+S12+S13+S14| of the first radio-frequency power unit 140a, the radiation loss |S21+S22+S23+S24| of the second radio-frequency power unit 140b, the radiation loss |S31+S32+S33+S34| of the third radio-frequency power unit 140c, and the radiation loss |S41+S42+S43+S44| of the fourth radio-frequency power unit 140d that would respectively arise when the phase shift amount of the variable phase shift unit 142a of the first radio-frequency power unit 140a is changed by φ1; the phase shift amount of the variable phase shift unit 142b of the second radio-frequency power unit 140b is changed by φ2; the phase shift amount of the variable phase shift unit 142c of the third radio-frequency power unit 140c is changed by φ3; and the phase shift amount of the variable phase shift unit 142d of the fourth radio-frequency power unit 140d is changed by φ4 can be expressed as the following equations 4-1 to 4-4.

[Math. 21]

$$|S11 + S12 + S13 + S14| = M_{11} + M_{14} + \sqrt{(M_{12} \cdot \sin(\theta_{12} + \phi_2) + M_{13} \cdot \sin(\theta_{13} + \phi_3))^2 + (M_{12} \cdot \cos(\theta_{12} + \phi_2) + M_{13} \cdot \cos(\theta_{13} + \phi_3))^2}$$ (Equation 7-1)

[Math. 22]

$$|S21 + S22 + S23 + S24| = M_{21} + M_{24} + \sqrt{(M_{22} \cdot \sin(\theta_{22} + \phi_2) + M_{23} \cdot \sin(\theta_{23} + \phi_3))^2 + (M_{22} \cdot \cos(\theta_{22} + \phi_2) + M_{23} \cdot \cos(\theta_{23} + \phi_3))^2}$$ (Equation 7-2)

[Math. 23]

$$|S31 + S32 + S33 + S34| = M_{31} + M_{34} + \sqrt{(M_{32} \cdot \sin(\theta_{32} + \phi_2) + M_{33} \cdot \sin(\theta_{33} + \phi_3))^2 + (M_{32} \cdot \cos(\theta_{32} + \phi_2) + M_{33} \cdot \cos(\theta_{33} + \phi_3))^2}$$ (Equation 7-3)

[Math. 24]

$$|S41 + S42 + S43 + S44| = M_{41} + M_{44} + \sqrt{(M_{42} \cdot \sin(\theta_{42} + \phi_2) + M_{43} \cdot \sin(\theta_{43} + \phi_3))^2 + (M_{42} \cdot \cos(\theta_{42} + \phi_2) + M_{43} \cdot \cos(\theta_{43} + \phi_3))^2}$$ (Equation 7-4)

The radiation loss of the respective radio-frequency power units 140 that would arise when the phase shift amount of the variable phase shift unit 142 of the respective radio-frequency power units 140 is changed by a given value can be calculated in accordance with those equations 7-1 to 7-4, and also the overall radiation loss of the radio-frequency heating apparatus 300 can be calculated.

As described above, the control unit 310 calculates the radiation loss that would arise when a given frequency of the radio-frequency power generation units 320a, 320b, 320c, and 320d and a given combination of the phase shift amounts of the variable phase shift units 142a, 142b, 142c, and 142d are assumed to be adopted for heating, on the basis of the information of the amplitude and the phase of the reflected power and the through power, to thereby determine the frequencies of the respective radio-frequency power generation units 320a, 320b, 320c, and 320d and the combination of the phase shift amounts of the variable phase shift units 142a, 142b, 142c, and 142d that provide the best overall radiation efficiency of the radio-frequency heating apparatus 300.

Thereafter, the control unit 310 sets the frequencies and the phase shift amounts determined as above as the frequencies of the radio-frequency power generation units 320a, 320b, 320c, and 320d and the phase shift amounts of each of the variable phase shift units 142a, 142b, 142c, and 142d.

As described above, in the pre-search process according to this embodiment the radiation loss that would arise when a given combination of the frequencies of the radio-frequency power generation units 320a, 320b, 320c, and 320d and of the phase shift amounts of the variable phase shift units 142a, 142b, 142c, and 142d are assumed to be adopted for heating is calculated on the basis of the individual detection results of the amplitude and the phase of the reflected power and the through power from each of the radio-frequency power units 140 at the set frequencies set for the pre-search process, so that the combination of the frequencies of the radio-frequency power generation units 320a, 320b, 320c, and 320d and the combination of the phase shift amounts of the variable phase shift units 142a, 142b, 142c, and 142d that provide the best overall radiation efficiency of the radio-frequency heating apparatus 300 can be determined. Therefore, as mentioned above, the time for determining the best condition can be significantly shortened, compared with the case where the actual measurement is performed with respect to all the frequencies of the radio-frequency power generation units 320a, 320b, 320c, and 320d and all the combinations of the phase shift amounts of the variable phase shift units 142a, 142b, 142c, and 142d. Consequently, the pre-search process for determining the optimum frequency condition can be performed in a short time, before the user presses the start button of the radio-frequency heating apparatus 300 to proceed to the actual heating operation.

It will now be assumed that the frequency can be set at 101 points between 2.4 GHz and 2.5 GHz at an increment of 1 MHz and the phase shift amount can be set at 12 points from 0 to 360 degrees at intervals of 30 degrees, and that four radio-frequency power units 140 are employed. With the currently available technique it takes approximately 0.1 ms for performing the measurement of one frequency point, and hence it takes approximately sixty thousand hours to execute $12^4 \times 101^4$ times of measurement, to cover all the combinations of those points. In other words, in the case where the measurement is actually performed with respect to all the combinations of the frequencies of the radio-frequency power generation units and all the combinations of the phase shift amounts of the variable phase shift units 142 of each of the frequency power units 140, it takes as long as approximately sixty thousand hours before the user can start the actual heating operation, which is unrealistic.

In contrast, the radio-frequency heating apparatus 300 according to this embodiment only detects the in-phase detection signal I and the quadrature detection signal Q of the reflected power and the through power at the radio-frequency power units 140 at the 101 points in the frequency band of 2.4 GHz to 2.5 GHz with the phase shift amount of the variable phase shift units 142 of each radio-frequency power unit 140 set at a given point, and then calculates the amplitude and the phase. Accordingly, the amplitude and the phase of the backward power originating from reflection, as well as the amplitude and the phase of the through-passing backward power can be obtained at each of the frequencies only in approx. 40 ms necessary for measuring 101×4 points. After obtaining the S parameters represented by the amplitude and the phase of those 101×4 points, the frequencies of the radio-frequency power generation units 320a to 320d and the phase shift amount of the variable phase shift units 142 that provide the optimum radiation efficiency can be determined by the calculation performed by the control unit 210, which is by far quicker than the actual measurement, and therefore a preparation time of one second or shorter, generally accepted as stand-by time by consumers, can well be achieved.

Further, as in the embodiments 1 and 2, the vector synthesis method can be incorporated in the calculation process of the optimum combination of the phase shift amounts of each of the variable phase shift units 142a, 142b, 142c, and 142d, to thereby reduce the number of arithmetic steps, thus further reducing the calculation time.

Although the detection of the amplitude and the phase of all the reflected powers is followed by the detection of the amplitude and the phase of all the through powers according to this embodiment, the detection of the amplitude and the phase of all the reflected powers may be preceded by the detection of the amplitude and the phase of all the through powers, or the amplitude and the phase of the reflected power and those of the through power may be alternately detected. From the radio-frequency power unit that is radiating the radio-frequency power, the amplitude and the phase of the reflected power can be detected while detecting those of the through power. Therefore, the amplitude and the phase of the reflected power and those of the through power may be simultaneously detected from such radio-frequency power units.

[Re-search Process]

The re-search process according to the embodiment 3 may be carried out in accordance with the procedure according to the embodiment 2 shown in FIG. 17.

By performing the re-search process, the object can be heated constantly under the optimum heating condition, even though the optimum heating condition fluctuates because of a change in temperature and shape of the object during the heating operation. In addition, when calculating the best radiation efficiency, the control unit 210 may calculate the radiation loss that would arise when given frequencies of the radio-frequency power generation units 320a, 320b, 320c, and 320d and a given combination of the phase shift amounts of the variable phase shift units 142a, 142b, 142c, and 142d are assumed to be adopted for heating, on the basis of the individual detection results of the amplitude and the phase of the reflected power and the through power from each of the radio-frequency power units 140 at the set frequencies, to thereby determine the frequencies of the radio-frequency power generation units 320a, 320b, 320c, and 320d and the phase shift amounts of the variable phase shift units 142a, 142b, 142c, and 142d that provide the best radiation efficiency.

Accordingly, as mentioned above, the time necessary for determining the best condition can be significantly shortened, compared with the case where the actual measurement is performed with respect to all the frequencies of the radio-frequency power generation units 320a, 320b, 320c, and 320d and all the combinations of the phase shift amounts of the variable phase shift units 142a, 142b, 142c, and 142d. Consequently, the re-search process can be performed in a short time, which results in shortened extension of the heating time required for modifying the heating time because of the temperature change of the object, and in reduced stand-by time of the user before the heating is finished.

Here, although the values obtained through the re-search process, which provide the best radiation efficiency under a certain condition of the frequency and the phase, result in higher radiation efficiency than the current one, it is not necessary to adopt the values from the re-search process in the case where, for example, the level of the backward power into one of the radio-frequency power units 140 exceeds a predetermined threshold. In other words, the conditions that provide the optimum radiation efficiency may be adopted from among the conditions that can keep the level of the backward power into the respective radio-frequency power units 140 within the predetermined threshold. Such a threshold may be determined, for example, in accordance with stand voltages of amplifiers at each frequency, so as to prevent a failure of the amplifier containing a semiconductor device.

To determine the timing for activating the re-search process, the level of the output power of the radio-frequency power units 140, calculated from the amplitude and the phase of the reflected power detected by acquiring the in-phase detection signals I(1) to I(4) and the quadrature detection signals Q(1) to Q(4) from the respective radio-frequency power units 140*a*, 140*b*, 140*c*, and 140*d* may be compared with a predetermined threshold constantly or periodically during the heating operation, so as to perform the re-search process in the case where the power level of the backward power into at least one of the radio-frequency power units 140 has exceeded the threshold.

Thus, setting the predetermined threshold and performing the re-search process when the threshold is exceeded enables the object to be heated constantly under the optimum heating condition, despite the fluctuation of the values of the reflected power and the through power originating from a change in temperature and shape of the object.

Further, in order to prevent a malfunction of the radio-frequency heating apparatus 200, especially the amplifier containing a semiconductor device, because of an excessive reflected power or through power, the control unit 310 may control, during the pre-search or re-search process, the amplification gain of the radio-frequency power amplification units 143*a*, 143*b*, 143*c*, and 143*d* such that the radio-frequency power to be output from the respectively corresponding radio-frequency power units 140*a*, 140*b*, 140*c*, and 140*d* becomes smaller than the radio-frequency power to be outputted in the actual heating operation.

As described above, the radio-frequency heating apparatus 300 according to this embodiment includes the radio-frequency power generation units 320*a* to 320*d* associated with each of the radio-frequency power units 140 on one-to-one basis. Such a configuration enables the time necessary for detecting the reflected power incident into the respective radio-frequency power units 140 to be further shortened compared with the radio-frequency heating apparatus 200 according to the embodiment 2. Consequently, the optimum combinations of the frequencies and of the phase shift amounts can be determined in a shorter time, before the user presses the start button of the radio-frequency heating apparatus 300 to proceed to the actual heating operation, so that the user can enjoy improved convenience for use.

Further, in contrast to radio-frequency heating apparatus 200 according to the embodiment 2, the radio-frequency heating apparatus 300 according to this embodiment can independently control the frequencies to be generated by each of the radio-frequency power generation units 320*a* to 320*d*. Therefore, the radio-frequency heating apparatus 300 provides a higher degree of freedom in setting the frequencies of the plurality of radio-frequency powers to be radiated to the heating chamber, thereby achieving improved optimum radiation efficiency.

Although the embodiments of the radio-frequency heating apparatus according to the present invention have been described, it is to be understood that the present invention is in no way limited to these embodiments. Various modifications that are obvious to those skilled in the art and combinations of the constituents in different embodiments, conceived without departing from the spirit of the present invention, are included in the scope of the present invention.

Figure 22:
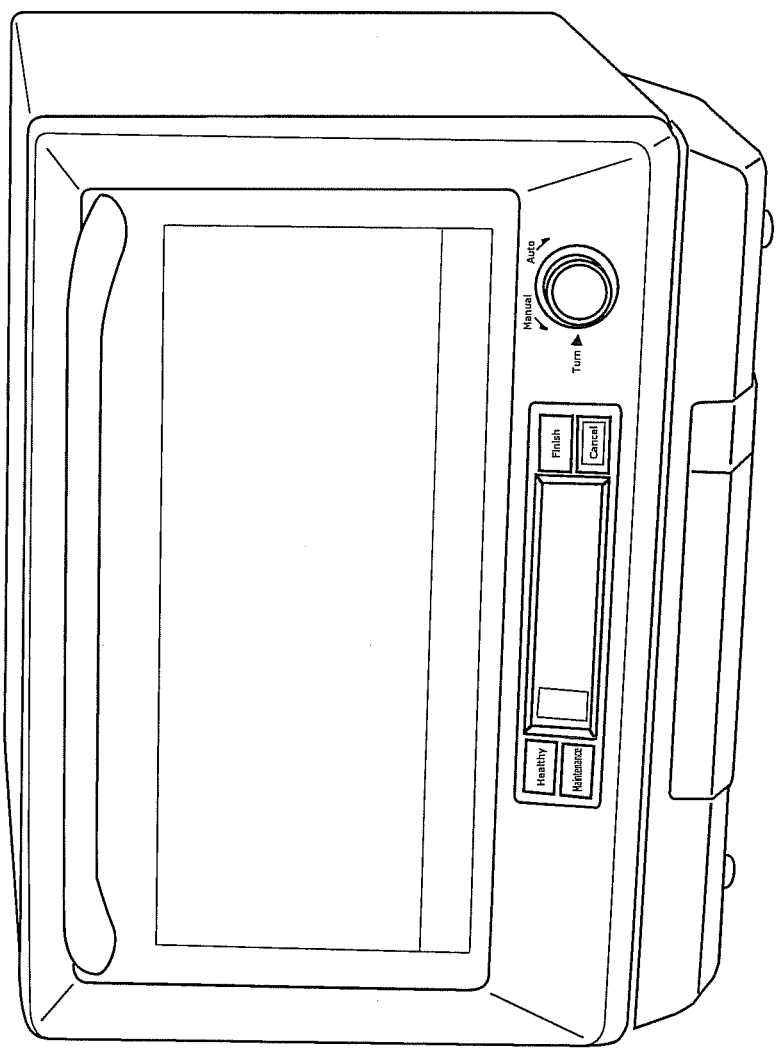
FIG. 22 is a perspective view showing an appearance of the radio-frequency heating apparatus.

The aforementioned radio-frequency heating apparatus is applicable, for example, to a microwave oven as shown in FIG. 22, and can detect the optimum condition for heating the object in a short time, so that the user can enjoy improved convenience for use.

Although the first to fourth radio-frequency power units 140*a* to 140*d* respectively include the variable phase shift unit 142*a* to 142*d* in the foregoing embodiments, it is not mandatory that each of the first to the fourth radio-frequency power units 140*a* to 140*d* includes the variable phase shift unit in the embodiment 2.

More specifically, in the embodiment 2 a variable phase shift unit may be provided between the first radio-frequency power generation unit 220*a* and the first distribution unit 230*a*, and another variable phase shift unit may be provided between the second radio-frequency power generation unit 220*b* and the second distribution unit 230*b*.

In the embodiments 2 and 3, the phase of the radio-frequency power generated by the radio-frequency power generation units (first radio-frequency power generation unit 220*a* and second radio-frequency power generation unit 220*b*, or first to fourth radio-frequency power generation units 320*a* to 320*d*) may be shifted, instead of the configuration in which the first to the fourth radio-frequency power units 140*a* to 140*d* respectively include the variable phase shift unit 142*a* to 142*d*. In other words, the variable phase shift unit may be a PLL circuit provided in each of the radio-frequency power generation units so as to shift the phase of the radio-frequency power generated by the radio-frequency power generation unit in accordance with the phase shift amount indicated by the control unit (110, 210, or 310). Such a configuration allows the phase to be shifted in a frequency range lower than that of the radio-frequency power generated by the radio-frequency power generation unit, thereby facilitating the control and designing.

Although the first to the fourth radio-frequency power generation units 320*a* to 320*d* are provided separately from the first to the fourth radio-frequency power units 140*a* to 140*d* in the embodiment 3, the first to the fourth radio-frequency power units 140*a* to 140*d* may each include therein the respectively associated radio-frequency power generation units 320*a* to 320*d*.

The radio-frequency heating apparatus may also determine a frequency and a combination of phase shift amounts that allows the object to be heated to a desired state, to thereby heat the object with the determined frequency and combination of the phase shift amounts, in addition to determining the frequency and the combination of the phase shift amounts that provide the optimum radiation efficiency. For example, the radio-frequency heating apparatus may determine, in the case where the object is a box lunch, the frequency and the combination of the phase shift amounts so as to heat the rice and keep the side items from being heated.

Although the radio-frequency power amplification units 143*a* to 143*d* are located posterior to the variable phase shift units 142*a* to 142*d* in the first to the fourth radio-frequency power units 140*a* to 140*d*, the radio-frequency power amplification units 143*a* to 143*d* may be located anterior to the variable phase shift units 142*a* to 142*d*.

In FIG. 9, the radiation loss 180*a* to 180*d* of the radio-frequency power unit 140 are values estimated by calculation under the combinations of the phase shift amounts other than $\theta_{0, 0, 0, 0}$, with respect to each frequency set at the step S1101 (more specifically, steps S1401, S1404 and S1407). However, the radiation loss 180*a* to 180*d* may be estimated by calculation at additional frequencies (for example, 2401.5 MHz) that can be set for the radio-frequency power generation units (radio-frequency power generation unit 120, first radio-frequency power generation unit 220a and second radio-frequency power generation unit 220b, or first to fourth radio-frequency power generation units 320a to 320d), in addition to the frequency set at the step S1101. In the case where, for example, 201 points of frequencies can be set, actual measurement may be performed with 101 points and estimation may be performed with 100 points.

Although different procedures are employed for detecting the reflected power depending on the frequencies of the radio-frequency power generation units in the embodiments 2 and 3, the procedure according to the embodiment 1 shown in FIG. 5 may be adopted irrespective of the combination of the frequencies.

Likewise, although different procedures are employed for detecting the through power depending on the frequencies of the radio-frequency power generation units in the embodiments 2 and 3, the procedure according to the embodiment 1 shown in FIG. 6 may be adopted irrespective of the combination of the frequencies.

The present invention may be realized not only as an apparatus, but also as a radio-frequency heating method including steps corresponding to the operation process of the apparatus.

[Industrial Applicability]

The present invention enables a radio-frequency heating apparatus including at least one radio-frequency power generation unit and a plurality of radio-frequency power units to determine an optimum heating condition in a short time, and is hence advantageously applicable to cooking appliances such as a microwave oven.

[Reference Signs List]

| | |
|---|---|
| 100, 200, 300 | Radio-frequency heating apparatus |
| 110, 210, 310 | Control unit |
| 120 | Radio-frequency power generation unit |
| 121 | Oscillation unit |
| 122 | Phase locked loop |
| 123 | Amplification unit |
| 130, 141, 141a, 141b, 141c, 141d | Distribution unit |
| 140 | Radio-frequency power unit |
| 140a | First radio-frequency power unit |
| 140b | Second radio-frequency power unit |
| 140c | Third radio-frequency power unit |
| 140d | Fourth radio-frequency power unit |
| 142, 142a, 142b, 142c, 142d | Variable phase shift unit |
| 143, 143a, 143b, 143c, 143d | Radio-frequency power amplification unit |
| 144, 144a, 144b, 144c, 144d | Directional coupling unit |
| 145, 145a, 145b, 145c, 145d | Quadrature detection unit |
| 150, 150a, 150b, 150c, 150d | Radiation unit |
| 151 | Variable attenuator |
| 152 | Radio-frequency power amplifier |
| 153 | In-phase detection mixer |
| 154 | Quadrature detection mixer |
| 155 | π/2 phase shifter |
| 156 | in-phase side low-pass filter |
| 157 | quadrature side low-pass filter |
| 170 | S parameter |
| 180a to 180d | Radiation loss |
| 220a, 320a | First radio-frequency power generation unit |
| 220b, 320b | Second radio-frequency power generation unit |
| 230a | First distribution unit |
| 230b | Second distribution unit |
| 320c | Third radio-frequency power generation unit |
| 320d | Fourth radio-frequency power generation unit |

The invention claimed is:

1. A radio-frequency heating apparatus that heats an object placed in a heating chamber with radio-frequency power, said apparatus comprising:

at least one radio-frequency power generation unit configured to generate radio-frequency power of a set frequency;

a variable phase shift unit configured to change a phase of the radio-frequency power generated by said radio-frequency power generation unit;

a plurality of radio-frequency power units each including (i) a radiation unit configured to radiate the radio-frequency power of a phase changed by said variable phase shift unit to the heating chamber, and (ii) a backward power detection unit configured to detect backward power constituting a part of the radio-frequency power radiated from said radiation unit and incident into said radiation unit from the heating chamber; and a control unit configured to set a frequency for said radio-frequency power generation unit and a phase shift amount for said variable phase shift unit, wherein said backward power detection unit is configured to:

detect, in the frequency set for said radio-frequency power generation unit by said control unit, an amplitude and a phase of a reflected wave constituting the backward power inputted by reflection to said radiation unit of one of said radio-frequency power units, and an amplitude and a phase of a through wave constituting the backward power inputted to said radiation unit of the one of said radio-frequency power units, the reflected wave being part of the radio-frequency power radiated from said radiation unit of the one of said radio-frequency power units, and the through wave being part of the radio-frequency power radiated from a radiation unit of another one of said radio-frequency power units, and said control unit is configured to:

(i) sequentially set a plurality of frequencies for said radio-frequency power generation unit, (ii) estimate by calculation an amplitude and a phase of the reflected wave and an amplitude and a phase of the through wave resulting from a given combination of the phase shift amounts in said variable phase shift unit, with respect to each of the frequencies that can be set for said radio-frequency power generation unit, by using, in said backward power detection unit of each of said radio-frequency power units, the amplitude and the phase of the reflected wave and the amplitude and the phase of the through wave with respect to each of the set frequencies, (iii) determine a frequency of the radio-frequency power to be generated by said radio-frequency power generation unit and a phase shift amount of said variable phase shift unit for heating the object such that a total amount of the reflected wave and the through wave of each of said radio-frequency power units is smallest from (a) the amplitude and the phase of the reflected wave and the amplitude and the phase of the through wave detected with respect to each of the frequencies, and (b) given combinations of the phase shift amounts in said variable phase shift unit, estimated with respect to each of the frequencies, and (iv) set the determined frequency and the determined phase shift amount for said radio-frequency power generation unit and said variable phase shift unit.

2. The radio-frequency heating apparatus according to claim 1, wherein said backward power detection unit includes a quadrature detection unit, and said quadrature detection unit is configured to perform quadrature detection of the backward power by using the radio-frequency power generated by said radio-frequency power generation unit, to thereby detect an in-phase detection signal and a quadrature detection signal to be used to calculate the amplitude and the phase of the reflected wave and the amplitude and the phase of the through wave.

3. The radio-frequency heating apparatus according to claim 2, wherein each of said plurality of radio-frequency power units further includes a radio-frequency power amplification unit configured to amplify the radio-frequency power generated by said radio-frequency power generation unit, and to vary an amplification gain, and said control unit is configured to further set an amplification gain in said radio-frequency power amplification unit.

4. The radio-frequency heating apparatus according to claim 3, comprising one radio-frequency power generation unit being said radio-frequency power generation unit, and said plurality of radio-frequency power units, said apparatus further comprising a distribution unit configured to divide the radio-frequency power generated by said radio-frequency power generation unit and supply the divided radio-frequency power to said plurality of radio-frequency power units.

5. The radio-frequency heating apparatus according to claim 4, wherein, when said backward power detection unit of one of said radio-frequency power units detects the amplitude and the phase of the through wave, said control unit is configured to set (i) a frequency of said radio-frequency power generation unit equal to a frequency for measuring the through wave, and (ii) an amplification gain in said radio-frequency power amplification unit such that the amplitude of the reflected wave in the one of said radio-frequency power units becomes smaller than the amplitude of the through wave.

6. The radio-frequency heating apparatus according to claim 4, wherein, when said backward power detection unit of one of said radio-frequency power units detects the amplitude and the phase of the reflected wave, said control unit is configured to set an amplification gain in said radio-frequency power amplification unit such that the amplitude of the through wave becomes smaller than the amplitude of the reflected wave in the one of said radio-frequency power units.

7. The radio-frequency heating apparatus according to claim 3, comprising a plurality of said radio-frequency power generation units, wherein said plurality of radio-frequency power generation units supplies a plurality of radio-frequency powers thereby generated to said plurality of radio-frequency power units.

8. The radio-frequency heating apparatus according to claim 7, wherein one of said plurality of radio-frequency power generation units and one of said plurality of radio-frequency power units are associated with each other on one-to-one basis.

9. The radio-frequency heating apparatus according to claim 7, wherein said plurality of radio-frequency power units is associated with said plurality of radio-frequency power generation units, and when said backward power detection unit of one of said radio-frequency power units is to detect the amplitude and the phase of the through wave, said control unit is configured to set (i) the same frequency in one of said radio-frequency power generation units associated with the one of said radio-frequency power units and in another one of said radio-frequency power generation units associated with another one of said radio-frequency power units, and (ii) an amplification gain in said radio-frequency power amplification units such that the amplitude of the reflected wave in the one of said radio-frequency power units becomes smaller than the amplitude of the through wave.

10. The radio-frequency heating apparatus according to claim 7, wherein said plurality of radio-frequency power units is associated with said plurality of radio-frequency power generation units, and when a frequency set in one of said radio-frequency power generation units associated with one of said radio-frequency power units is the same as a frequency set in another one of said radio-frequency power generation units associated with another one of said radio-frequency power units, and when said backward power detection unit of the one of said radio-frequency power units is to detect the amplitude and the phase of the through wave, said control unit is configured to set an amplification gain in said radio-frequency power amplification unit such that the amplitude of the through wave in the one of said radio-frequency power units becomes smaller than the amplitude of the reflected wave in the one of said radio-frequency power units.

11. The radio-frequency heating apparatus according to claim 3, wherein said control unit is configured to:
(i) determine a frequency of said radio-frequency power generation unit and a phase shift amount of said variable phase shift unit as a pre-search process before heating the object, (ii) redetermine a frequency of said radio-frequency power generation unit and a phase shift amount of said variable phase shift unit as a re-search process while heating the object, and (iii) set an amplification gain for said radio-frequency power amplification unit of said plurality of radio-frequency power units, such that the radio-frequency power radiated from said radiation unit of said plurality of radio-frequency power units during the pre-search process or the re-search process becomes smaller than the radio-frequency power radiated from said radiation unit for heating the object.

12. The radio-frequency heating apparatus according to claim 1, wherein said control unit is configured to determine a frequency of said radio-frequency power generation unit and a phase shift amount of said variable phase shift unit before heating the object as a pre-search process.

13. The radio-frequency heating apparatus according to claim 1, wherein said control unit is further configured to:
redetermine a frequency of said radio-frequency power generation unit and a phase shift amount of said variable phase shift unit while heating the object as a re-search process; and
set a frequency newly determined in the re-search process for said radio-frequency power generation unit, and a phase shift amount newly determined in the re-search process for said variable phase shift unit.

14. The radio-frequency heating apparatus according to claim 13,
wherein said control unit is configured to cause each of said plurality of radio-frequency power units to detect the backward power while heating the object; and
execute the re-search process in the case where at least one of a plurality of backward powers detected exceeds a threshold.

15. The radio-frequency heating apparatus according to claim 1,
wherein said variable phase shift unit is a phase shifter provided in association with each of said plurality of radio-frequency power units.

16. The radio-frequency heating apparatus according to claim 1,
wherein said variable phase shift unit is a phase-locked loop (PLL) circuit provided in association with each of the at least one radio-frequency power generation unit, and configured to change a phase of the radio-frequency power generated by said associated radio-frequency power generation unit, in accordance with a phase shift amount set by said control unit.

17. A method of heating an object placed in a heating chamber with radio-frequency power radiated from a plurality of radio-frequency power units, said method comprising:
setting a frequency of the radio-frequency power radiated from the plurality of radio-frequency power units;
detecting, on the basis of the set frequency, an amplitude and a phase of a reflected wave constituting the backward power inputted by reflection to said radiation unit of one of said radio-frequency power units, and an amplitude and a phase of a through wave constituting the backward power inputted to said radiation unit of the one of said radio-frequency power units, the reflected wave being part of the radio-frequency power radiated from said radiation unit of the one of said radio-frequency power units, and the through wave being part of the radio-frequency power radiated from a radiation unit of another one of said radio-frequency power units;
changing the frequency of the radio-frequency power radiated from the plurality of radio-frequency power units;
detecting an amplitude and a phase of the reflected wave and an amplitude and a phase of the through wave on the basis of the frequency changed in said changing the frequency;
determining a frequency and a phase of the radio-frequency power radiated from the plurality of radio-frequency power units for heating the object, on the basis of the amplitudes and the phases of the reflected wave and the amplitudes and the phases of the through wave detected in said detecting on the basis of the set frequency and in said detecting on the basis of the frequency changed; and
radiating the radio-frequency power of the determined frequency and the determined phase from the plurality of radio-frequency power units thereby heating the object.

18. The method according to claim 17,
wherein said determining a frequency and a phase includes:
estimating by calculation, by using the amplitudes and the phases of the reflected wave and the amplitudes and the phases of the through wave detected in said detecting on the basis of the set frequency and in said detecting on the basis of the frequency changed, an amplitude and a phase of the reflected wave and an amplitude and a phase of the through wave resulting from a given combination of the phase shift amounts set in the variable phase shift unit, with respect to each of the frequencies of the radio-frequency power radiated from the plurality of radio-frequency power units that can be set; and
determining a frequency and a combination of phases of the radio-frequency power radiated from the plurality of radio-frequency power units for heating the object, on the basis of (i) the amplitude and the phase of the reflected wave and the amplitude and the phase of the through wave detected in said detecting on the basis of the set frequency and in said detecting on the basis of the frequency changed, and (ii) the amplitude and the phase of the reflected wave and the amplitude and the phase of the through wave estimated in said estimating by calculation.

* * * * *